US012196938B2

(12) United States Patent
Fujikake et al.

(10) Patent No.: US 12,196,938 B2
(45) Date of Patent: Jan. 14, 2025

(54) MICROSCOPE

(71) Applicant: NIKON CORPORATION, Tokyo (JP)

(72) Inventors: Yosuke Fujikake, Yokohama (JP);
Shigeru Nakayama, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 811 days.

(21) Appl. No.: 17/459,602

(22) Filed: Aug. 27, 2021

(65) Prior Publication Data
US 2021/0389577 A1 Dec. 16, 2021

Related U.S. Application Data

(63) Continuation of application No. PCT/JP2019/008966, filed on Mar. 6, 2019.

(51) Int. Cl.
*G02B 21/06* (2006.01)
*G01N 21/64* (2006.01)
(Continued)

(52) U.S. Cl.
CPC ..... *G02B 21/0032* (2013.01); *G01N 21/6458* (2013.01); *G02B 21/0076* (2013.01);
(Continued)

(58) Field of Classification Search
None
See application file for complete search history.

(56) References Cited

U.S. PATENT DOCUMENTS 9,921,161 B1 * 3/2018 Feldkhun ............ G01N 21/6458
11,287,625 B2 * 3/2022 Fujikake ............ G02B 21/0072
(Continued)

FOREIGN PATENT DOCUMENTS

WO 2009/031418 A1 3/2009
WO 2015/052936 A1 4/2015
(Continued)

OTHER PUBLICATIONS

Apr. 16, 2019 International Search Report issued in International Patent Application No. PCT/JP2019/008966.
(Continued)

*Primary Examiner* — Derek S. Chapel
(74) *Attorney, Agent, or Firm* — Oliff PLC

(57) ABSTRACT

A microscope includes: illumination optical system irradiating specimen with light and forming fringe illumination; scanning part performing scanning with relative movement between fringe illumination and specimen; phase modulation element setting fringe illumination to a plurality of phase states; a plurality of detectors detecting light from specimen; and image processor generating output image with detection results of predetermined two or more detectors, wherein image processor uses detection results of each of predetermined two or more detectors to generate at least first image, which is detected when fringe illumination is in first phase state, and second image, which is detected when fringe illumination is in second phase state, for each detector, generates intermediate image for each detector by correcting first image and second image based on position of corresponding detector, period of fringe illumination, first phase, and second phase, and generates output image from the plurality of intermediate images.

17 Claims, 29 Drawing Sheets

(51) Int. Cl.
 G02B 21/00 (2006.01)
 G02B 21/36 (2006.01)
(52) U.S. Cl.
 CPC .......... *G02B 21/008* (2013.01); *G02B 21/06* (2013.01); *G02B 21/365* (2013.01)

(56) References Cited

U.S. PATENT DOCUMENTS

2010/0157422 A1 6/2010 Ouchi et al.
2016/0216505 A1 7/2016 Okudaira et al.

FOREIGN PATENT DOCUMENTS

WO 2016/151665 A1 9/2016
WO 2017/094184 A1 6/2017

OTHER PUBLICATIONS

Apr. 16, 2019 Written Opinion issued in International Patent Application No. PCT/JP2019/008966.
Peng Gao et al., "Confocal laser scanning microscopy with spatiotemporal structured illumination," Optics Letters, vol. 41, No. 6, pp. 1193-1196, Mar. 15, 2016.

\* cited by examiner

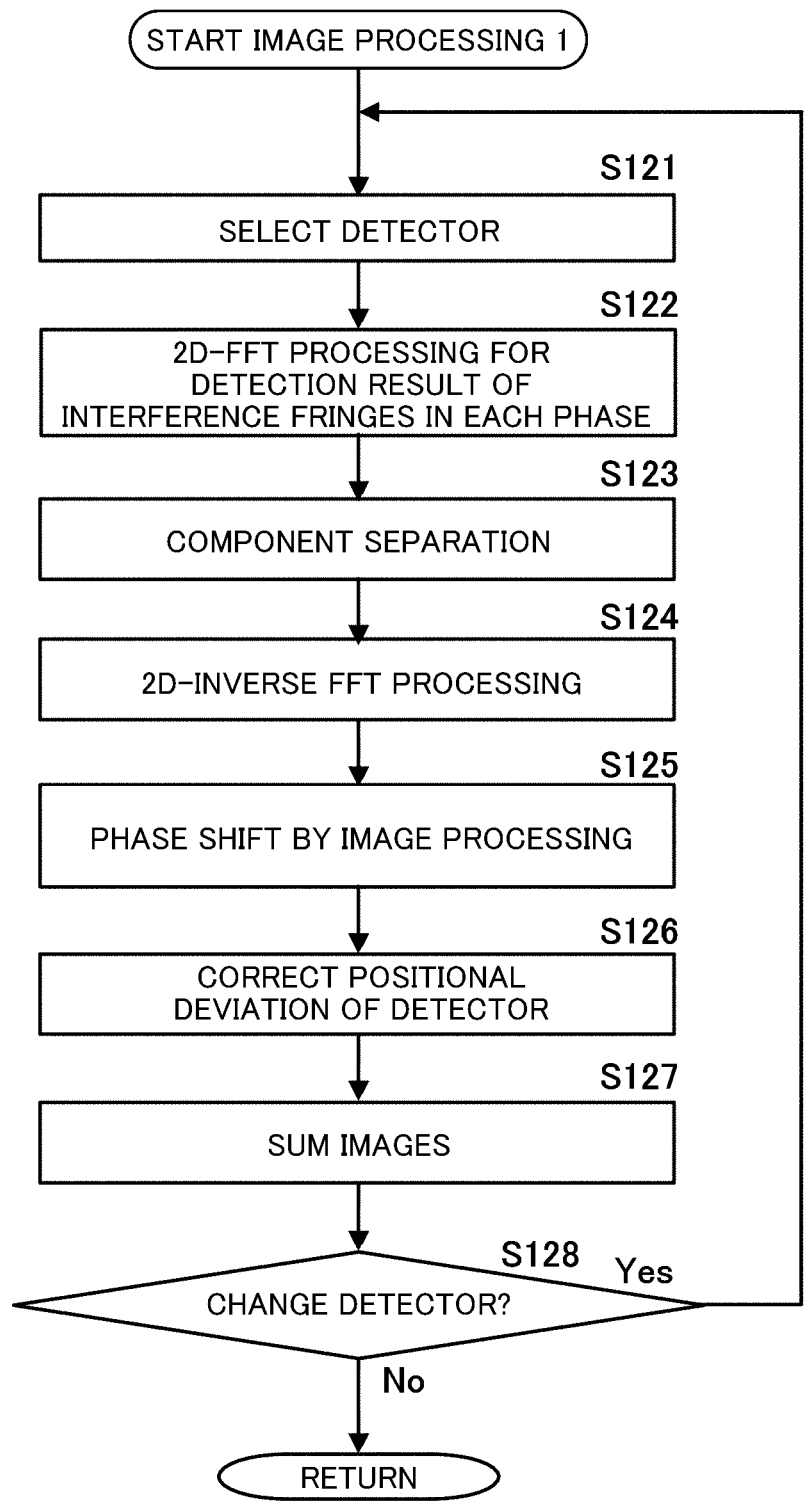

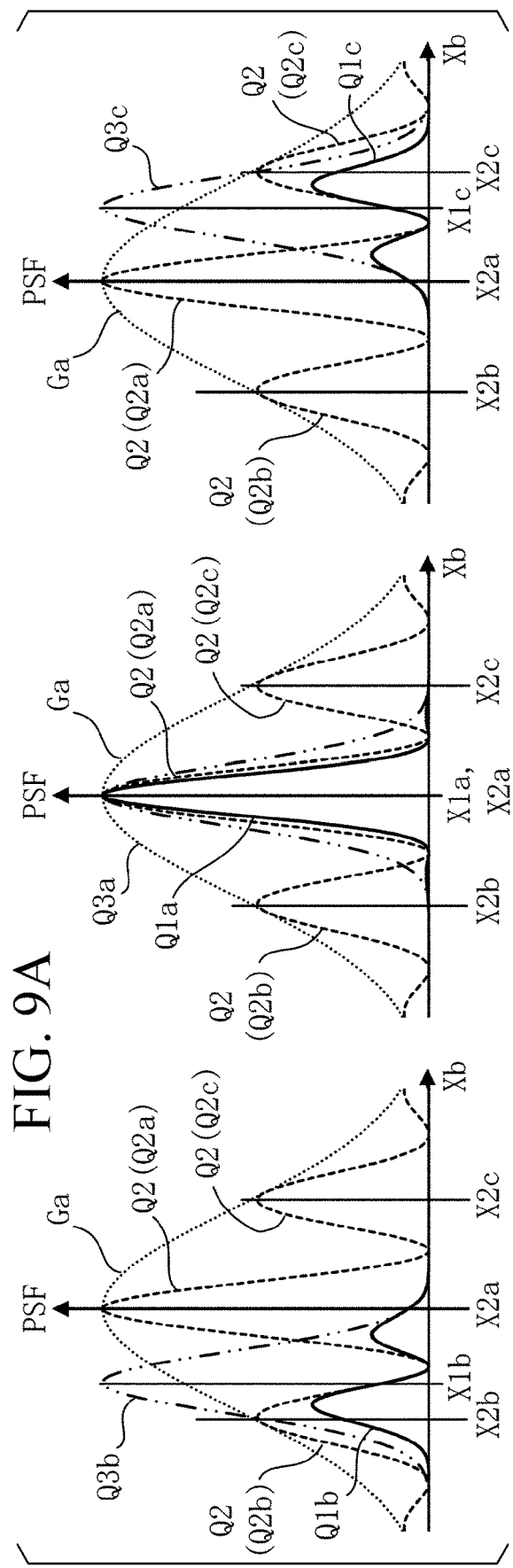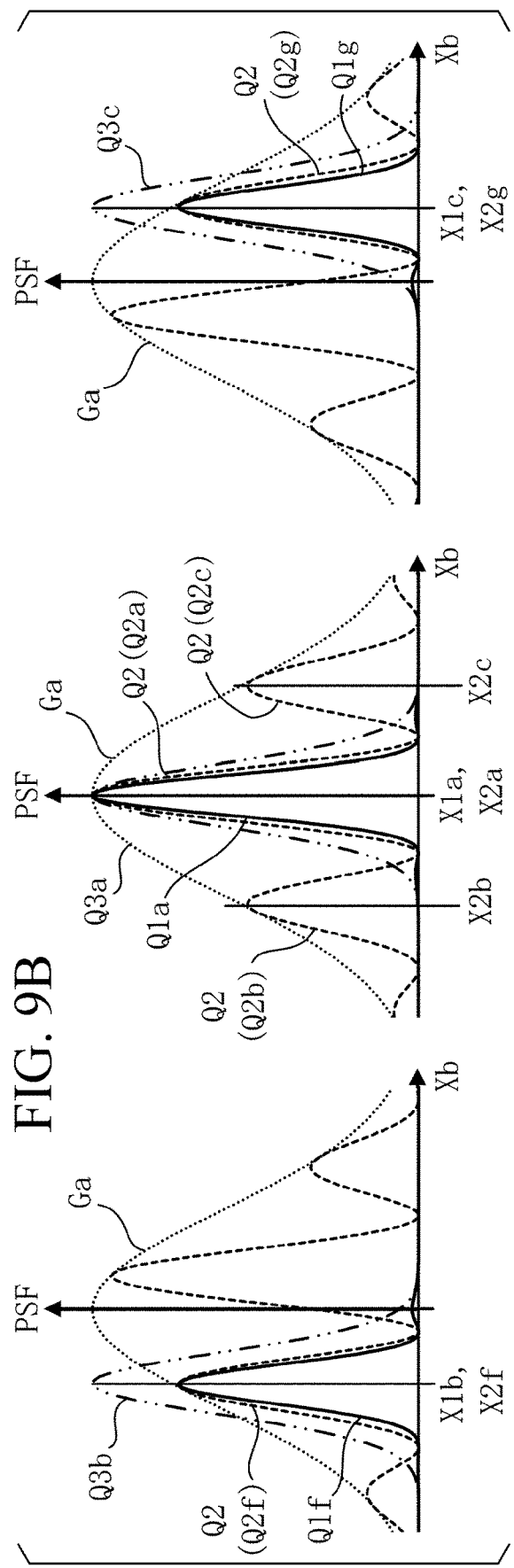
FIG. 9A
FIG. 9B

MICROSCOPE

CROSS-REFERENCE TO RELATED APPLICATION

Priority is claimed on International Patent Application No. PCT/JP2019/008966, filed on Mar. 6, 2019. This application is a continuation application of International Patent Application No. PCT/JP2019/008966, filed on Mar. 6, 2019. The contents of these applications are incorporated herein by reference.

BACKGROUND

Technical Field

The present invention relates to a microscope.

A scanning type microscope that detects fluorescence from a specimen has been proposed (see, for example, Confocal laser scanning microscopy with spatiotemporal structured illumination, Peng Gao, G. Ulrich Nienhaus, Optics Letters, Vol. 41, No. 6, 1193-1196, 2016.3.15).

SUMMARY

A microscope of the present invention includes an illumination optical system that is configured to irradiate a specimen disposed at a specimen plane with light and that is configured to form fringe illumination which is fringe-shaped illumination; a scanning part that is configured to perform a scanning with a relative movement between the fringe illumination and the specimen; a phase modulation element that is configured to set the fringe illumination to a plurality of phase states; a detection optical system on which light from the specimen enters; a detection device that includes a plurality of detectors detecting the light from the specimen via the detection optical system; and an image processor that is configured to generate an output image by using detection results of predetermined two or more detectors among the plurality of detectors of the detection device, wherein the image processor is configured to use the detection results of each of the predetermined two or more detectors to generate at least a first image, which is detected when the fringe illumination is in a first phase state, and a second image, which is detected when the fringe illumination is in a second phase state, for each detector, to generate an intermediate image for each detector by correcting the first image and the second image of each of the detectors on the basis of a position of corresponding detector, a period of the fringe illumination, the first phase, and the second phase, and to generate the output image from the plurality of intermediate images.

BRIEF DESCRIPTION OF THE DRAWINGS

FIG. 8 is a flowchart showing an example of image processing in the first embodiment.

FIG. 9A is a view illustrating an effective PSF at each position of a detection device of the first embodiment.

FIG. 9B is a view illustrating an effective PSF at each position of a detection device of the first embodiment.

DESCRIPTION OF THE EMBODIMENTS (First Embodiment of Microscope)

Figure 1:
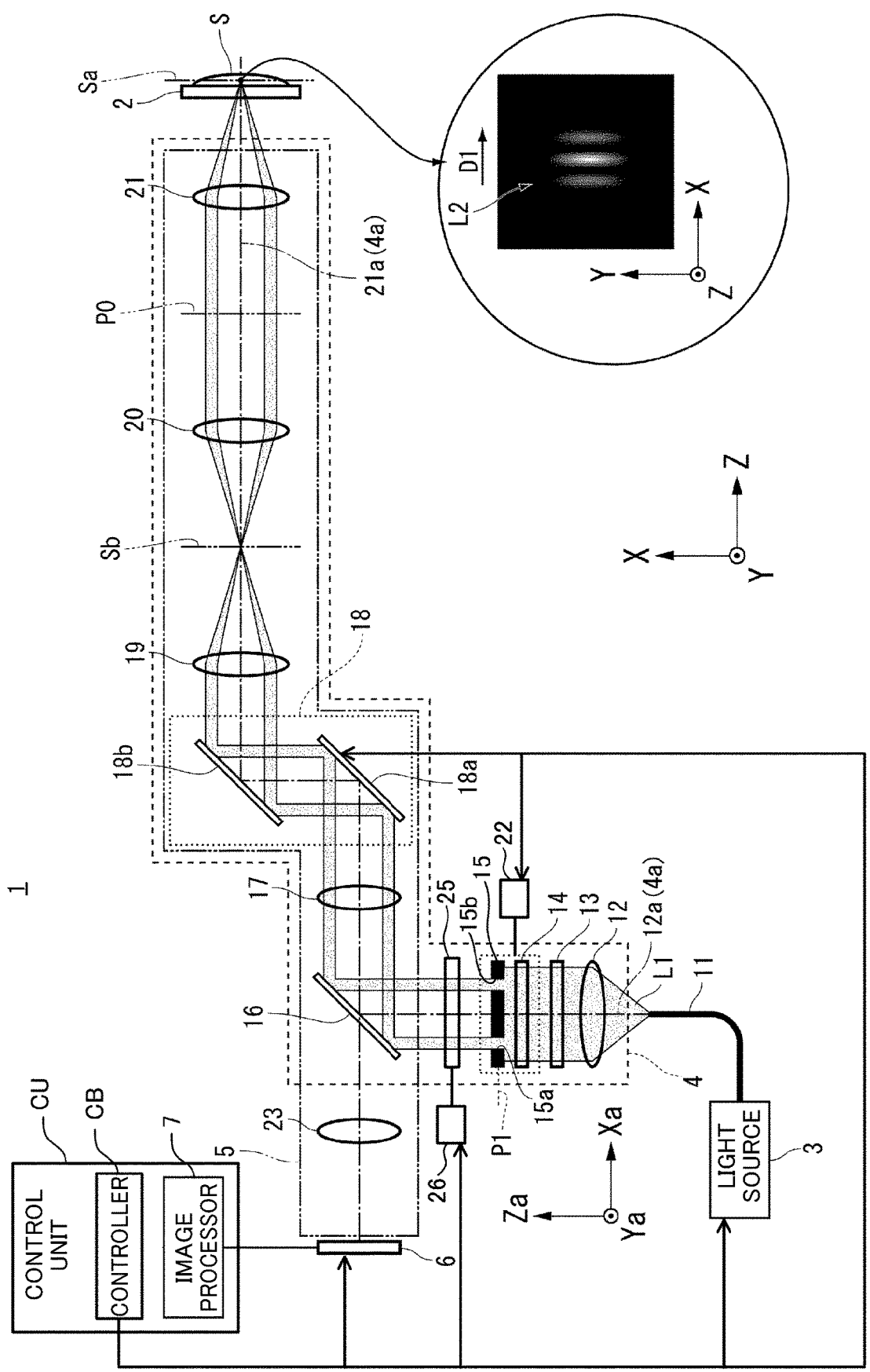
FIG. 1 is a view illustrating a microscope and an optical path of excitation light in a first embodiment.

A first embodiment of a microscope will be described. FIG. 1 is a view illustrating a microscope of the first embodiment and an optical path of excitation light. In the following embodiments, a microscope 1 will be described as being a scanning type fluorescence microscope, but the microscope of the first embodiment is not limited to a scanning type microscope or a fluorescence microscope. The microscope 1 includes a stage 2, a light source 3, an illumination optical system 4, a detection optical system 5, and a detection device 6. The microscope 1 further includes a control unit CU having a controller CB and an image processor 7. The microscope 1 operates roughly as follows.

The stage 2 holds a specimen S as observing target. The specimen S is a cell or the like that has been fluorescently stained in advance. The specimen S contains a fluorescent substance such as a fluorescent dye. The light source 3 emits excitation light L1 that excites the fluorescent substance contained in the specimen S. The illumination optical system 4 forms interference fringes L2 and scans the specimen S with the interference fringes L2 in a plurality of directions (for example, X direction and Y direction), at a plurality of phase states of the light-and-dark phase of the interference fringes L2. The stage 2 can move relative positions of the specimen S and the illumination optical system 4 in the X direction and the Y direction shown in FIG. 1 in a wider range than a scanning range of the interference fringes L2 by the illumination optical system 4.

The detection optical system 5 is disposed at a position on which fluorescence L3 (to be illustrated later in FIG. 6) from the specimen S enters. The detection device 6 includes a plurality of detectors 6a (to be illustrated later in FIG. 6) that detect the fluorescence L3 from the specimen S via the detection optical system 5. The image processor 7 generates an output image (for example, a super-resolution image) using detection results of two or more detectors 6a of the detection device 6. Hereinafter, each part of the microscope 1 will be described.

The light source 3 includes a light source such as, for example, a laser element. The light source 3 generates coherent light in a predetermined wavelength band. The predetermined wavelength band is set to a wavelength band including an excitation wavelength of the specimen S. The excitation light L1 emitted from the light source 3 is, for example, linearly polarized light. A light guide member such as an optical fiber 11 is connected to an emission port of the light source 3. Further, the microscope 1 may not include the light source 3, and the light source 3 may be provided separately from the microscope 1. For example, the light source 3 may be provided to the microscope 1 to be replaceable (attachable and removable). The light source 3 may be externally attached to the microscope 1 at the time of observation by the microscope 1.

The illumination optical system 4 is disposed at a position on which the excitation light L1 from the light source 3 is incident. The excitation light L1 enters the illumination optical system 4 from the light source 3 via the optical fiber 11. The optical fiber 11 may be a part of the illumination optical system 4 or a part of a light source device including the light source 3. The illumination optical system 4 includes a collimator lens 12, a λ/4 wavelength plate 13, a polarizer 14, a mask 15 (opening member), a phase modulation element 25, a dichroic mirror 16, a relay optical system 17, an optical path changing part 18, a lens 19, a lens 20, and an objective lens 21 in that order from the light source 3 side toward the specimen S side.

In the following description, an XYZ orthogonal coordinate system illustrated in FIG. 1 or the like will be referred to as appropriate. In the XYZ orthogonal coordinate system, the X direction and the Y direction are directions perpendicular to an optical axis 21a of the objective lens 21. Also, the Z direction is a direction parallel to the optical axis 21a of the objective lens 21. Further, the optical axis 21a of the objective lens 21 coincides with an optical axis 4a of the illumination optical system 4. Also, in each of the X direction, the Y direction, and the Z direction, the same side as the arrow is referred to as a + side (for example, +X side), and a side opposite to the arrow is referred to as a – side (for example, –X side) as appropriate. Also, when an optical path is bent due to reflection, directions corresponding to the X direction, the Y direction, and the Z direction will be each denoted by adding a suffix. For example, an Xa direction, a Ya direction, and a Za direction in FIG. 1 are directions corresponding to the X direction, the Y direction, and the Z direction in the optical path from the collimator lens 12 to the dichroic mirror 16.

The collimator lens 12 converts the excitation light L1 emitted from the optical fiber 11 into parallel light. The collimator lens 12 is disposed so that, for example, a focal point thereof on the same side as the light source 3 coincides with the light emission port of the optical fiber 11. In the following description, for lenses included in the illumination optical system 4, a focal point on the same side as the light source 3 will be referred to as a back focal point, and a focal point on the same side as the specimen S will be referred to as a front focal point as appropriate.

The λ/4 wavelength plate 13 converts a polarization state of the excitation light L1 into circularly polarized light. The polarizer 14 is, for example, a polarizing plate, and has a characteristic that linearly polarized light in a predetermined polarization direction is transmitted. The polarizer 14 is disposed so that light incident on the specimen S becomes S-polarized light (linearly polarized light in the Y direction). The polarizer 14 is rotatable around an optical axis 12a of the collimator lens 12. The optical axis 12a of the collimator lens 12 coincides with the optical axis 4a of the illumination optical system 4.

The mask 15 is a luminous flux splitting part that splits the excitation light exciting the fluorescent substance into a plurality of luminous fluxes. The illumination optical system 4 scans the specimen S using the interference fringes L2 generated by interference of two or more luminous fluxes among the plurality of luminous fluxes split by the mask 15.

The mask 15 is disposed at or in the vicinity of a position of a pupil conjugate plane P1 that is optically conjugate with a pupil plane P0 of the objective lens 21. The "vicinity of the pupil conjugate plane that is optically conjugate with the pupil plane P0 of the objective lens 21" is a range in which the excitation light L1 can be regarded as parallel rays in a region including the pupil conjugate plane. For example, when the excitation light L1 is a Gaussian beam, if the excitation light L1 is within 1/10 of the Rayleigh length from a position of a beam waist, it can be sufficiently regarded as parallel rays. The Rayleigh length is given by $\pi w_0^2/\lambda$ when a wavelength of the excitation light L1 is $\lambda$ and a beam waist radius is $w_0$. For example, when the wavelength of the excitation light L1 is 1 um and the beam waist radius is 1 mm, the Rayleigh length is about 3 m, and the mask 15 may be disposed within 300 mm in the vicinity of the pupil conjugate plane P1 that is optically conjugate with the pupil plane P0 of the objective lens 21. The mask 15 may be disposed at or in the vicinity of the pupil plane P0.

The mask 15 has an opening 15a and an opening 15b through which the excitation light L1 passes. The interference fringes L2 are formed by interference between the excitation light L1a passing through the opening 15a and the excitation light L1b passing through the opening 15b. The mask 15 is rotatable around the optical axis 12a of the collimator lens 12. The mask 15 is fixed, for example, relative to the polarizer 14 and rotates integrally with the polarizer 14. The mask 15 and the polarizer 14 are rotated by a torque supplied from a mask driver 22.

Figure 2A:
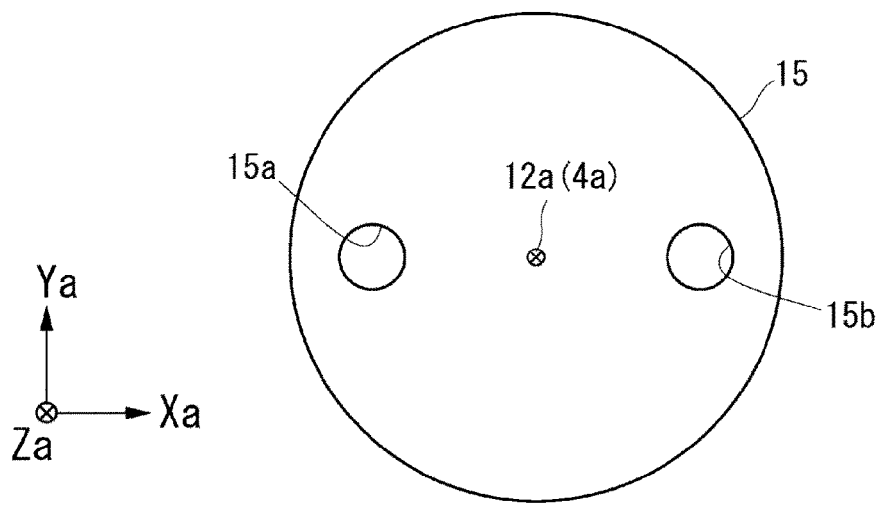
FIG. 2A is a view illustrating a mask in the first embodiment.
Figure 2B:
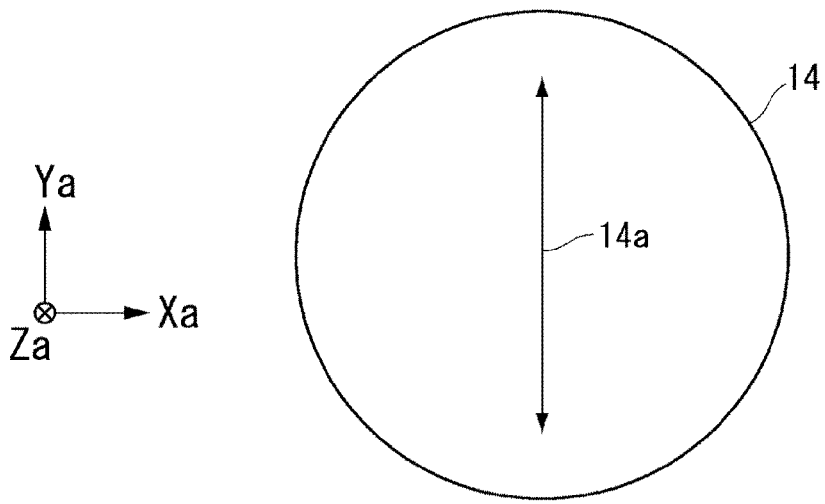
FIG. 2B is a view illustrating a polarizer in the first embodiment.
Figure 2C:
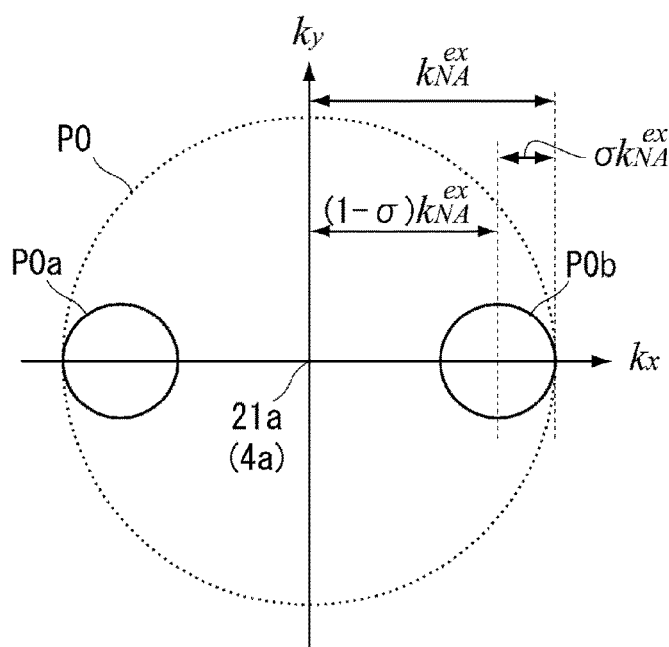
FIG. 2C is a view illustrating a pupil plane of objective lens in the first embodiment.

FIG. 2A is a view illustrating the mask of the first embodiment. The opening 15a and the opening 15b of the mask 15 are symmetrically disposed with respect to the optical axis 12a of the collimator lens 12 (see FIG. 1). In the state of FIG. 2A, the opening 15a and 15b are aligned in the Xa direction. FIG. 2B is a view illustrating the polarizer of the first embodiment. A transmission axis 14a of the polarizer 14 is set to be parallel to a direction (Ya direction in FIG. 2B) perpendicular to the direction (Xa direction in FIG. 2A) in which the opening 15a and the opening 15b are aligned in the mask 15. FIG. 2C is a view illustrating the pupil plane P0 of the objective lens 21. Reference signs P0a and P0b are regions on which the excitation light L1 is incident. Parameters illustrated in FIG. 2C will be referred to later in description of the image processor 7.

The phase modulation element 25 is a glass plate having substantially a disc shape as an example and is rotatable around the optical axis 4a by a torque supplied from a phase modulation element drive part 26.

Figure 4A:
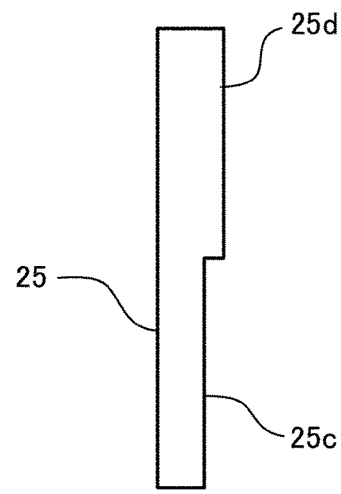
FIG. 4A is a view illustrating a phase modulation element in the first embodiment.
Figure 4B:
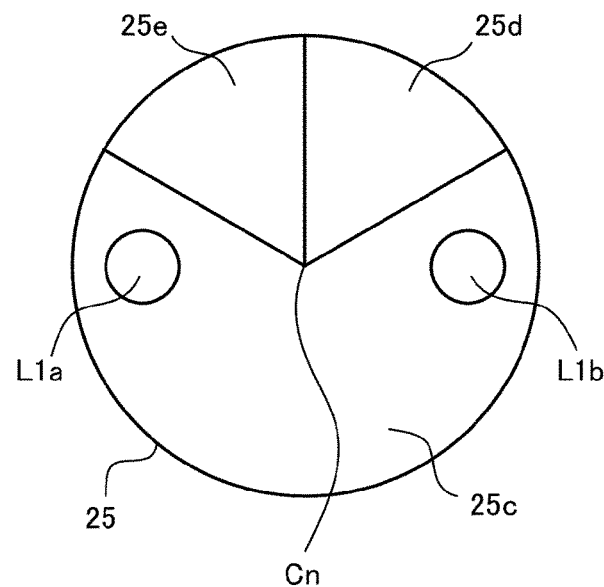
FIG. 4B is a view illustrating a phase modulation element in the first embodiment.
Figure 4C:
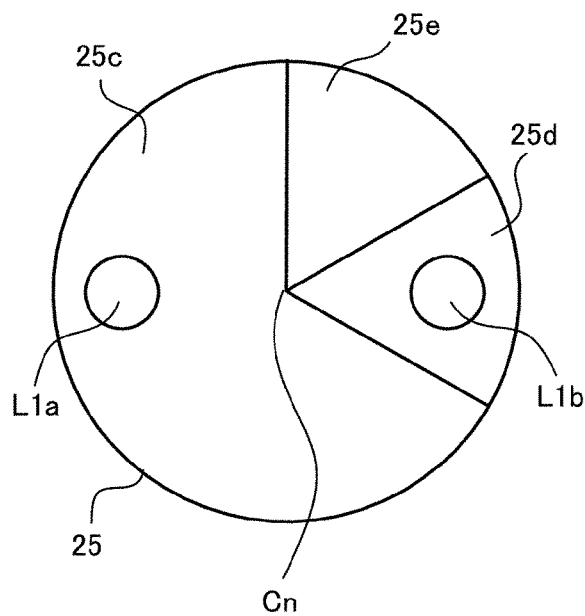
FIG. 4C is a view illustrating a phase modulation element in the first embodiment.
Figure 4D:
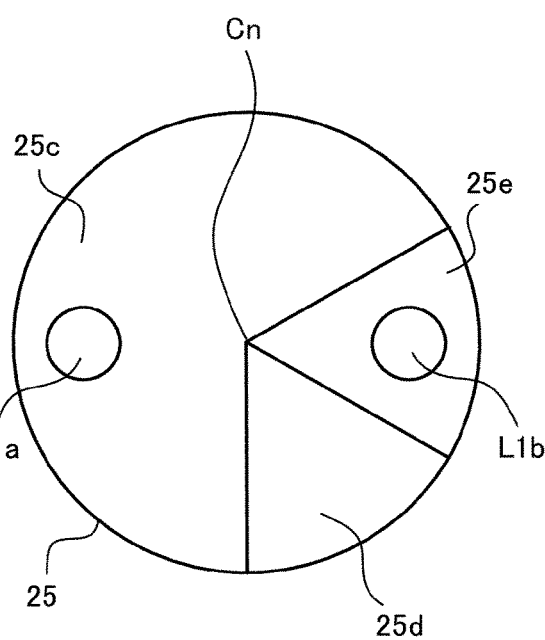
FIG. 4D is a view illustrating a phase modulation element in the first embodiment.

FIGS. 4A to 4D are views illustrating an example of the phase modulation element 25. FIG. 4A is a view of the phase modulation element 25 viewed from a direction perpendicular to the Za direction of FIG. 1 (for example, the Xa direction). FIGS. 4B to 4D are views of the phase modulation element 25 viewed from the Za direction of FIG. 1 and illustrate states in which one phase modulation element 25 has been rotated by different angles from each other while having a center Cn as a center. The phase modulation element 25 is disposed so that the center Cn substantially coincides with the optical axis 4a of the illumination optical system 4 of FIG. 1.

A thickness of the substantially disc-shaped phase modulation element 25 is different in a region 25c, a region 25d, and a region 25e, and this provides a phase difference between the luminous fluxes transmitted through the regions.

In a case of the phase modulation element 25 having a rotation angle illustrated in FIG. 4B, since the excitation light L1a that has passed through the opening 15a and the excitation light L1b that has passed through the opening 15b are both transmitted through the region 25c, no phase difference is added between the excitation light L1a and the excitation light L1b.

However, in a case of the phase modulation element 25 having a rotation angle illustrated in FIG. 4C, since the excitation light L1a is transmitted through the region 25c and the excitation light L1b is transmitted through the region 25d, a predetermined first phase difference (for example, $2\pi/3$ [rad]) is added between the excitation light L1a and the excitation light L1b.

Also, in a case of the phase modulation element 25 having a rotation angle illustrated in FIG. 4D, since the excitation light L1a is transmitted through the region 25c and the excitation light L1b is transmitted through the region 25e, a predetermined second phase difference (for example, $4\pi/3$ [rad]) is added between the excitation light L1a and the excitation light L1b.

Therefore, when the rotation angle of the phase modulation element 25 is sequentially changed from the state of FIG. 4B to the states of FIGS. 4C and 4D, a phase difference between the excitation light L1a and the excitation light L1b can be sequentially changed, and the light-and-dark phase of the interference fringes L2 can be changed.

Further, in the above-described example, no phase difference has been added between the excitation light L1a and the excitation light L1b at the rotation angle of the phase modulation element 25 illustrated in FIG. 4B. However, the present invention is not limited thereto, and a configuration in which a phase difference having different value from each other is added between the excitation light L1a and the excitation light L1b at any of the three rotation angles may be employed. Also in this case, the phase differences added between the excitation light L1a and the excitation light L1b can be made to differ from each other by $2\pi/3$ [rad] as an example at the above-described three rotation angles.

Further, the phase differences added between the excitation light L1a and the excitation light L1b need not necessarily differ by $2\pi/3$ [rad] at the above-described three rotation angles.

Also, the regions 25c to 25e of the phase modulation element 25 are not limited to one in which the thickness of the phase modulation element 25 itself is made different for each region as described above, and may be one in which thin films having predetermined thicknesses are formed on at least two regions of a glass disc having a uniform thickness.

Returning to the description of FIG. 1, the dichroic mirror 16 has a characteristic in which the excitation light L1 is reflected and the fluorescence L3 (to be illustrated later in FIG. 6) from the specimen S is transmitted therethrough. The excitation light L1 that has passed through the opening 15a and the opening 15b of the mask 15 and the phase modulation element 25 is reflected by the dichroic mirror 16 to bend the optical path and then is incident on the relay optical system 17. The relay optical system 17 guides the excitation light L1 from the dichroic mirror 16 to the optical path changing part 18. The relay optical system 17 is represented by one lens in the drawing, but the number of lenses included in the relay optical system 17 is not limited to one. Also, the relay optical system 17 need not necessarily depend on a distance in the optical system or the like. Further, in each figure, there are cases in which two or more lenses are represented by one lens for a portion other than the relay optical system 17.

The optical path changing part 18 causes the interference fringes L2 of the excitation light L1 to scan on the specimen S in the two directions of the X direction and the Y direction. That is, the optical path changing part 18 constitutes a scanning part that changes a position at which the interference fringes L2 are formed by the excitation light L1 relative to a specimen plane Sa in two directions intersecting the optical axis 21a of the objective lens 21 (in-plane direction of the specimen plane Sa). The optical path changing part 18 includes a deflecting mirror 18a and a deflecting mirror 18b. The deflecting mirror 18a and the deflecting mirror 18b have inclinations which are variable with respect to the optical path of the excitation light L1. The deflecting mirror 18a and the deflecting mirror 18b are each a galvanometer mirror, a MEMS mirror, a resonant mirror (resonant mirror), or the like. The deflecting mirror 18a and the deflecting mirror 18b may be scanners.

The deflecting mirror 18a changes a position of the specimen S on which the excitation light L1 is incident in the X direction. The deflecting mirror 18b changes a position of the specimen S on which the excitation light L1 is incident in the Y direction. The optical path changing part 18 is disposed such that, for example, a position that is conjugate with the pupil plane P0 of the objective lens 21 is located at a position of the deflecting mirror 18a, a position of the deflecting mirror 18b, or a position between the deflecting mirror 18a and the deflecting mirror 18b. Further, the optical path changing part 18 may be configured such that a position of the specimen S on which the excitation light L1 is incident is changed in the Y direction by the deflecting mirror 18a and changed in the X direction by the deflecting mirror 18b.

The excitation light L1 from the optical path changing part 18 is incident on the lens 19. The lens 19 focuses the excitation light L1 on a specimen conjugate plane Sb that is optically conjugate with the specimen plane Sa with respect to the objective lens 21 and the lens 20. The specimen plane Sa is a plane disposed at a position or in the vicinity of the front focal point of the objective lens 21 and perpendicular to the optical axis 21a of the objective lens 21. The interference fringes L2 are formed on the specimen conjugate plane Sb by interference between the excitation light L1a that has passed through the opening 15a of the mask 15 and the excitation light L1b that has passed through the opening 15b.

The excitation light L1 that has passed through the specimen conjugate plane Sb is incident on the lens 20. The lens 20 converts the excitation light L1 into parallel light. The excitation light L1 that has passed through the lens 20 passes through the pupil plane P0 of the objective lens 21. The objective lens 21 focuses the excitation light L1 on the specimen plane Sa. The lens 20 and the objective lens 21 project the interference fringes formed on the specimen conjugate plane Sb onto the specimen plane Sa. The interference fringes L2 are locally formed on the specimen plane Sa.

The interference fringes L2 includes a light portion having a relatively high light intensity and a dark portion having a relatively low light intensity. A direction in which the light portion and the dark portion are aligned (the X direction in FIG. 1) is referred to as a periodic direction D1 of the interference fringes L2 as appropriate. The periodic direction D1 of the interference fringes L2 corresponds to the direction in which the opening 15a and the opening 15b of the mask 15 are aligned (the Xa direction in FIG. 1). When the mask driver 22 rotates the mask 15 around the Za direction, the direction in which the opening 15a and the opening 15b are aligned is rotated, and the periodic direction D1 of the interference fringes L2 is rotated around the Z direction. That is, the mask driver 22 is included in a fringe direction changing part that changes a direction of the interference fringes L2. The mask driver 22 (the fringe direction changing part) changes a direction in which two or more light fluxes are aligned (hereinafter, referred to as a luminous flux splitting direction) on a plane perpendicular to the optical axis 4a of the illumination optical system 4 (for example, a plane on a light emission side of the mask 15). The luminous flux splitting direction described above is, for example, the direction in which the opening 15a and the opening 15b are aligned, and the mask driver 22 changes the luminous flux splitting direction by rotating the mask 15.

Also, when the mask 15 rotates around the Za direction, a direction in which the excitation light L1 is incident on the specimen S changes. The mask driver 22 changes a direction of the transmission axis of the polarizer 14 by rotating the polarizer 14 in conjunction with the mask 15 to adjust the excitation light L1 to be incident on the specimen S as S-polarized light. That is, the polarizer 14 and the mask driver 22 are included in a polarization adjusting part that adjusts a polarization state of the excitation light L1 on the basis of the direction of the interference fringes L2.

Figure 3A:
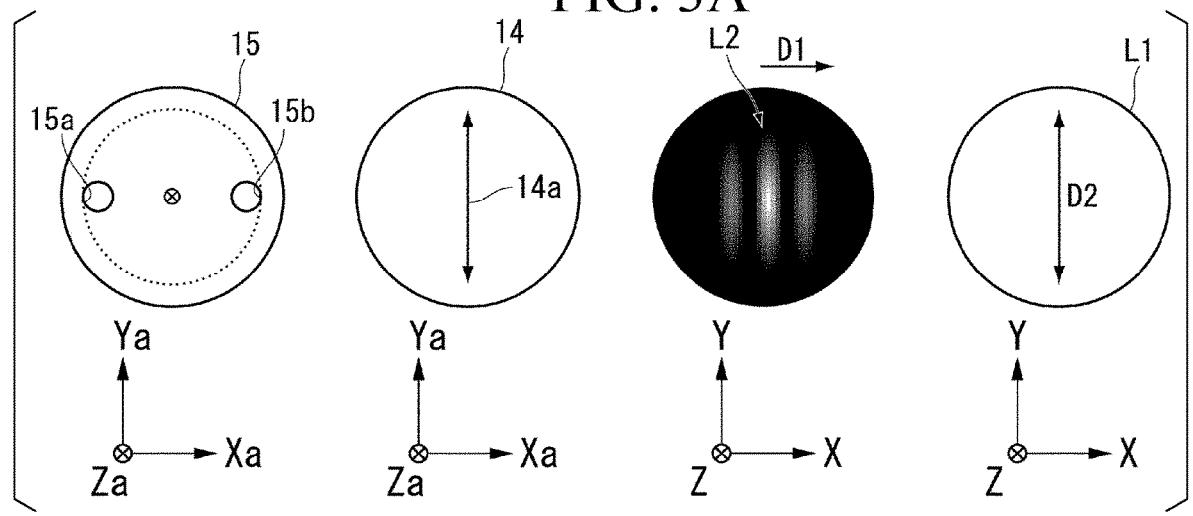
FIG. 3A is a view illustrating the mask, the polarizer, interference fringes, and polarization states of excitation light in the first embodiment.
Figure 3B:
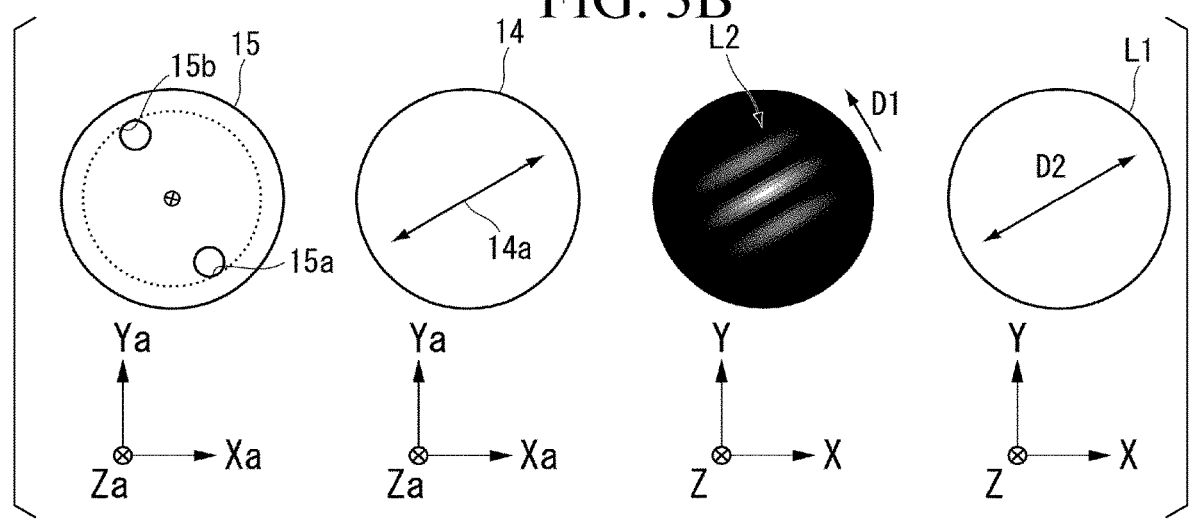
FIG. 3B is a view illustrating the mask, the polarizer, interference fringes, and polarization states of excitation light in the first embodiment.
Figure 3C:
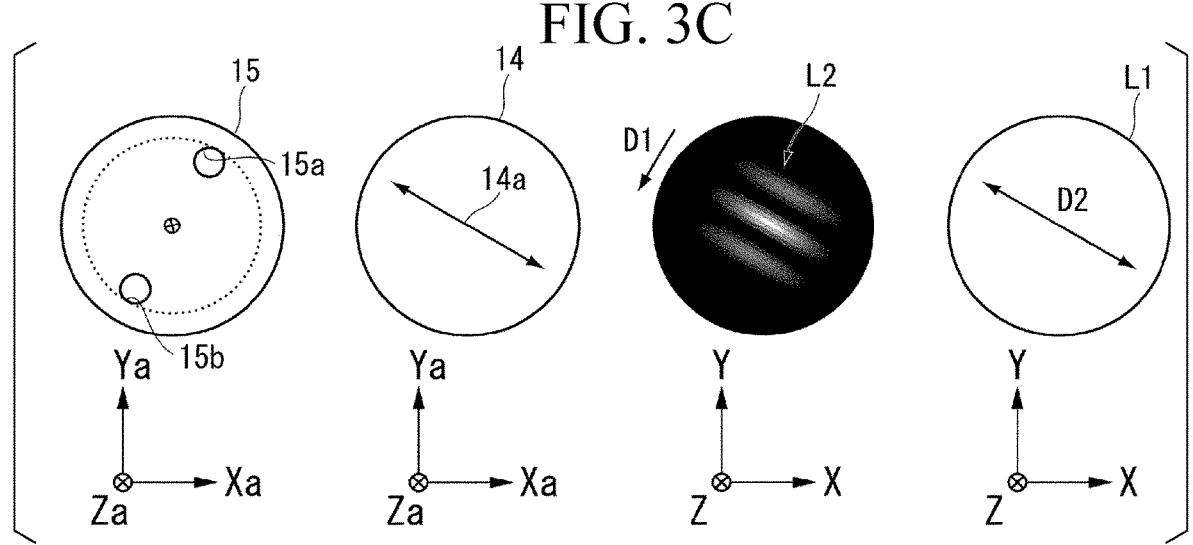
FIG. 3C is a view illustrating the mask, the polarizer, interference fringes, and polarization states of excitation light in the first embodiment.

FIGS. 3A to 3C are views illustrating the mask, the polarizer, the interference fringes, and the polarization states of the excitation light in the first embodiment. In FIG. 3A, the direction in which the opening 15a and the opening 15b of the mask 15 are aligned is in the Xa direction. The transmission axis 14a of the polarizer 14 is in the Ya direction perpendicular to the Xa direction. In this case, a luminous flux that has passed through the opening 15a and a luminous flux that has passed through the opening 15b are incident on the specimen S, and thereby the excitation light L1 (see FIG. 1) generates the interference fringes L2 in the periodic direction D1. An incident plane of the excitation light L1 is parallel to an XZ plane. The excitation light L1 when it is incident on the specimen S has its polarization direction D2 in the Y direction perpendicular to the incident plane, that is, the excitation light L1 is incident on the specimen S as S-polarized light.

In FIG. 3B, the direction in which the opening 15a and the opening 15b of the mask 15 are aligned is a direction in which the Xa direction is rotated counterclockwise by 120°. The transmission axis 14a of the polarizer 14 is a direction in which the Ya direction is rotated counterclockwise by 120°. The periodic direction of the interference fringes L2 is a direction rotated by 120° counterclockwise with respect to the X direction. The incident plane of the excitation light L1 is a plane in which the XZ plane is rotated by 120° around the Z direction. The excitation light L1 when it is incident on the specimen S has its polarization direction D2 perpendicular to the incident plane, that is, the excitation light L1 is incident on the specimen S as S-polarized light.

In FIG. 3C, the direction in which the opening 15a and the opening 15b of the mask 15 are aligned is a direction in which the Xa direction is rotated counterclockwise by 240°. The transmission axis 14a of the polarizer 14 is a direction in which the Ya direction is rotated counterclockwise by 240°. The periodic direction D1 of the interference fringes L2 is a direction rotated by 240° counterclockwise with respect to the X direction. The incident plane of the excitation light L1 is a plane in which the XZ plane is rotated by 240° around the Z direction. The excitation light L1 when it is incident on the specimen S has its polarization direction D2 perpendicular to the incident plane, that is, the excitation light L1 is incident on the specimen S as S-polarized light.

When the excitation light L1 is incident on the specimen plane Sa as S-polarized light as described above, a contrast of the interference fringes L2 is high compared to when it is incident as P-polarized light. Further, in FIGS. 3A to 3C, the periodic direction of the interference fringes L2 is changed in three ways at intervals of 120°, but the periodic direction of the interference fringes L2 is not limited to this example. The periodic direction of the interference fringes L2 corresponds to a direction in which a resolution can be improved (a direction in which a super-resolution effect can be obtained) in an output image generated by the image processor 7 to be described later. The periodic direction of the interference fringes L2 is appropriately set to obtain a desired super-resolution effect. For example, the periodic direction of the interference fringes L2 may be two ways that are at an angle of 90° therebetween or may be one way. Also, the mask 15 may be replaceable in accordance with a magnification of the objective lens 21, NA (numerical aperture), and a shape of an illumination pupil.

Further, positions of the excitation light L1a and the excitation light L1b with respect to the phase modulation element 25 illustrated in FIGS. 4A to 4C are rotated about the optical axis 12a (the center Cn of the phase modulation element 25) by rotation of the mask 15. Therefore, when the mask 15 is rotated, the above-described three states of the rotation angle of the phase modulation element 25 are also rotated about the center Cn as a center by the same angle as the mask 15 by the phase modulation element drive part 26.

When the rotation angle of the phase modulation element 25 is set and a predetermined phase difference between the excitation light L1a and the excitation light L1b is set, the light-and-dark phase of the interference fringes L2 formed on the specimen plane Sa changes according to the phase difference between the excitation light L1a and the excitation light L1b.

Figure 5A:
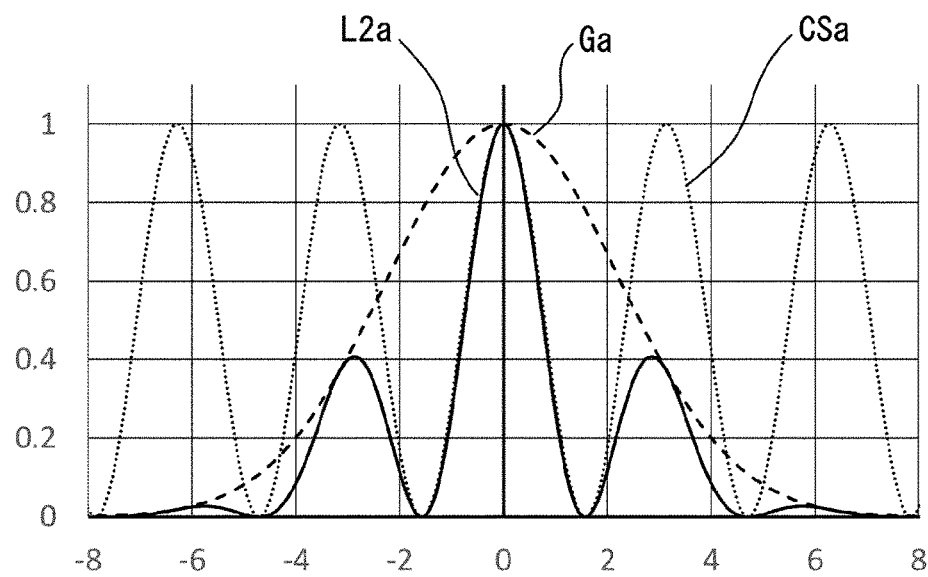
FIG. 5A is a view illustrating a plurality of phase states of the interference fringes.
Figure 5B:
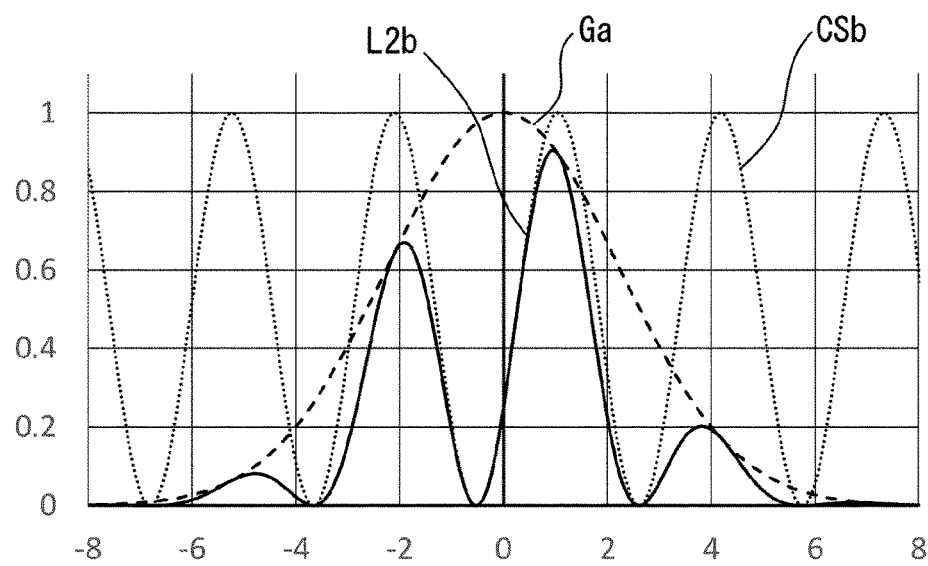
FIG. 5B is a view illustrating a plurality of phase states of the interference fringes.
Figure 5C:
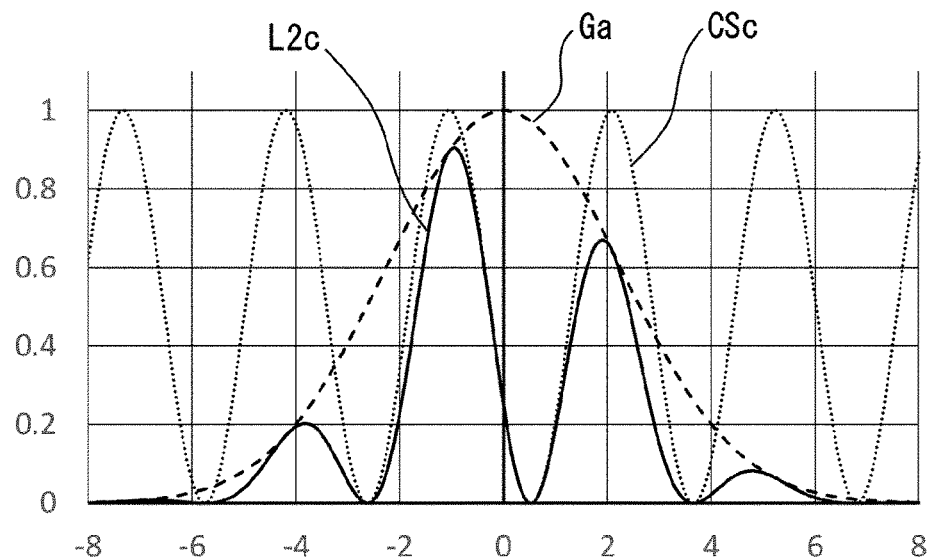
FIG. 5C is a view illustrating a plurality of phase states of the interference fringes.

FIGS. 5A to 5C are views illustrating a plurality of phase states of the interference fringes L2. FIG. 5A is a view illustrating a phase state of the interference fringes L2a when the phase difference between the excitation light L1a and the excitation light L1b is 0. FIG. 5B is a view illustrating a phase state of the interference fringes L2b when the phase difference between the excitation light L1a and the excitation light L1b is $2\pi/3$ [rad]. FIG. 5C is a view illustrating a phase state of interference fringes L2c when the phase difference between the excitation light L1a and the excitation light L1b is $4\pi/3$ [rad].

In each of the figures of FIGS. 5A to 5C, a distribution illustrated by a broken line is an envelope (envelope curve) Ga representing an outer shape of the interference fringes L2, a shape thereof is a Gaussian distribution as an example, and a width thereof is determined by diameters of the excitation light L1a and the excitation light L1b illustrated in FIGS. 2A to 2C or the like. On the other hand, distributions CSa, CSb, and CSc illustrated by dotted lines each indicate square of a COS function with respect to a position on the horizontal axis (hereinafter referred to as a COS square distribution), and a phase thereof (a position in a left-right direction in the figure) is determined by a phase difference formed between the excitation light L1a and the excitation light L1b. Then, a light intensity distribution (L2a, L2b, L2c) of the interference fringes L2 in each of FIGS. 5A to 5C is represented by a product of the envelope Ga and the COS square distribution CSa, CSb, or CSc.

Even if the phase difference formed between the excitation light L1a and the excitation light L1b is changed, the envelope Ga does not change, but phases of the COS square distributions CSa, CSb, and CSc change. As a result, a phase of change in light-and-dark of the interference fringes L2 (L2a, L2b, L2c), which is the product of them, also changes. Further, even if the phase difference between the excitation light L1a and the excitation light L1b is changed by the phase modulation element 25, the envelope (envelope curve) Ga of the interference fringes L2 does not change (move).

On the other hand, when a position of the interference fringes L2 is changed by the deflecting mirror 18a and the deflecting mirror 18b, since the envelope Ga and each of the COS square distribution CSa, CSb, and CSc move integrally by the same amount of movement, the envelope (envelope curve) of the interference fringes L2 also changes (moves).

Figure 6:
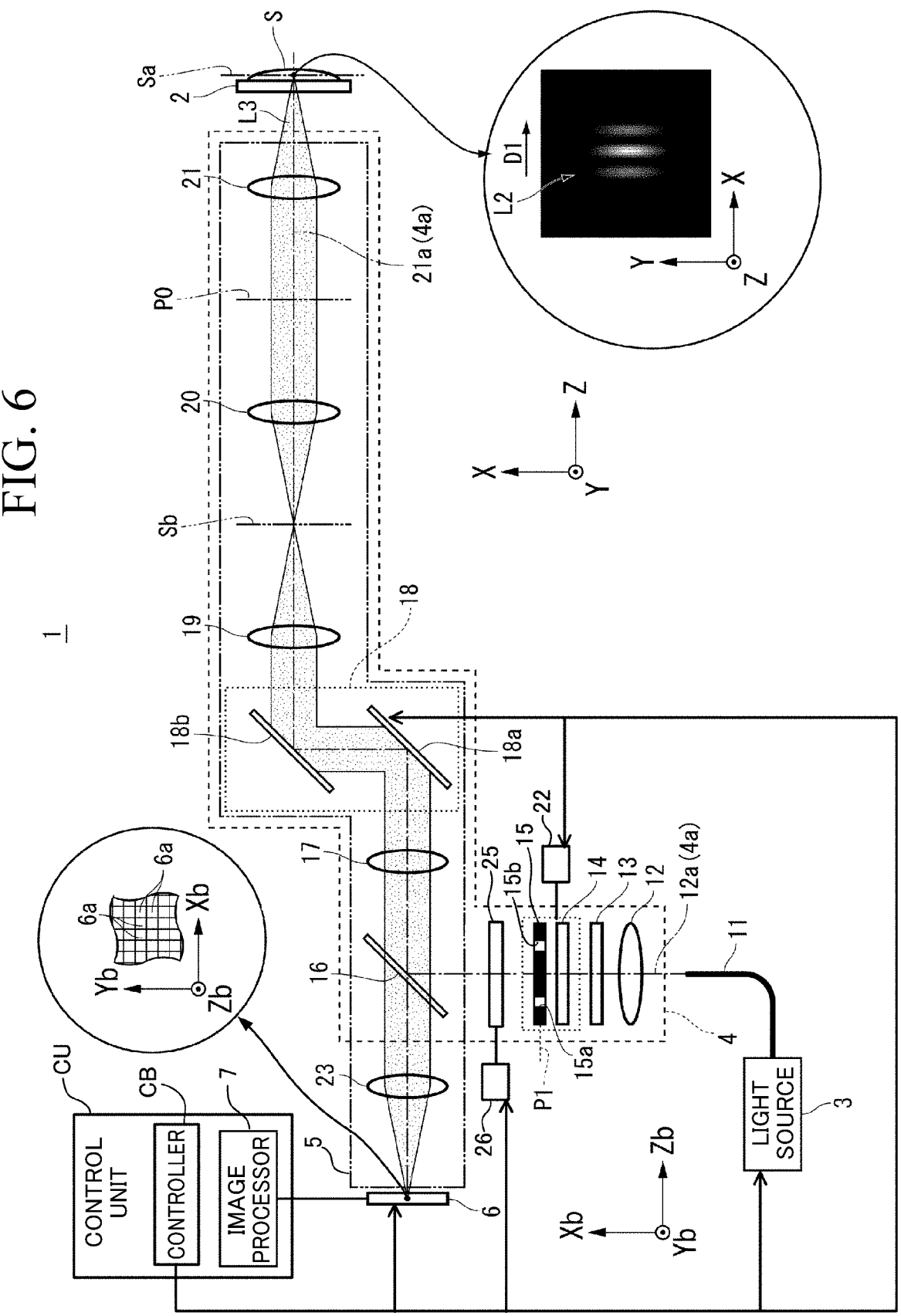
FIG. 6 is a view illustrating the microscope and an optical path of fluorescence in the first embodiment.

FIG. 6 is a view illustrating the microscope and an optical path of fluorescence in the first embodiment. The detection optical system 5 forms an image of the fluorescence L3 generated in the specimen S. The detection optical system 5 includes the objective lens 21, the lens 20, the lens 19, the optical path changing part 18, the relay optical system 17, the dichroic mirror 16, and a lens 23 in that order from the specimen S toward the detection device 6. The fluorescence L3 generated in the specimen S passes through the objective lens 21, the lens 20, and the lens 19 in that order and is incident on the optical path changing part 18. The fluorescence L3 is scanned by the optical path changing part 18, passes through the relay optical system 17, and is incident on the dichroic mirror 16. The dichroic mirror 16 has a characteristic in which the fluorescence L3 is transmitted. The fluorescence L3 transmitted through the dichroic mirror 16 is incident on the lens 23. The lens 23 focuses the fluorescence L3 on the detection device 6.

The detection device 6 is an image sensor and includes a plurality of detectors 6a disposed two-dimensionally. The plurality of detectors 6a are disposed in two directions of an Xb direction and a Yb direction. Each of the plurality of detectors 6a is a sensor cell, a pixel, a photodetector, or the like including a photoelectric conversion element such as a photodiode. Each of the plurality of detectors 6a can detect the fluorescence L3. The detector 6a corresponds to, for example, one pixel, but a detection region (light receiving region) including a plurality of pixels may be used as one detector 6a.

(Image Acquisition Flow)

Figure 7:
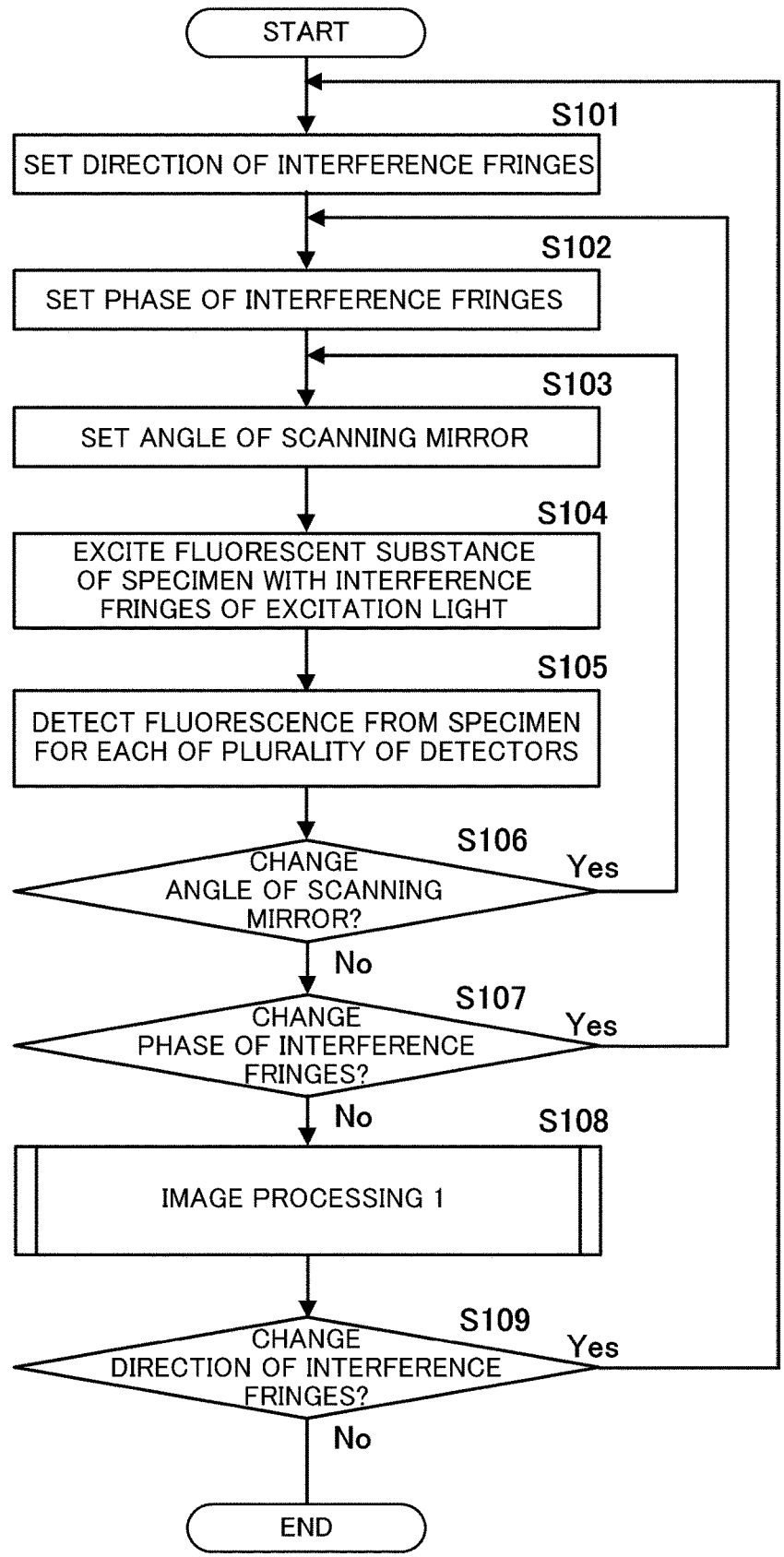
FIG. 7 is a flowchart showing an example of an image acquisition flow in the first embodiment.

Hereinafter, an example of an image acquisition flow in the microscope 1 of the first embodiment will be described with reference to FIG. 7.

In step S101, the controller CB of the microscope 1 drives the mask driver 22 to set the polarizer 14 and the mask 15 at a predetermined rotation angle and set the interference fringes L2 in a predetermined direction. In the following step S102, the controller CB drives the phase modulation element drive part 26 to set the phase modulation element 25 at a predetermined rotation angle and set a phase of the interference fringes L2 to a predetermined value.

In step S103, the controller CB sets the optical path changing part 18 (scanning mirrors 18X and 18Y) to a predetermined setting (angle), and in step S104, causes the specimen plane Sa to be irradiated with the interference fringes L2 at a predetermined position to excite the fluorescent substance of the specimen S with the interference fringes L2. Then, in step S105, the plurality of detectors 6a of the detection device 6 each detect the fluorescence L3 from the specimen S. Intensity information of the fluorescence L3 detected by the plurality of detectors 6a of the detection device 6, which is a two-dimensional image sensor, is transmitted to the image processor 7. Setting conditions of the optical path changing part 18 corresponding to a position of the interference fringes L2 on the specimen plane Sa, and information on a phase of the interference fringes L2 and a direction of the interference fringes L2 when the intensity information of the fluorescence L3 is acquired are also transmitted to the image processor 7.

In step S106, the controller CB determines whether or not the setting of the optical path changing part 18 (angles of the scanning mirrors 18X and 18Y) needs to be changed, and if scanning of a desired region on the specimen plane Sa has not been completed, the processing returns to step S103 and the setting of the optical path changing part 18 is changed to change the illumination region. The microscope 1 scans a desired region by repeating processing of detecting the fluorescence and processing of changing the illumination region and acquires a fluorescence intensity distribution (measured value of the detection device 6) in the desired region.

In step S106, when it is determined that the scanning of the desired region on the specimen plane Sa has been completed and change in setting of the optical path changing part 18 is not necessary, the processing proceeds to step S107. In step S107, it is determined whether or not a phase of the interference fringes L2 needs to be changed, and if the change is necessary, the processing returns to step S102 to change the phase of the interference fringes L2, that is, the rotation angle of the phase modulation element 25, and then step S103 and subsequent steps are executed again.

On the other hand, when the above-described fluorescence intensity distribution has already been acquired using the interference fringes L2 with a predetermined number of phase conditions, it is determined that the change in phase of the interference fringes L2 is unnecessary, and the processing proceeds from step S107 to step S108.

A process of image processing (image processing 1) of step S108 is mainly processed by the image processor 7. The process of image processing (image processing 1) in step S108 will be described in detail later.

When the image processing in step S108 is completed, the processing proceeds to step S109. In step S109, it is determined whether or not a direction of the interference fringes L2 needs to be changed, and if the change is necessary, the processing returns to step S101 to change the direction of the interference fringes L2, that is, the rotation direction of the polarizer 14 and the mask 15, and then step S102 and subsequent steps are executed again.

On the other hand, when the above-described fluorescence intensity distribution has already been acquired by the interference fringes L2 in a predetermined number of directions, the image acquisition flow ends.

Further, when it is sufficient to acquire an image (fluorescence intensity distribution) only in one direction of the interference fringes L2, determination on whether or not a direction of the interference fringes L2 needs to be changed in step S109 is unnecessary.

(Image Processing 1)

In the image processing 1 of step S108, the image processor 7 generates an output image on the basis of the detection result of each detector 6a of the detection device 6 obtained as described above. Hereinafter, processing executed by the image processor 7 will be described. In mathematical expressions used in the following description, a coordinate system will be described with a position vector as appropriate. Coordinates on the specimen plane Sa and coordinates on the detection device 6 (hereinafter referred to as detector coordinates) are represented by a position vector r=(x, y), and the corresponding wave number coordinates (coordinates after Fourier transform on r) are represented by a position vector k=(kx, ky). Also, coordinates of a scan destination by the optical path changing part 18 (hereinafter referred to as scanning coordinates) are represented by a position vector rs=(xs, ys), and the corresponding wave number coordinates (coordinates after Fourier transform on rs) are represented by a position vector ks=(kxs, kys). In the following description, the wave number may be referred to as a spatial frequency or a frequency. A magnification of the detection optical system 5 is assumed to be 1× for convenience of explanation, but an arbitrary magnification may be used.

Provided that a numerical aperture of the detection optical system 5 including the objective lens 21 on the specimen plane Sa side is NA, an illumination light wavelength is $\lambda$ex, and a wavelength of the fluorescence L3 is $\lambda$em, a pupil radius kNAex of the objective lens 21 when excitation light is incident and a pupil radius kNAem of the objective lens 21 when fluorescence is incident are represented by the following expression (1) and expression (2). As is well known, since electric field amplitudes of a pupil plane and an image plane are connected by a relationship of the Fourier transform, coordinates of the pupil position may be expressed by wave number coordinates. Each of the kNAex and the kNAem represents a value of the pupil radius when the pupil is expressed by wave number coordinates.

[Math. 1]
$$k_{NA}^{ex} = \frac{NA}{\lambda_{ex}} \quad \text{expression (1)}$$

[Math. 2]
$$k_{NA}^{em} = \frac{NA}{\lambda_{em}} \quad \text{expression (2)}$$

Here, parameters of various types will be described with reference to FIG. 2C. In FIG. 2C, the pupil plane P0 is represented by a wave number coordinate space (frequency space). A region inside a circle drawn by the dotted line illustrated in FIG. 2C is the pupil of the objective lens 21, and the kNAex is the pupil radius of the objective lens 21. The region P0a and the region P0b on which the excitation light L1 is incident are each circular here but are not limited to a circular shape. Radii of the region P0a and the region P0b are each $\sigma$kNAex. $\sigma$ is a ratio of a radius of the region P0a or the region P0b with respect to the pupil radius of the objective lens 21. A distance from the optical axis 21a of the objective lens 21 to a center of the region P0a is (1−$\sigma$) kNAex. Also, a distance from the optical axis 21a of the objective lens 21 to a center of the region P0b is (1−$\sigma$) kNAex. A distance between the center of the region P0a and the center of the region P0b is, for example, 2 (1−$\sigma$)kNAex, but is not limited to this value. An intensity of the excitation light (square of the electric field) ill(r) on the specimen plane Sa is represented by the following expression (3).

[Math. 3]
$$ill(r) = PSF_{ill}(r) \frac{1 + \cos(2\pi k_0 \cdot r + \phi)}{2} \quad \text{expression (3)}$$

Here, a vector k0=(k0, 0) indicates a wave number vector of the interference fringes L2, and k0=2 (1-$\sigma$)kNAex. PSFill (r) is a point spread function when the numerical aperture of the optical system is $\sigma$NA. A spacing between the interference fringes of the ill(r) (distance from one light portion to the next light portion) is $1/k0=1/(2(1-\sigma)kNAex)$. In the following description, the spacing between the interference fringes L2 is referred to as a fringe spacing or a period of the interference fringes L2 as appropriate. $\phi$ is a phase of change in light-and-dark of the interference fringes L2 and is hereinafter simply referred to as a phase of the interference fringes L2. The phase $\phi$ can be changed by the phase modulation element 25.

Further, a distribution of the illumination light on the pupil plane of the illumination optical system as illustrated in FIG. 2C is referred to as an illumination pupil. The illumination pupil illustrated in FIG. 2C is called two poles because the illumination light is concentrated and distributed at two regions.

In the embodiment, the fluorescent substance contained in the specimen S is excited by the excitation light L1, and the fluorescence L3 is radiated from the excited fluorescent substance. As described above, each detector 6a of the detection device 6 receives the fluorescence L3 and captures an image of the fluorescent substance formed by the detection optical system 5 to acquire image data. In the following description, a size of the detector 6a (detector size) of the detection device 6 is assumed to be sufficiently small compared to a dimension corresponding to a period of the interference fringes L2 in the detection device 6 (a length on the detection device 6 corresponding to one period). For example, the size of the detector 6a is set to about $\lambda em/4NA$.

Here, a distribution of the fluorescent substance in the specimen S is represented by Obj(r), and the image data obtained by each detector 6a of the detection device 6 is represented by I(r, rs). Here, r is detector coordinates of each detector 6a as described above. I(r, rs) is represented by the following expression (4).

[Math. 4]

$$I(r, r_s) = \{PSF_{det}(r + r_s)ill(r_s)\} \overset{r_s}{*} Obj(r_s) \quad \text{expression (4)}$$
$$= PSF_{eff}(r, r_s) \overset{r_s}{*} Obj(r_s)$$

*rs in expression (4) is a convolution for rs. Here, PSFdet(r) is a detection PSF determined by the detection optical system 5 including the objective lens 21 and the fluorescence wavelength $\lambda em$. The image data I(r, rs) is four-dimensional data having the detector coordinates r=(x, y) and the scan coordinates rs=(xs, ys) as independent variables. Also, PSFeff(r, rs) is an effective PSF defined by the following expression (5).

[Math. 5]

$$PSF_{eff}(r, r_s) = PSF_{det}(r + r_s)ill(r_s) \quad \text{expression (5)}$$
$$= PSF_{det}(r + r_s)PSF_{ill}(r_s)\frac{1 + \cos(2\pi k_0 \cdot r_c + \phi)}{2}$$

From the above expression (4), it can be ascertained that image data of Obj(rs) different from each other can be obtained for each detector 6a of the detection device 6. Also, from the above expression (5), it can be ascertained that a shape of the effective PSF differs for each position (r) of the detector 6a of the detection device 6.

FIGS. 9A and 9B are views illustrating the effective PSF at each detector of the detection device in the first embodiment. In each graph of FIGS. 9A and 9B, the horizontal axis is in the Xb direction of the detection device 6. The specimen plane Sa is optically conjugate with the detection device 6, and coordinates X of the specimen plane Sa and coordinates Xb of the detection device are associated with each other by an appropriate coordinate conversion. For example, when a magnification of the optical system is 1, X=Xb. Further, FIGS. 9A and 9B represent a case in which the above-described phase $\phi$ of the illumination light is 0.

The three graphs in FIG. 9A represent the effective PSF (solid line) for three detectors 6a whose coordinates in the Xb direction are different from each other. For example, the graph at the center of FIG. 9A represents a distribution Q1a (solid line) corresponding to an effective PSF of the detector 6a disposed at a position X1a. Also, the graph on the left side of FIG. 9A represents a distribution Q1b (solid line) corresponding to an effective PSF of the detector 6a disposed at a position X1b. Also, the graph on the right side of FIG. 9A represents a distribution Q1c (solid line) corresponding to an effective PSF of the detector 6a disposed at a position X1c.

Also, reference sign Q2 corresponding to the broken line of FIGS. 9A and 9B is a distribution corresponding to an intensity distribution of the interference fringes L2 illustrated in FIGS. 2A to 2C or the like. Also, the reference sign Ga corresponding to the dotted line of FIGS. 9A and 9B represents an envelope (envelope curve) representing an outer shape of an intensity distribution of the interference fringes L2 similar to that illustrated in FIGS. 5A to 5C. As illustrated in FIG. 9A, a period of the intensity distribution Q2 of the interference fringes L2 and a period of a disposition of the three detectors 6a generally do not coincide with each other. The distribution Q2 corresponds to a case in which $\phi=0$ at the intensity of the excitation light (square of the electric field) ill(r) on the specimen plane Sa (see the above expression (3)). Positions at which the intensity of the interference fringes L2 is maxim, that is, peak positions X2a, X2b, and X2c of the distribution Q2 can be obtained in advance by a numerical simulation or the like.

The distribution Q2 includes partial distributions Q2a, Q2b, and Q2c. The distribution Q2a is a distribution in a range from a minimum position before the peak position X2a to the next minimum position. The distribution Q2b is a distribution in a range from a minimum position before the peak position X2b to the next minimum position. The distribution Q2c is a distribution in a range from a minimum position before the peak position X2c to the next minimum position.

Also, reference signs Q3a, Q3b, and Q3c corresponding to the two-dot chain lines in FIGS. 9A and 9B are distributions corresponding to the detection PSF determined by the detection optical system 5 including the objective lens 21 and the fluorescence wavelength kern. The detection PSF corresponds to the PSFdet(r) of expression (4) or the like.

The distribution Q3a illustrated in the central graph of FIG. 9A is a distribution corresponding to the detection PSF of the detector 6a disposed at the position X1a among the plurality of detectors 6a. The distribution Q3a reaches a maximum (peak) at the position X1a (for example, a center position of a light receiving region of the detector 6a) at which the detector 6a is disposed. The position X1a is substantially the same as the peak position X2a of the distribution Q2a corresponding to the intensity distribution of the interference fringes L2. The distribution Q1a corresponding to the effective PSF is a distribution obtained by multiplying the distribution Q2 corresponding to the intensity distribution of the interference fringes L2 and the distribution Q3a corresponding to the detection PSF of the detector 6a disposed at the position X1a.

In the central graph of FIG. 9A, an amount of deviation of a peak position of the position X1a of the detector 6a, that is, the detection PSF thereof (peak position of the distribution Q3a) from the peak position X2a of the distribution Q2a corresponding to the intensity distribution of the interference fringes L2 is smaller than a predetermined value (for example, the amount of deviation is almost 0). In such a case, the distribution Q1a of the effective PSF has a single maximum (peak). In this case, the peak position of the distribution Q1a is substantially the same as the position X1a of the detector 6a or the peak position X2a of the distribution Q2a corresponding to the intensity distribution of the interference fringes L2.

The distribution Q3b illustrated in the graph on the left side of FIG. 9A is a distribution corresponding to the detection PSF of the detector 6a disposed at the position X1b among the plurality of detectors 6a. The distribution Q3b reaches a maximum (peak) at the position X1b at which the detector 6a is disposed (for example, the center position of the light receiving region of the detector 6a). The position X1b is deviated from the peak position X2b of the partial distribution Q2b including the position X1b among the distribution Q2 corresponding to the intensity distribution of the interference fringes L2. The distribution Q1b corresponding to the effective PSF is a distribution obtained by multiplying the distribution Q2 corresponding to the intensity distribution of the interference fringes L2 and the distribution Q3b corresponding to the detection PSF of the detector 6a disposed at the position X1b.

In the graph on the left side of FIG. 9A, an amount of deviation of a peak position of the position X1b of the detector 6a, that is, the detection PSF thereof (peak position of the distribution Q3b) from the peak position X2b of the distribution Q2b corresponding to the intensity distribution of the interference fringes L2 is larger than a predetermined value. In this case, the distribution Q1b of the effective PSF has two maximums (peaks). In this way, the peak of the effective PSF may be divided into two according to a position of the detector 6a, and such a change in shape of the effective PSF is called a deformation of a shape of the effective PSF. The peak with a strongest effective PSF is called a main lobe, and peaks other than that are called side lobes.

A peak position of the main lobe of the distribution Q1b of the effective PSF is deviated from a center position (X2a) of the detection device 6a. In this way, it can be ascertained that the position of the main lobe of the effective PSF also deviates according to a relationship between the position (r) of the detector 6a of the detection device 6 and the position of the intensity distribution of the interference fringes L2. In the following description, a positional deviation of the main lobe of the effective PSF is referred to as a positional deviation of the effective PSF as appropriate.

The distribution Q3c illustrated in the graph on the right side of FIG. 9A is a distribution corresponding to the detection PSF of the detector 6a disposed at the position X1c among the plurality of detectors 6a. The distribution Q3c reaches a maximum (peak) at the position X1c at which the detector 6a is disposed (for example, the center position of the light receiving region of the detector 6a). The position X1c is deviated from the peak position X2c of the partial distribution Q2c including the position X1c among the distribution Q2 corresponding to the intensity distribution of the interference fringes L2. The distribution Q1c corresponding to the effective PSF is a distribution obtained by multiplying the distribution Q2 corresponding to the intensity distribution of the interference fringes L2 and the distribution Q3c corresponding to the detection PSF of the detector 6a disposed at the position X1c.

In the graph on the right side of FIG. 9A, an amount of deviation of a peak position of the position X1c of the detector 6a, that is, the detection PSF thereof (peak position of the distribution Q3c) from the peak position X2c of the distribution Q2c corresponding to the intensity distribution of the interference fringes L2 is larger than a predetermined value. In this case, the distribution Q1b of the effective PSF has two maximums (peaks), a shape of the effective PSF is deformed, and a positional deviation of the effective PSF occurs.

The image processor 7 effectively shifts the phase of the intensity distribution of the interference fringes L2 by image processing to be described later so that the peak position of the partial distribution of the intensity distribution of the interference fringes L2 (for example, Q2b illustrated in the graph on the left side of FIG. 9A) matches the position of the detector 6a.

FIG. 9B is an effective PSF for each detector 6a after the phase is effectively shifted by the image processing. In the graph on the left side of FIG. 9B, a distribution Q2f is a distribution in which the phase of the distribution Q2 is shifted so that the peak position X2b of the distribution Q2b of FIG. 9A coincides with the position X1b of the detector 6a. Further, even when the phase distribution of the distribution Q2 is shifted, the envelope Ga of the distribution Q2 is not moved in the Xb direction. That is, in the present image processing, the phase of the distribution Q2 contained inside the envelope Ga is changed while maintaining the position of the envelope Ga of the distribution Q2 in the Xb direction. A peak position X2f of the distribution Q2f substantially coincides with the position X1b of the detector 6a. Reference sign Q1f is a distribution corresponding to an effective PSF obtained from the phase-shifted distribution Q2f and the detection PSF (distribution Q3b) of the detector 6a disposed at the position X1b. In the distribution Q1f, deformation of a shape of the effective PSF is reduced.

Also, in the graph on the right side of FIG. 9B, a distribution Q2g is a distribution in which the phase of the distribution Q2 is shifted so that the peak position X2c of the distribution Q2c in FIG. 9A coincides with the position X1c of the detector 6a. The peak position X2g of the distribution Q2g substantially coincides with the position X1c of the detector 6a. Reference sign Q1g is a distribution corresponding to an effective PSF obtained from the phase-shifted distribution Q2g and the detection PSF (distribution Q3c) of the detector 6a disposed at the position X1c. In the distribution Q1g, deformation of a shape of the effective PSF is reduced.

By the image processing as described above, shapes of the effective PSF (solid line) for each detector 6a are corrected to be substantially the same. The image processor 7 generates an output image using an intermediate image for each detector 6a having the effective PSF corrected to have substantially the same shape.

The image processor 7 further corrects a positional deviation of the intermediate image (positional deviation of the peak position of the effective PSFeff or positional deviation of the main lobe position) for each detector 6a for the result in which the deformation of the effective PSF for each detector 6a has been corrected as described above. The positional deviation of the intermediate image for each detector 6a can be acquired by theoretical calculation using design values of various types or from a captured image of a small object such as fluorescent beads captured by the detection device 6.

When such a correction of the positional deviation is performed, the effective PSFs of the intermediate images obtained from each of the selected detectors 6a can be made substantially the same in both the shape and the position. The PSFeff of the intermediate image obtained in this way can be regarded as approximately equivalent to the PSFeff of the detector at a center position of the detection device 6 (a detector positioned on the optical axis).

Details of the image processing for correcting deformation of the effective PSF and the image processing for correcting a positional deviation of the intermediate image for each detector 6a described above will be described later.

The image processor 7 generates an output image by summing the intermediate image acquired by each detector 6a and whose PSFeff is corrected to have substantially the same shape by the above-described image processing. As the PSFeffs of summed images have been made substantially the same, the image processor 7 can generate an output image (super-resolution image) ISR(rs) having a satisfactory resolution and S/N ratio. When a range of the detector 6a used for generating the output image (super-resolution image) ISR(rs) is extended, an amount of signal can be increased. Also, when the range of the detector 6a used for generating the output image (super-resolution image) ISR(rs) is reduced, a sectioning ability can be enhanced.

Hereinafter, details of the image processing will be described.

In the following description, for ease of understanding, the periodic direction of the interference fringes L2 is assumed to be in the X direction. Also, it is assumed that the phase of the interference fringes L2 has three values of φ=φ1, φ2, and φ3 (three phase shift). φ1, φ2, and φ3 are, for example, 0, 2π/3, 4π/3 [rad], respectively.

FIG. 8 is a flowchart showing a processing flow of the image processing 1 which is an example of the image processing.

In step S121 in the image processing 1, the image processor 7 selects one detector 6a from the plurality of detectors 6a and starts image processing of an image acquired by the detector 6a.

(Image Processing for Correcting Deformation of Effective PSF)

First, image processing for correcting deformation of an effective PSF will be described.

From the above expression (4) and expression (5), the following expression (6) can be obtained.

[Math. 6]

$$I(r, r_s; \phi) = \left\{ PSF_{det}(r + r_s) PSF_{ill}(r_s) \frac{1 + \cos(2\pi k_0 \cdot r_s + \phi)}{2} \right\} * Obj(r_s) \quad \text{expression (6)}$$

In expression (6), φ is specified as an argument and is written as I (r, rs; φ) to make dependence of the phase φ clear.

In step S122, the image processor 7 performs a two-dimensional Fourier transform (2D-FFT) on the image data I (r, rs; φ) corresponding to the left-hand side of expression (6) and obtained by scanning with the interference fringes L2 in a predetermined phase in the selected detector 6a with respect to the scan coordinates rs (two-dimension). The data obtained by this Fourier transform is equivalent to the following expression (7) obtained by Fourier transforming expression (6) with respect to the scan coordinates rs.

[Math. 7]

$$\tilde{I}(r;k_s;\phi) = \{OTF'_{det}(r;k_s) *^{ks} (\tfrac{1}{2} OTF_{ill}(k_s) + \tfrac{1}{4} e^{i\phi} OTF_{ill}(k_s - k_0) + \tfrac{1}{4} e^{-i\phi} OTF_{ill}(k_s + k_0))\} \widetilde{Ob}_j(k_s) \quad \text{expression (7)}$$

In expression (7), OTF'det(r, ks)=$e^{i2\pi k_s r}$OTFdet(k$_s$). Also, OTFdet is a Fourier transform of PSFdet and represents an OTF of the detection optical system, OTFill is a Fourier transform of PSFill, and Obj~ is a Fourier transform of Obj.

Expression (7) is a sum of three terms, and as illustrated in the following expression (8), the terms are each referred to as a 0th-order component $\tilde{I}_0$(r, ks), a +1st-order component $\tilde{I}_{+1}$(r, ks), and a −1st-order component $\tilde{I}^{-1}$(r, ks).

[Math. 8]

$$\tilde{I}(r;k_s;\phi) = \tilde{I}_0(r;k_s) + e^{i\phi} \tilde{I}_{+1}(r;k_s) + e^{-i\phi} \tilde{I}_{-1}(r;k_s)$$

$$\tilde{I}_0(r;k_s) = \tfrac{1}{2} \{OTF'_{det}(r;k_s) *^{k^s} OTF_{ill}(k_s)\} \widetilde{Ob}_j(k_s)$$

$$\tilde{I}_{+1}(r;k_s) = \tfrac{1}{4} \{OTF'_{det}(r;k_s) *^{k^s} OTF_{ill}(k_s - k_0)\} \widetilde{Ob}_j(k_s)$$

$$\tilde{I}_{-1}(r;k_s) = \tfrac{1}{4} \{OTF'_{det}(r;k_s) *^{k^s} OTF_{ill}(k_s + k_0)\} \widetilde{Ob}_j(k_s) \quad \text{expression (8)}$$

In principle, correction processing that shifts the phase of the interference fringes L2 in an image processing manner according to the coordinates of the detectors 6a can be performed by multiplying the ±1st-order components ($\tilde{I}_{+1}$(r, ks), and $\tilde{I}_{-1}$(r, ks) in expression (8) by a predetermined phase shift amount ψ. Further, since the phase shift amount is a virtual phase shift amount added in the image processing, it is hereinafter referred to as an "image processing phase shift amount."

However, since the 0th-order component $\tilde{I}_0$(r, ks), the +1st-order component $\tilde{I}_{+1}$(r, ks), and the −1st-order component $\tilde{I}_{-1}$(r, ks), which are obtained as a result of the two-dimensional Fourier transform of the image data I (r, rs; φ) obtained by scanning with the interference fringes L2, each spread in the frequency space and overlap each other, it is actually difficult to clearly separate them on the data.

(Component Separation)

In the present embodiment, images are acquired by performing scanning in a plurality of different phases of the interference fringes L2 while changing the phase of the interference fringes L2. Therefore, the 0th-order component $\tilde{I}_0$(r, ks), the +1st-order component $\tilde{I}_{+1}$(r, ks), and the −1st-order component $\tilde{I}_{-1}$(r, ks) can be separated from each other on the basis of the Fourier transform data of each of the plurality of images.

Here, it is assumed that images for three phases of φ1, φ2, and φ3 are acquired for the phase φ of the interference fringes L2. Then, Fourier transform of an image I (r, rs; φ1 to φ3) obtained for each phase with respect to the scan coordinates rs is expressed by the following expression (9).

[Math. 9]

$$\tilde{I}(r;k_s;\phi_1) = \tilde{I}_0(r;k_s) + e^{i\phi_1} \tilde{I}_{+1}(r;k_s) + e^{-i\phi_1} \tilde{I}_{-1}(r;k_s)$$

$$\tilde{I}(r;k_s;\phi_2) = \tilde{I}_0(r;k_s) + e^{i\phi_2} \tilde{I}_{+1}(r;k_s) + e^{-i\phi_2} \tilde{I}_{-1}(r;k_s)$$

$$\tilde{I}(r;k_s;\phi_3) = \tilde{I}_0(r;k_s) + e^{i\phi_3} \tilde{I}_{+1}(r;k_s) + e^{-i\phi_3} \tilde{I}_{-1}(r;k_s) \quad \text{expression (9)}$$

When expression (9) is written in a matrix form, the following expression (10) is obtained.

[Math. 10]

$$\begin{pmatrix} \tilde{I}(r,k_s;\phi_1) \\ \tilde{I}(r,k_s;\phi_2) \\ \tilde{I}(r,k_s;\phi_3) \end{pmatrix} = \begin{pmatrix} 1 & e^{i\phi_1} & e^{-i\phi_1} \\ 1 & e^{i\phi_2} & e^{-i\phi_2} \\ 1 & e^{i\phi_3} & e^{-i\phi_3} \end{pmatrix} \begin{pmatrix} \tilde{I}_0(r,k_s) \\ \tilde{I}_{+1}(r,k_s) \\ \tilde{I}_{-1}(r,k_s) \end{pmatrix}$$ expression (10)

Therefore, from expression (10), $\tilde{I}_0(r, ks)$, $\tilde{I}_{+1}(r, ks)$, and $\tilde{I}_{-1}(r, ks)$ can be obtained using the following expression (11).

[Math. 11]

$$\begin{pmatrix} \tilde{I}_0(r,k_s) \\ \tilde{I}_{+1}(r,k_s) \\ \tilde{I}_{-1}(r,k_s) \end{pmatrix} = \begin{pmatrix} 1 & e^{i\phi_1} & e^{-i\phi_1} \\ 1 & e^{i\phi_2} & e^{-i\phi_2} \\ 1 & e^{i\phi_3} & e^{-i\phi_3} \end{pmatrix}^{-1} \begin{pmatrix} \tilde{I}(r,k_s;\phi_1) \\ \tilde{I}(r,k_s;\phi_2) \\ \tilde{I}(r,k_s;\phi_3) \end{pmatrix}$$ expression (11)

From the above, it is ascertained that, in order to obtain (separate) $\tilde{I}_0(r, ks)$, $\tilde{I}_{+1}(r, ks)$, and $\tilde{I}_{-1}(r, ks)$, $\phi 1$, $\phi 2$, and $\phi 3$ may be set so that an inverse matrix thereof in expression (11) is present. As an example thereof, as described above, $\phi 1$, $\phi 2$, and $\phi 3$ may be set to be 0, $2\pi/3$, $4\pi/3$ [rad], that is, to have a phase difference of $2\pi/3$ [rad] from each other.

Further, the values of $\phi 1$, $\phi 2$, and $\phi 3$ are not limited to the above-described values, and the phase difference between $\phi 1$, $\phi 2$, and $\phi 3$ is preferably set roughly between $\pi/18$ and $17\pi/18$ according to assumed SIN of the image.

In step 123, on the basis of such a principle, the 0th-order component $\tilde{I}_0(r, ks)$, the +1st-order component $\tilde{I}_{+1}(r, ks)$, and the −1st-order component $\tilde{I}_{-1}(r, ks)$ are separated and extracted.

That is, for a plurality of images acquired by causing the interference fringes L2 to scan on the specimen plane Sa using the optical path changing part 18 under a plurality of phases $\phi$ (three phases as an example) of the interference fringes L2, each image is Fourier transformed with the scan coordinates rs. Then, from the results of the Fourier transform, the 0th-order component $\tilde{I}_0(r, ks)$, the +1st-order component $\tilde{I}_{+1}(r, ks)$, and the −1st-order component $\tilde{I}_{-1}(r, ks)$ can be obtained (extracted) on the basis of expression (11).

In step S124, the 0th-order component $\tilde{I}_0(r, ks)$, the +1st-order component $\tilde{I}_{+1}(r, ks)$, and the −1st-order component $\tilde{I}_{-1}(r, ks)$ are each subjected to an inverse Fourier transform (2D-inverse FFT) with respect to the wave number coordinates ks (wave number coordinates after Fourier transform with the scan coordinates rs). $I_0(r, rs)$, $I_{+1}(r, rs)$, and $I_{-1}(r, rs)$, which have each been inverse Fourier transformed, are equivalent to the following expression (12).

[Math. 12]

$$I_0(r,r_s) = \frac{1}{2}\{PSF_{det}(r+r_s)PSF_{ill}(r_s)\}*^{r_s}OBj(r_s)$$

$$I_{+1}(r,r_s) = \frac{1}{4}\{e^{i2\pi k_0 r_s}PSF_{det}(r+r_s)PSF_{ill}(r_s)\}*^{r_s}OBj(r_s)$$

$$I_{-1}(r,r_s) = \frac{1}{4}\{e^{-i2\pi k_0 r_s}PSF_{det}(r+r_s)PSF_{ill}(r_s)\}*^{r_s}OBj(r_s)$$ expression (12)

(Phase Shift by Image Processing)

Next, in step S125, correction processing for shifting the phase of the interference fringes L2 in an image processing manner according to the coordinates of the detector 6a is performed. As illustrated in expression (13), this correction processing is performed by multiplying each of the above-described ±1st order components by an image processing phase shift amount ±ψ(r) according to the detector coordinates r of the detector 6a. On the other hand, for the 0th-order component, it is not necessary to multiply the phase shift amount.

[Math. 13]

$$I'_0(r,r_s) = I_0(r,r_s)$$

$$I'_{+1}(r,r_s) = I_{+1}(r,r_s)e^{i\psi(r)}$$

$$I'_{-1}(r,r_s) = I_{-1}(r,r_s)e^{-i\psi(r)}$$ expression (13)

Then, when all the 0th-order component I′0(r, rs), the +1st-order component I′$_{+1}$(r, rs), and the −1st-order component I′$_{-1}$(r, rs) of expression (13) are summed, an image (intermediate image) represented by expression (14) is obtained.

[Math. 14]

$$I'(r,r_s) = I'_0(r,r_s) + I'_{+1}(r,r_s) + I'_{-1}(r,r_s)$$ expression (14)

Thereby, the phase of the interference fringes L2 is effectively shifted according to the detector coordinates r.

Here, the image processing phase shift amount ψ(r) of the interference fringes L2 for the above-described correction may be determined so that a peak of the interference fringes L2 comes to a peak position of a function obtained by a product of PSFdet(r+rs) and PSFill(rs). Hereinafter, a method for determining the image processing phase shift amount of the interference fringes L2 will be described.

The phase shift amount of the interference fringes L2 for the above-described correction is determined, for example, as follows. The image processor 7 calculates an amount of a positional deviation of a signal detected by the detector coordinates r. The image processor 7 calculates the above-described amount of the positional deviation by obtaining the peak position of the function obtained by the product of PSFdet(r+rs) and PSFill(rs) by, for example, a simulation in advance. Here, the positional deviation of the effective PSF may be considered to be proportional to the detector coordinates r, and when a parameter representing the degree of the positional deviation is assumed to be β, the amount of positional deviation is represented by r/β.

The value of β may be calculated from the peak position of the function obtained by the product of PSFdet(r+rs) and PSFill(rs) or may be calculated by another numerical simulation. When β is determined, the phase shift amount according to the detector coordinates is determined. The image processing phase shift amount ψ(r) of the interference fringes L2 is determined so that the peak position of the function obtained by the product of PSFdet(r+rs) and PSFill (rs) coincides with the peak position of the interference fringes L2. Due to such processing, the image processing phase shift amount becomes, for example, ψ(r)=2πk0·r/β. As described above, k0 is the wave number vector of the interference fringes L2.

The image processor 7 determines an amount of phase conversion (image processing phase shift amount) on the basis of the light intensity distribution of the excitation light on the specimen S. The image processor 7 determines the image processing phase shift amount on the basis of the intensity of the excitation light (square of the electric field) ill(r) on the specimen plane Sa as the light intensity distribution of the excitation light on the specimen S. When the image processing phase shift amount ψ(r) set in this way is used, deformation of the shape of the effective PSF for each position (detector coordinate) r of the detector 6a is corrected in the processing illustrated in expression (13).

(Image Processing for Correcting Positional Deviation of Image for Each Detector)

After the phase shift processing is performed as described above, the image processor 7 performs processing of correcting the positional deviation of the effective PSF for each detector 6a in step S126. When the processing of correcting the positional deviation is performed, the effective PSF of the intermediate image for each detector 6a of the detection device 6 becomes substantially the same. In step S127, the image processor 7 generates an output image (super-resolution image) ISR(rs) by summing the intermediate image for each detector 6a of the detection device 6. A series of the processing is represented by the following expression (15).

[Math. 15]

$$I_{SR}(r_s) = \int_{-\infty}^{\infty} PH(r) I'\left(r, r_s - \frac{r}{\beta}\right) dr \qquad \text{expression (15)}$$

In expression (15), PH(r) is a pinhole function defined by the following expression (16).

[Math. 16]

$$PH(r) = \begin{cases} 1, & x^2 + y^2 \leq r_{PH}^2 \\ 0, & x^2 + y^2 > r_{Pi}^2 \end{cases} \qquad \text{expression (16)}$$

When a value of rPH corresponding to a radius of the pinhole is adjusted, an amount of signal and a sectioning effect can be adjusted. When the rPH increases, the amount of signal increases. Also, when the rPH is reduced, the sectioning ability is improved. A PSFSR(rs), which is the effective PSF of the output image (super-resolution image) ISR(rs) obtained by the calculation of expression (15), is represented by the following expression (17).

[Math. 17]

$$PSF_{SR}(r_s) = \qquad \text{expression (17)}$$
$$\left\{ \int_{-\infty}^{\infty} PH(r) PSF_{det}\left(\left(1 - \frac{1}{\beta}\right)r + r_s\right) PSF_{ill}\left(r_s - \frac{r}{\beta}\right) dr \right\}$$
$$\frac{1 + \cos 2\pi k_0 \cdot r_s}{2}$$

In step S128, the image processor 7 determines whether or not the selected detector 6a needs to be changed. That is, if unprocessed image data remains among the image data acquired by the detector 6a to be image-processed in the processing so far, the processing returns to step S121, a predetermined detector 6a is selected, and processing of step S122 and subsequent steps are continued. On the other hand, if all the image data acquired by the detector 6a to be image-processed has been processed, the image processor 7 ends the processing of the image processing 1 and returns to step S109 of FIG. 7.

(Resolution of Microscope of First Embodiment)

When it is focused on the periodic direction of the interference fringes L2, that is, on a k0 direction, it is ascertained from expression (17) that the smaller the period of the interference fringes L2 becomes, the full width at half maximum of the PSFSR(rs) becomes smaller and the resolution becomes better. That is, as the number of fringes (light portions) included in the periodic direction of the interference fringes L2 in the embodiment becomes larger, the full width at half maximum of the PSFSR becomes smaller and the resolution becomes better. The full width at half maximum of a normal fluorescence microscope is given at 0.51λem/NA. The full width at half maximum of the PSFSR in the embodiment is, for example, 0.3λex/NA when σ=0.3, the full width at half maximum of the PSF is about 1.7 times smaller than that of the normal fluorescence microscope, and thus the resolution is good.

The number of light portions included in the interference fringes L2 in the periodic direction in the embodiment is, for example, five when σ=0.3. The full width at half maximum of the PSFSR in the embodiment is, for example, 0.34λex/NA when σ=0.4, the full width at half maximum of the PSF is about 1.5 times smaller than that of the normal fluorescence microscope, and thus the resolution is good. The number of bright portions included in the interference fringes L2 in the periodic direction in the embodiment is, for example, three when σ=0.4. Similarly, the number of bright portions is four when σ=0.35. Also, it is known that when a pinhole of a normal confocal microscope is sufficiently narrowed down, the full width at half maximum of the PSF thereof is about 1.4 times smaller than that of the normal fluorescence microscope, and thus the resolution is good.

In order to have superiority in resolution improving effect to the confocal microscope, it is desirable that the full width at half maximum of the PSF is 1.5 times or more smaller than that of the normal fluorescence microscope. That is, in the embodiment, it is desirable that the number of light portions included in the periodic direction of the interference fringes L2 is three or more. When this is viewed from another perspective, it is desirable that σ, which is the ratio of each of the radii of the region P0a and the region P0b with respect to the pupil radius of the objective lens 21, is 0.4 or less and the region P0a and the region P0b are positioned on an outer edge of the pupil radius of the objective lens 21 as much as possible. At this time, it is preferable that outer circumferences of the regions P0a and the region P0b are in contact with an outer circumference of the pupil of the objective lens 21, or at least partially on an outer side of the outer circumference of the pupil of the objective lens 21. These are the same in other embodiments to be described below.

In the present embodiment, a scan interval and an interval between the detectors 6a of the detection device 6 may be set on the basis of a cutoff frequency and the Nyquist theorem. The scan interval may be set to 2ex/8NA or less in the periodic direction of the interference fringes L2. Also, the scan interval may be set to λex/4NA or less in a direction perpendicular to the periodic direction of the interference fringes L2. Also, the interval between the detectors 6a of the detection device 6 may be set to λem/4NA or less.

An effective OTF can be obtained by Fourier transforming the above expression (17). $K_{cut}^{conv}$, which is a cutoff frequency in the normal fluorescence microscope, is given as $K_{cut}^{conv}=2NA/\lambda$. The microscope of the embodiment has the cutoff frequency of up to $2 K_{cut}^{conv}$ with the OTF extended in the direction of the interference fringes L2. Here, for simplicity, an excitation wavelength and a fluorescence wavelength are assumed to be equally λ. The OTF in the embodiment is a combined one of an OTF of the normal fluorescence microscope with a component of the OTF of the normal fluorescence microscope shifted in the periodic direction of the interference fringes L2.

As described by the above expression (17), in the microscope 1 of the embodiment, a resolution of the interference fringes L2 in the periodic direction (X direction in FIG. 1) is improved. The microscope 1 can also improve the resolution two-dimensionally by changing the periodic direction of the interference fringes L2 and detecting the fluorescence from the specimen S. Therefore, after the image processing in step S109 is ended, as described above, in step S109, it is determined whether or not the direction of the interference fringes L2 needs to be changed, and if the change is necessary, the processing returns to step S101 to change the direction of the interference fringes L2, that is, the rotation direction of the polarizer 14 and the mask 15, and then step S102 and subsequent steps are executed again.

An example of acquiring an image by changing the periodic direction of the interference fringes L2 by 90° and executing step S102 and subsequent steps again will be described.

First, a super-resolution image (output image) (image obtained by the image processing 1 in step S108) when the periodic direction of the interference fringes L2 is in the X direction is assumed to be $I_{SRx}(r_s)$, and a super-resolution image (output image) when the periodic direction of the interference fringes L2 after the periodic direction is changed by 90° is assumed to be $I_{SRy}(r_s)$. The image processor 7 sequentially sums the $I_{SRx}(r_s)$ and the $I_{SRy}(r_s)$ in step S127 to generate a final output image which is a super-resolution image in which the resolution is two-dimensionally improved.

Alternatively, the image processor 7 may generate a final output image which is a super-resolution image by the following processing.

The image processor 7 Fourier transforms the super-resolution image $I_{SRx}(r_s)$ and the super-resolution image $I_{SRy}(r_s)$ with the scan coordinates rs. Here, one obtained by Fourier transforming the super-resolution image $I_{SRx}(r_s)$ is represented by $\tilde{I}_{SRx}(k_s)$. Also, one obtained by Fourier transforming the super-resolution image $I_{SRy}(r_s)$ is represented by $\tilde{I}_{SRy}(k_s)$. In the $\tilde{I}_{SRx}(k_s)$, the cutoff frequency is increased in the periodic direction (X direction) of the interference fringes compared to that of the normal fluorescence microscope. Also, in the $\tilde{I}_{SRy}(k_s)$, the cutoff frequency is increased in the periodic direction (Y direction) of the interference fringes compared to the normal fluorescence microscope. The image processor 7 sums the $\tilde{I}_{SRx}(k_s)$ and the $\tilde{I}_{SRy}(k_s)$. Thereby, the cutoff frequency is increased in two directions (the X direction and the Y direction).

Further, a shape of the summed effective OTF may be distorted according to a combination of directions changing the periodic direction of the interference fringes L2. In this case, the image processor 7 may apply a frequency filter for correcting the shape of the effective OTF.

The image processor 7 performs an inverse Fourier transform on the above-described summed data or data in a frequency space that has been summed and subjected to a filter processing to generate a final output image. Thereby, a resolution of the final output image can be improved more effectively than when the $I_{SRx}(r_s)$ and the $I_{SRy}(r_s)$ are summed.

The change of the periodic direction of the interference fringes L2 is not limited to the above-described two ways of 0° and 90°, and as described in FIGS. 3A to 3C, the periodic direction may be changed in three ways of 0°, 120°, and 240°, for each of which the detection device 6 may detect the fluorescence L3. The image processor 7 may generate a final output image using three detection results (for example, three images) detected by the detection device 6 in three periodic directions. Also in this case, similarly to the above, the image processor 7 can obtain the final super-resolution image ISR by adding the three output images ISR together as they are. Alternatively, the three output images ISR can be Fourier transformed with the scan coordinates rs, added together in the frequency space, processed by the frequency filter, and then subjected to the inverse Fourier transform to obtain the final output image ISR.

Further, in the present embodiment, the microscope 1 scans with the interference fringes L2 two-dimensionally by scanning with the interference fringes L2 in two directions parallel to the specimen plane Sa. The microscope 1 of the embodiment may scan with the interference fringes L2 three-dimensionally by scanning with the interference fringes L2 in two directions parallel to the specimen plane Sa and one direction perpendicular to the specimen plane Sa. In a case of scanning with the interference fringes L2 three-dimensionally, the processing of scanning with the interference fringes L2 in two directions parallel to the specimen plane Sa (hereinafter referred to as two-dimensional processing) is the same as the processing described in the above-described embodiment. The microscope 1 can generate, for example, a three-dimensional super-resolution image by repeating the two-dimensional processing by changing a position in the Z direction. Similarly in the embodiments to be described later, the microscope 1 may scan with the interference fringes L2 three-dimensionally.

Further, the above-described image acquisition flow is configured to set the direction of the interference fringes L2 first, set the phase of the interference fringes L2 next, and change the scanning position of the interference fringes L2 (setting of the optical path changing part 18) finally, but a sequence of these settings is not limited thereto. For example, the phase of the interference fringes L2 may be set first and then the direction of the interference fringes L2 may be set, or the setting may be made in another order. Further, as described above, in the image processing 1 of step S108, an image obtained by scanning a desired region under a plurality of phase conditions of the interference fringes L2 is required. Therefore, the image processing 1 of the step S108 is performed after acquiring an image of a desired region on the specimen plane Sa under a plurality of phase conditions.

(Modified Example of Image Processing)

In the example of the above-described image processing, a method for separating the 0th-order component and the ±1st-order components using the three images acquired in three phase states (three phase shifts) in which phases of the interference fringes L2 are different has been explained. However, the component separation is not limited to the three phase shifts and can also be performed in two phase shifts. In the present modified example, a method of performing the component separation by the two phase shifts will be described. Further, in the present modified example, the configuration of the microscope 1 is the same as that of the first embodiment described above, and the image processing (the image processing 1) in step S108 is also the same as that of the first embodiment except for the portion of the component separation in step S123 of FIG. 7.

For the phase of the interference fringes L2, when images for two phases of $\phi=0$ and $\pi$ [rad] having a phase difference of $\pi$ from each other are acquired, a Fourier transform of the image obtained for each phase by the scan coordinates rs is expressed as the following expression (18) corresponding to the above expression (8).

[Math. 18]

$$\tilde{I}(r;k_s;\phi=0)=\tilde{I}_0(r;k_s)+\tilde{I}_{+1}(r;k_s)+\tilde{I}_{-1}(r;k_s)$$

$$\tilde{I}(r;k_s;\phi=\pi)=\tilde{I}_0(r;k_s)-\tilde{I}_{+1}(r;k_s)-\tilde{I}_{-1}(r;k_s) \quad \text{expression (18)}$$

Here, since the phase difference between the two phases of the interference fringes L2 from which the images have been acquired is π and the two phases are opposite phases, when Fourier transforms of the two images are summed, the ±1st-order components are canceled out and the 0th-order component can be obtained (extracted).

[Math. 19]

$$\tilde{I}_0(r;k_s) = \tfrac{1}{2}(\tilde{I}(r;k_s;\phi=0) + I(r;k_s;\phi=\pi)) \quad \text{expression (19)}$$

On the other hand, when a difference between the Fourier transforms of the two images is taken, a sum of the +1st-order component and the −1st-order component can be obtained.

[Math. 20]

$$\tilde{I}_{+1}(r;k_s) + \tilde{I}_{-1}(r;k_s) = \tfrac{1}{2}(\tilde{I}(r;k_s;\phi=0) - I(r;k_s;\phi=\pi)) \quad \text{expression (20)}$$

Here, since center positions (spatial frequencies) of the ±1st-order components on a ks coordinate space are separated from each other, a region in which they overlap each other is very small. Therefore, in the ks coordinate space, it is possible to substantially obtain $\tilde{I}_{+1}(r, ks)$ by extracting data in a region of ks>0, and it is possible to substantially obtain $\tilde{I}_{-1}(r, ks)$ by extracting data in a region of ks<0. When extraction is performed in this way, although each of the ±1st-order components contains a small amount of the other component, since such a small amount of component is buried in noise in actual microscopic observation, a problem does not occur practically. In this way, the component separation can be performed also in the two phase shifts.

(In Case of Four or More Phase Shifts)

In the above-described example of image processing, a method of performing component separation for the 0th-order component and the ±1st-order components when the phase shift is twice (two phase shifts) or three times (three phase shifts) has been described. The number of times the phase shifts may be four times or more. When the phase shift is performed N times (N>3), an amount of the phase shift is, for example, 0, 2π/N, 4π/N, . . . , 2π(N−1)/N [rad].

For an image taken in each phase, a simultaneous equation similar to expression (9) can be established. However, the number of simultaneous equations is N. For N simultaneous equations, there are three unknowns including $\tilde{I}_0(r, ks)$, $\tilde{I}_{+1}(r, ks)$, and $\tilde{I}_{-1}(r, ks)$. In such a case, $\tilde{I}_0(r, ks)$, $\tilde{I}_{+1}(r, ks)$, and $\tilde{I}_{-1}(r, ks)$ can be obtained from the above-described N simultaneous equations using the least squares method. In this way, the component separation can be performed even when the phase shift of N times. Image processing after the component separation is the same as that in the case of the above-described three-phase shift.

(Microscope of Second Embodiment)

Figure 10:
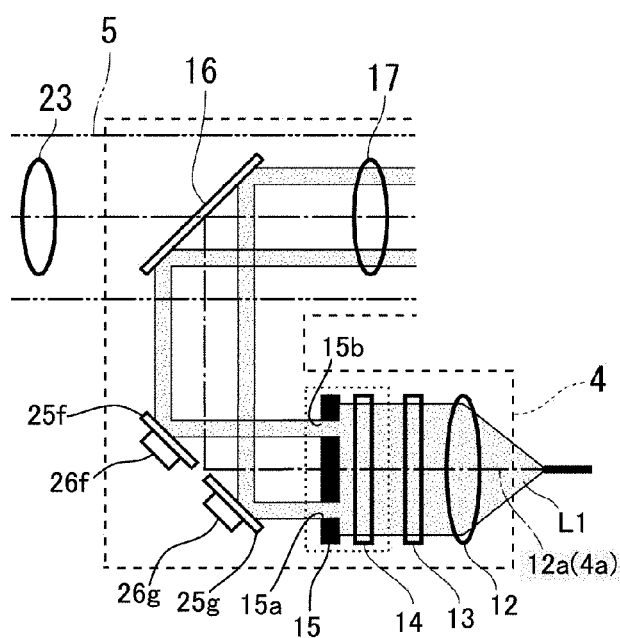
FIG. 10 is a view illustrating a part of a microscope of a second embodiment.
Figure 11:
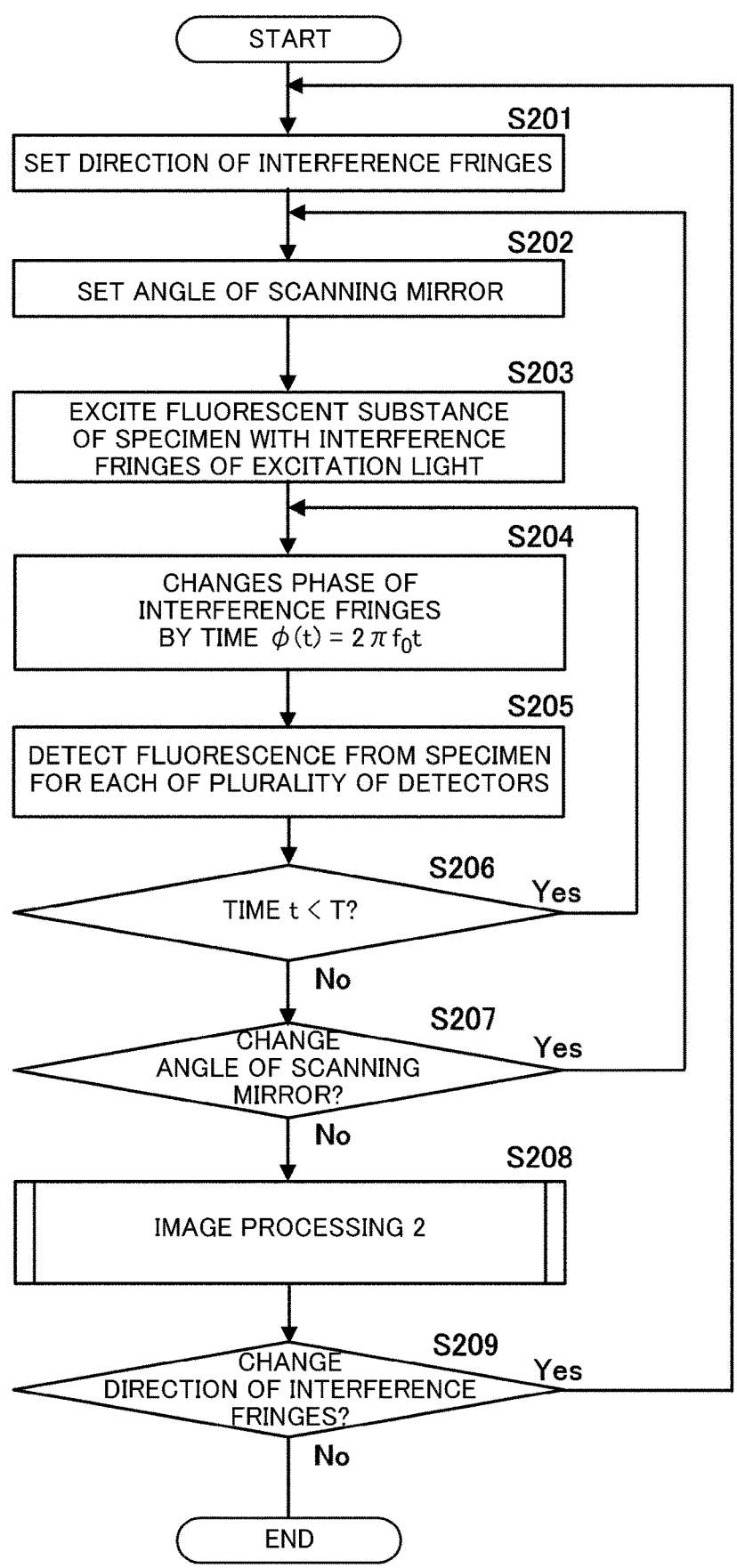
FIG. 11 is a flowchart showing an example of an image acquisition flow in the second embodiment.

A microscope of a second embodiment will be described with reference to FIGS. 10, 11, and 12. FIG. 10 is a view illustrating a configuration in the vicinity of a dichroic mirror 16 of the microscope of the second embodiment. The microscope of the second embodiment is the same as the above-described microscope of the first embodiment illustrated in FIG. 1 except for the portion illustrated in FIG. 10. The microscope of the second embodiment includes partial reflecting mirrors 25f and 25g illustrated in FIG. 10 as a phase modulation element instead of the phase modulation element 25 made of a glass plate illustrated in FIG. 1.

At least one of the partial reflecting mirrors 25f and 25g is held by piezo elements 26f and 26g and can be moved in a direction perpendicular to a mirror surface of each reflecting mirror. By driving at least one of the piezo elements 26f and 26g so that the partial reflecting mirrors 25f and 25g are displaced relative to each other, an optical path difference (phase difference) is formed between excitation light L1a and excitation light L1b. Thereby, a phase of interference fringes L2 formed on a specimen plane Sa can be changed.

(Image Acquisition Flow)

Hereinafter, an example of an image acquisition flow in the microscope 1 of the second embodiment will be described with reference to FIG. 11. In the processing in each of the following steps, description of portions common to those in the above-described first embodiment will be omitted as appropriate.

In step S201, a controller CB of the microscope 1 sets the interference fringes L2 in a predetermined direction. In step S202, the controller CB sets an optical path changing part 18 (scanning mirrors 18X, 18Y) to a predetermined setting (angle), and in step S203, causes the specimen plane Sa to be irradiated with the interference fringes L2 at a predetermined position so that a fluorescent substance of the specimen S is excited by the interference fringes L2.

In step S204, the controller CB drives the piezo elements 26f and 26g to displace the partial reflecting mirrors 25f and 25g with an elapsed time t, and changes a phase ϕ of the interference fringes L2 with the elapsed time t by ϕ(t)=2πf0t [rad]. Further, a value of the phase ϕ(t) may have a difference of ±2 mπ [rad] (m is an integer). Then, in step S205, a plurality of detectors 6a of a detection device 6 each detect fluorescence L3 from the specimen S at a predetermined time interval.

In step S206, the controller CB determines whether or not the elapsed time t is less than a predetermined time T. Then, if the elapsed time t is less than the predetermined time T, the processing returns to step S204, the phase of the interference fringes L2 is reset, and detection of the fluorescence L3 in step S205 is repeated.

On the other hand, if the elapsed time t is equal to or longer than the predetermined time T, the processing proceeds to step S207.

In step S207, it is determined whether or not the setting of the optical path changing part 18 (angles of scanning mirrors 18X and 18Y) needs to be changed, and if scanning of the desired region on the specimen plane Sa has not been completed, the processing returns to step S202 and the setting of the optical path changing part 18 is changed to change the above-described illumination region. On the other hand, if the scanning of the desired region on the specimen plane Sa has been completed, the processing proceeds to image processing (image processing 2) in step S208.

Details of processing of the image processing (image processing 2) in step S208 will be described later.

In the next step S209, it is determined whether or not a direction of the interference fringes L2 needs to be changed, and if the change is necessary, the processing returns to step S201 to change the direction of the interference fringes L2, and then steps S202 and subsequent steps are executed again. On the other hand, when the above-described fluorescence intensity distribution has already been acquired by the interference fringes L2 in a predetermined number of directions, it is determined that the change in the direction of the interference fringes L2 is unnecessary, and the image acquisition flow ends.

(Image Processing 2)

The image data acquired by the detector 6a by step S202 to step S207 is equivalent to the image represented by the following expression (21) from the above expression (6).

[Math. 21]

$$I(r, r_s; t) = \left\{PSF_{det}(r+r_s)PSF_{ill}(r_3)\frac{1+\cos(2\pi k_0 \cdot r_s + 2\pi f_0 t)}{2}\right\} *_{r_s} Obj(r_s) \quad \text{expression (21)}$$

When expression (21) is Fourier transformed with respect to the elapsed time t, expression (22) is obtained.

[Math. 22]

$$\tilde{I}(r,r_s;f) = \{PSF_{det}(r,r_s)PSF_{ill}(r_3)(\tfrac{1}{2}\delta(f)+\tfrac{1}{4}e^{i2\pi k_0 \cdot r_s}\delta(f-f_0)+\tfrac{1}{4}e^{i2\pi k_0 \cdot r_s}\delta(f+f_0))\} *_{r_s} Obj(r_s) \quad \text{expression (22)}$$

Here, Ĩ(r, rs; f) represent a result of Fourier transforming I (r, rs; t) at the elapsed time t, f represents coordinates of a frequency space after the Fourier transform, and δ represents a Dirac delta function. From expression (22), it is ascertained that the Ĩ(r, rs; f) has values only in the vicinity of f=0 and ±f0. Data in the vicinity of f=0 is extracted and is used as $I_0$(r, rs), data in the vicinity of f=+f0 is extracted and is used as $I_{+1}$(r, rs), and data in the vicinity of f=−f0 is extracted and is used as $I_{-1}$(r, rs). These are equivalent to the $I_0$(r, rs), the $I_{+1}$(r, rs), and the $I_{-1}$(r, rs) represented by expression (12) in the first embodiment described above. Therefore, a 0th-order component and a ±1st-order components can be separated by Fourier transforming the image acquired by each detector 6a with respect to the elapsed time t.

That is, in the second embodiment, the 0th-order component and the ±1st-order components are separated by Fourier transforming the image acquired by the detector 6a by step S202 to step S207 with respect to the elapsed time t.

Figure 12:
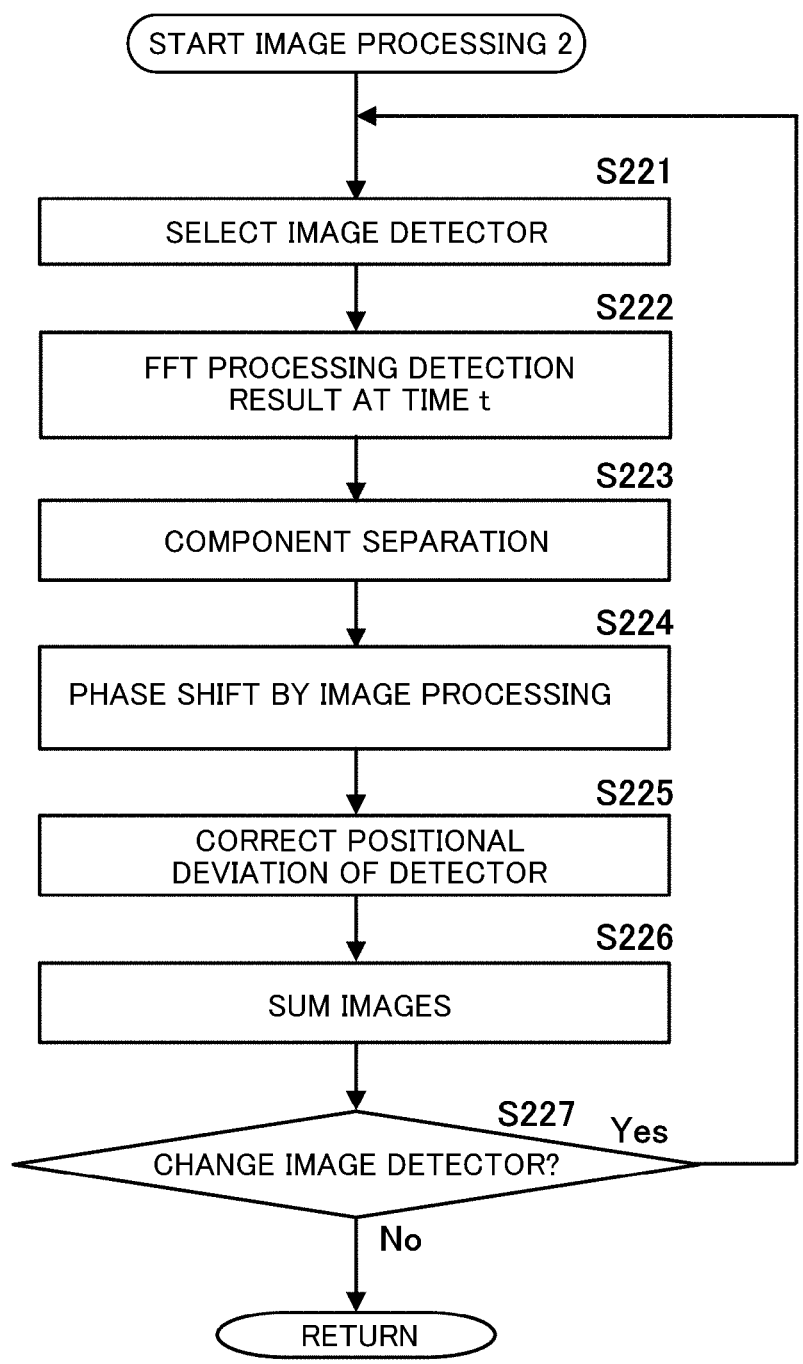
FIG. 12 is a flowchart showing an example of image processing in the second embodiment.

FIG. 12 is a flowchart showing an example of a processing flow of the image processing 2 of step S208 in the second embodiment.

In step S221 in the image processing 2, the image processor 7 selects one detector 6a from the plurality of detectors 6a and starts image processing of the image acquired by the detector 6a. Further, the image detected by one detector 6a at detector coordinates x and y is data of three-dimension in which scan coordinates xs and ys and the elapsed time t are combined.

In step S222, the image processor 7 Fourier transforms the image (detection result) I(r, rs; t) detected by one detector 6a at the elapsed time t as described above. Then, in step S223, in the Fourier transformed Ĩ(r, rs; f) data in the vicinity of f=0 is extracted and is used as $I_0$(r, rs), data in the vicinity of f=+f0 is extracted and is used as $I_{+1}$(r, rs), and data in the vicinity of f=−f0 is extracted and is used as $I_{-1}$(r, rs). Thereby, component separation of the 0th-order component and the ±1st-order components is performed as described.

Thereafter, phase shift processing by image processing is performed by step S224, processing for correcting a positional deviation of each detector 6a is performed by step S225, and processing for adding the image of each detector 6a together is performed in step S226. Further, since the processing from step S224 to step S226 are the same as the processing from step S125 to step S127 in the image processing 1 of the first embodiment described above, description thereof will be omitted.

Further, in step S204, each detector 6a acquires the fluorescence intensity for each scanning position of the interference fringes L2 at a time interval Δt while the elapsed time t is 0 to T. At this time, it is desirable that the time interval Δt is set to satisfy Δt<1/(2f0), and the above-described predetermined time T is set to satisfy T>2/f0.

That is, it is desirable that the predetermined time T is set to a time twice longer than the period of the phase change of the interference fringes L2, and the time interval Δt is set to a time shorter than a half of the period of the phase change of the interference fringes L2. When the predetermined time T is shorter than the above described, or the time interval Δt is longer than the above described, an accuracy of component separation of the 0th-order component and the ±1st-order components is lowered.

(Microscope of Third Embodiment)

Figure 13:
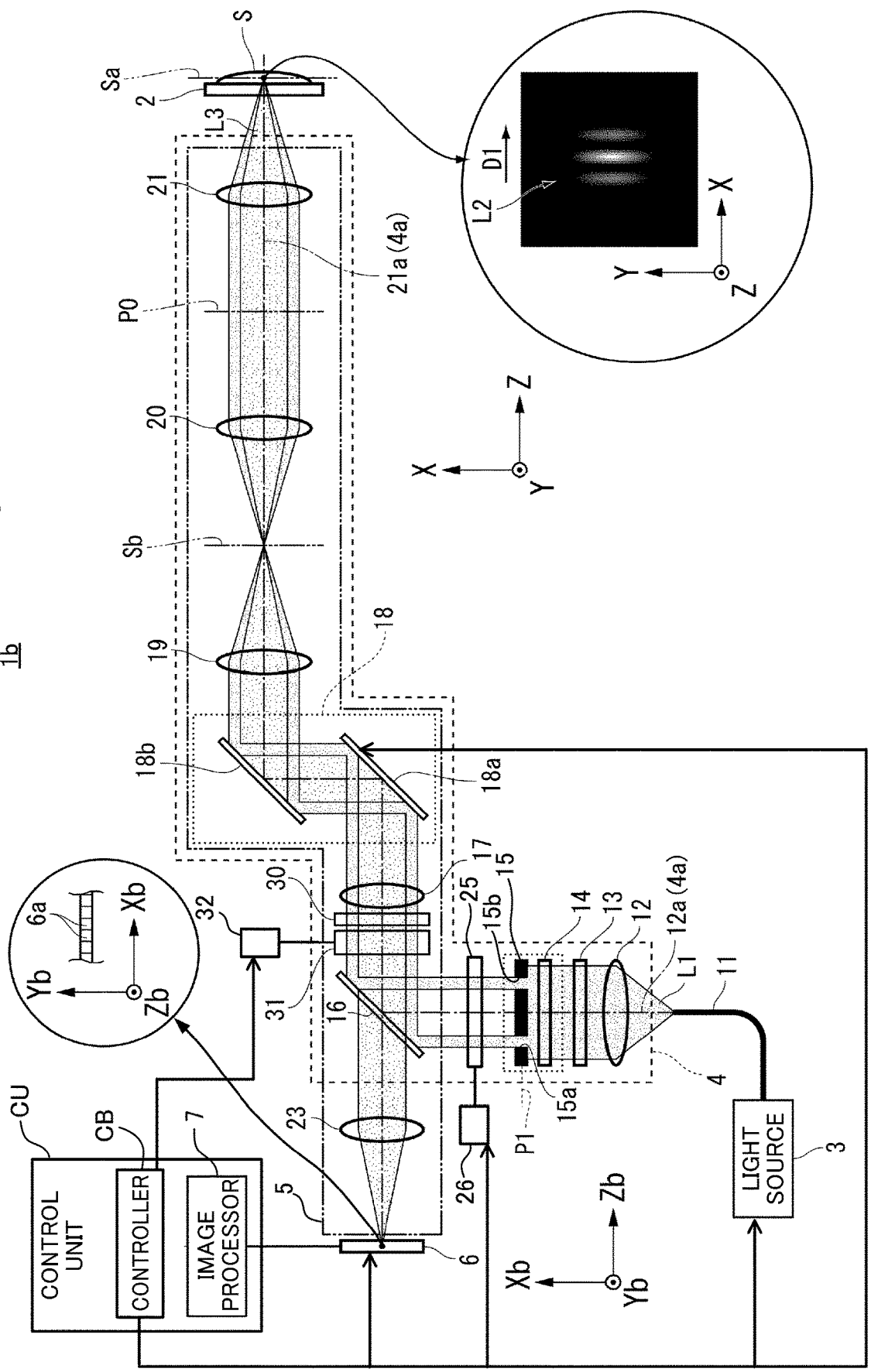
FIG. 13 is a view illustrating a microscope of a third embodiment.

A microscope of a third embodiment will be described. In the microscope of the third embodiment, configurations the same as those of the above-described embodiments will be appropriately denoted by the same reference signs, and description thereof will be omitted or simplified. FIG. 13 is a view illustrating a microscope 1b of the third embodiment. In the present embodiment, a detection device 6 includes a line sensor (line detector) in which a plurality of detectors 6a are disposed one-dimensionally. The plurality of detectors 6a are disposed in one direction in the detection device 6. The detection device 6 is disposed at a position optically conjugate with a specimen plane Sa. A direction in which the plurality of detectors 6a are aligned (hereinafter referred to as a disposition direction) is set in a direction corresponding to a periodic direction of the interference fringes L2. For example, in FIG. 13, the periodic direction of the interference fringes is an X direction, and the disposition direction of the plurality of detectors 6a is set to an Xb direction corresponding to the X direction.

The microscope 1b of the present embodiment includes a λ/2 wavelength plate 30 and an optical path rotating part 31 that rotates an optical path around an optical axis. The λ/2 wavelength plate 30 rotates polarized light passing through the optical path rotating part 31 on the basis of a rotation angle of the optical path by the optical path rotating part 31. The optical path rotating part 31 is disposed in an optical path between a mask 15 and a specimen S in an illumination optical system 4. The optical path rotating part 31 is disposed, for example, at a position in which excitation light L1 becomes substantially parallel light in the optical path of the illumination optical system 4. The optical path rotating part 31 is disposed, for example, at a position through which the excitation light L1 passes in the illumination optical system 4 and fluorescence L3 passes in a detection optical system 5. The optical path rotating part 31 is disposed, for example, in an optical path between a dichroic mirror 16 and the specimen S. The λ/2 wavelength plate 30 may be disposed on the same side as the specimen S with respect to the optical path rotating part 31, or may be disposed on a side opposite to the specimen S with respect to the optical path rotating part 31 (for example, on the same side as a light source of the excitation light).

The optical path rotating part 31 is, for example, an image rotator such as the Dove prism. The optical path rotating part 31 is provided to be rotatable around an optical axis of the illumination optical system 4. The optical path rotating part 31 rotates by being driven by an optical path rotation driver 32. In a case in which the Dove prism is used as the optical path rotating part 31, when the Dove prism is rotated by θ° around the optical axis of the illumination optical system 4, an optical path on a light emission side (on the specimen S side) from the Dove prism is rotated by 2×θ° around the optical axis of the illumination optical system 4 with respect to an optical path on a light incident side (on a light source 3 side) toward the Dove prism. Thereby, an incident plane of the excitation light L1 with respect to the specimen S is rotated by 2×θ° around a Z direction, and the periodic direction of the interference fringes L2 is rotated by 2×θ° around the Z direction. For example, when the periodic direction of the interference fringes L2 is changed by 90°, the optical path rotation driver 32 rotates the optical path rotating part 31 by 45° around the optical axis of the illumination optical system 4. In this way, the optical path rotating part 31 is included in a fringe direction changing part that changes a direction of the interference fringes with respect to the specimen.

The λ/2 wavelength plate 30 is provided to be rotatable around the optical axis of the illumination optical system 4. The λ/2 wavelength plate 30 rotates in association with the optical path rotating part 31. The λ/2 wavelength plate 30 rotates by an angle determined on the basis of a rotation angle of the optical path rotating part 31. For example, the λ/2 wavelength plate 30 is fixed to (for example, integrated with) the optical path rotating part 31 and rotates together with the optical path rotating part 31. In this case, the λ/2 wavelength plate 30 rotates by the same angle as the rotation angle of the optical path rotating part 31.

When the λ/2 wavelength plate 30 is rotated by θ° around the optical axis of the illumination optical system 4, a polarization direction of the excitation light L1 is rotated by 2×θ° around the optical axis of the illumination optical system 4 with respect to a polarization direction on the light incident side (on the light source 3 side). Thereby, a polarization state of the excitation light L1 when it is incident on the specimen S is S-polarized light.

Also, the optical path rotating part 31 of FIG. 13 is also included in an image rotating part. The image rotating part rotates an image of the specimen S (for example, a fluorescence image from the specimen S) around an optical axis of the detection optical system 5 with respect to the plurality of detectors 6a. That is, the fringe direction changing part and the image rotating part include the optical path rotating part 31 as the same member (optical member). The optical path rotating part 31 is disposed at a position on which fluorescence is incident in the optical path of the illumination optical system 4. The image rotating part rotates the fluorescence image using the optical path rotating part 31. The optical path rotating part 31 adjusts the periodic direction of the interference fringes L2 with respect to the disposition direction of the plurality of detectors 6a in the detection device 6. In a case in which the Dove prism is used as the optical path rotating part 31, when the Dove prism is rotated by θ° around the optical axis of the illumination optical system 4, the periodic direction of the interference fringes L2 is rotated by 2×θ° around the Z direction. Then, an optical path of the fluorescence L3 from the specimen S rotates by −2×θ° on the light emission side (on the detection device 6 side) with respect to the light incident side (specimen S side) toward the Dove prism.

When the Dove prism is rotated, an optical path of light toward the specimen S via the Dove prism is rotated, and the periodic direction of the interference fringes L2 with respect to the specimen S is changed. Also, an optical path of light from the specimen S toward the detection device 6 via the Dove prism is rotated by the same angle in a direction opposite to the optical path of the light toward the specimen S. Therefore, when images of the plurality of detectors 6a (for example, the line detector) in the detection device 6 are projected onto the specimen plane Sa via the detection optical system 5, the direction in which the plurality of detectors 6a are aligned and the periodic direction of the interference fringes always coincide with each other even when the periodic direction of the interference fringes is changed by the Dove prism. Therefore, the detection device 6 can detect the fluorescence L3 in the same manner before and after the periodic direction of the interference fringes L2 is changed. The image processor 7 generates images by the processing described in the first and second embodiments on the basis of detection results of the detection device 6.

Further, although the mask driver 22 changes the periodic direction of the interference fringes L2 by rotating the mask 15 in the microscope 1 of the first embodiment described above, the periodic direction of the interference fringes L2 may be changed by the above-described optical path rotating part 31 (for example, Dove prism) also in the first embodiment described above. Also, in both the first embodiment and the third embodiment, the fringe direction changing part for changing the periodic direction of the interference fringes L2 may have a form different from those of the mask driver 22 and the optical path rotating part 31. For example, a stage 2 may be provided to be rotatable around the Z direction, and the direction of the interference fringes L2 with respect to the specimen S may be changed by the rotation. In this case, the stage 2 is included in the fringe direction changing part that changes the direction of the interference fringes L2 with respect to the specimen S.

(Microscope of Fourth Embodiment)

Figure 14:
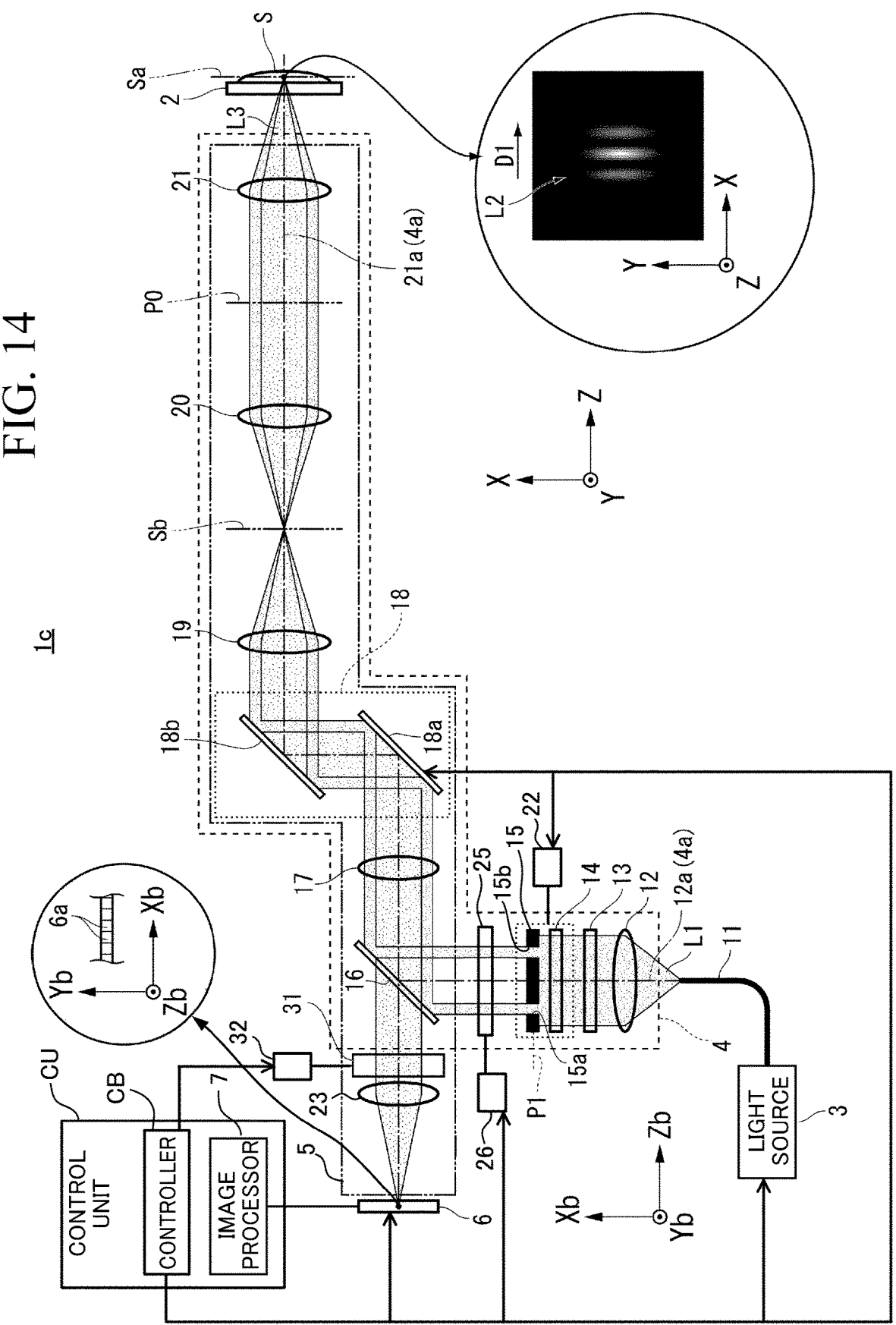
FIG. 14 is a view illustrating a microscope of a fourth embodiment.

FIG. 14 illustrates a microscope 1c of a fourth embodiment. A position at which an optical path rotating part 31 is provided in the microscope 1c of the microscope of FIG. 14 is different from that of the microscope 1b of the third embodiment of FIG. 13. In FIG. 14, a fringe direction changing part is the same as that in the microscope 1 of the first embodiment described above and includes a mask 15 and a mask driver 22. The optical path rotating part 31 serves as both the fringe direction changing part and the image rotating part in the microscope 1b of the third embodiment in FIG. 13, but in the microscope 1c of the fourth embodiment in FIG. 14, the optical path rotating part 31 is provided separately from the fringe direction changing part (the mask 15 and the mask driver 22). In FIG. 14, the optical path rotating part 31 is disposed at a position of an optical path of a detection optical system 5 that does not overlap an optical path of the illumination optical system 4. The optical path rotating part 31 is disposed at a position on which fluorescence L3 is incident while excitation light L1 is not incident. The optical path rotating part 31 is disposed in an optical path between a dichroic mirror 16 and a detection device 6.

In the microscope 1c, the mask driver 22 changes a periodic direction of interference fringes L2 by rotating the mask 15 and a polarizer 14. An optical path rotation driver 32 rotates the optical path rotating part 31 by an angle determined on the basis of a rotation angle of at least one of the mask 15 and the polarizer 14. In the microscope 1c, the driver 32 matches a direction of an image projected on the detection device 6 with respect to a direction in which a plurality of detectors 6a are aligned by rotating the optical path rotating part 31.

Also in the microscope 1b of the third embodiment or the microscope 1b of the fourth embodiment described above, the image processor 7 generates an image on the basis of the detection result of each detector 6a of the detection device 6. Image processing performed by the image processor 7 may be any of the image processing described in the first embodiment or the second embodiment described above.

(Microscope of Fifth Embodiment)

Figure 15:
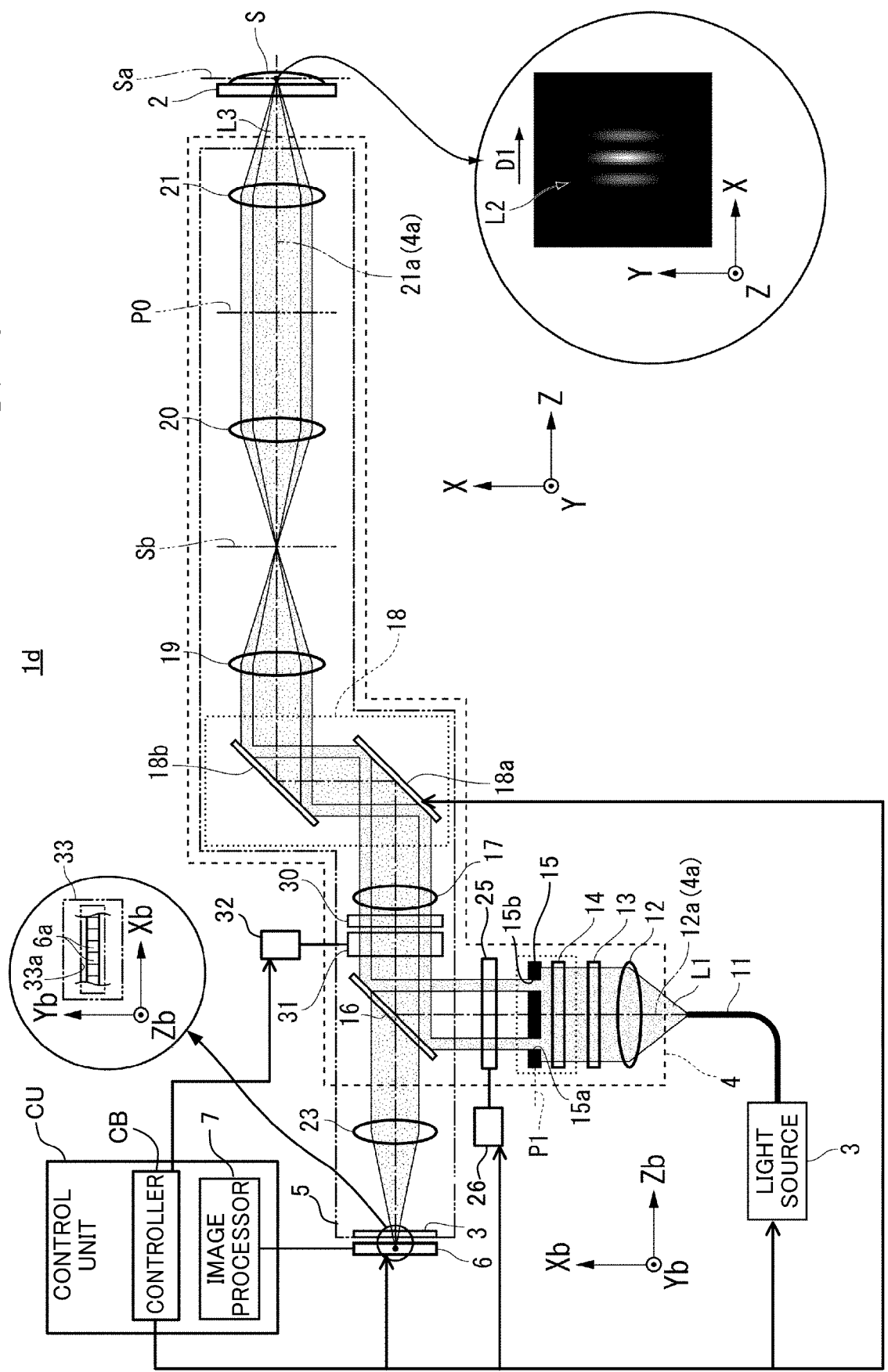
FIG. 15 is a view illustrating a microscope of a fifth embodiment.

A microscope of a fifth embodiment will be described. In the fifth embodiment, configurations the same as those of the above-described embodiments will be appropriately denoted by the same reference signs, and description thereof will be omitted or simplified. FIG. 15 is a view illustrating a microscope 1d of the fifth embodiment. In the fifth embodiment, the microscope 1d includes a light-shielding member 33. The light-shielding member 33 is disposed at or in the vicinity of a position that is optically conjugate with a specimen plane Sa. In FIG. 15, a detection device 6 is disposed at a position optically conjugate with the specimen plane Sa, and the light-shielding member 33 is disposed in the vicinity of the detection device 6. The light-shielding member 33 may be disposed at or in the vicinity of a position that is conjugate with the specimen plane Sa.

The light-shielding member 33 has an opening 33a through which fluorescence L3 passes and blocks the fluorescence L3 around the opening 33a. The opening 33a extends in a disposition direction (Xb direction) of a plurality of detectors 6a in the detection device 6. The opening 33a may be, for example, a rectangular slit. The light-shielding member 33 is disposed so that a long side of the opening 33a is substantially parallel to the disposition direction of the plurality of detectors 6a. The light-shielding member 33 may have the opening 33a that is variable in one or both of a dimension and a shape, and for example, the light-shielding member 33 may be a mechanical diaphragm in which a region blocking light is variable, a spatial light modulator (SLM), or the like. Further, one or both of the dimension and the shape of the opening 33a may be fixed.

The detection device 6 detects the fluorescence L3 that has passed through the opening 33a of the light-shielding member 33. The image processor 7 generates an image on the basis of the detection result of each detector 6a of the detection device 6. Processing performed by the image processor 7 may be any of the processing described in the first embodiment or the second embodiment described above.

(Microscope of Sixth Embodiment)

Figure 16:
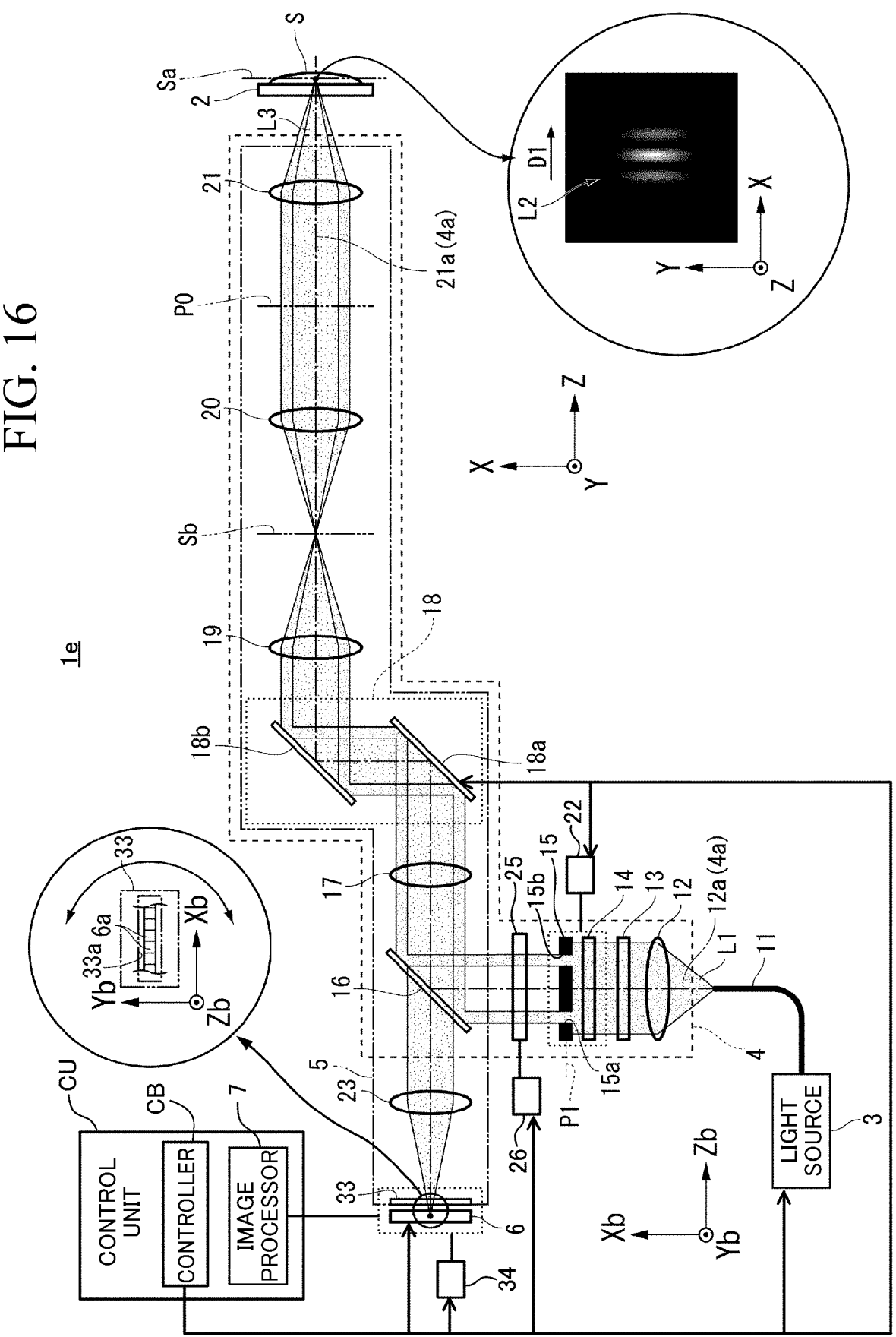
FIG. 16 is a view illustrating a microscope of a sixth embodiment.

A microscope of a sixth embodiment will be described. In the sixth embodiment, configurations the same as those of the above-described embodiments will be appropriately denoted by the same reference signs, and description thereof will be omitted or simplified. FIG. 16 is a view illustrating a microscope 1e of the sixth embodiment. In the present embodiment, the microscope 1e includes a mask driver 22 as in the microscope 1 of the first embodiment described above. Also, the microscope 1e includes a detection device driver 34 for rotating a detection device 6. The mask driver 22 rotates the mask 15 to change a periodic direction of interference fringes L2. A mask driver 22 is included in a fringe direction changing part that changes a direction of the interference fringes L2 with respect to a specimen S.

In the present embodiment, the detection device 6 is rotatable around a Zb direction with an optical axis of a detection optical system 5 as a center. The detection device driver 34 rotates the detection device 6 around the Zb direction. The detection device driver 34 rotates the detection device 6 so that a disposition direction of detectors 6a in the detection device 6 corresponds to a periodic direction of the interference fringes L2. For example, when the mask driver 22 rotates the mask 15 by 90°, since the periodic direction of the interference fringes L2 changes by 90°, the detection device driver 34 rotates the detection device 6 by 90°.

Also, the detection device driver 34 rotates a light-shielding member 33 so that a relative position between the detection device 6 and the light-shielding member 33 is maintained. For example, the light-shielding member 33 and the detection device 6 are integrated, and the detection device driver 34 integrally rotates the light-shielding member 33 and the detection device 6.

Further, the microscope 1 may include an optical path rotating part 31 illustrated in FIG. 14 instead of rotating the detection device 6. Also, the microscope 1e may not include the light-shielding member 33 as illustrated in FIG. 14.

(Microscope of Seventh Embodiment)

Figure 17:
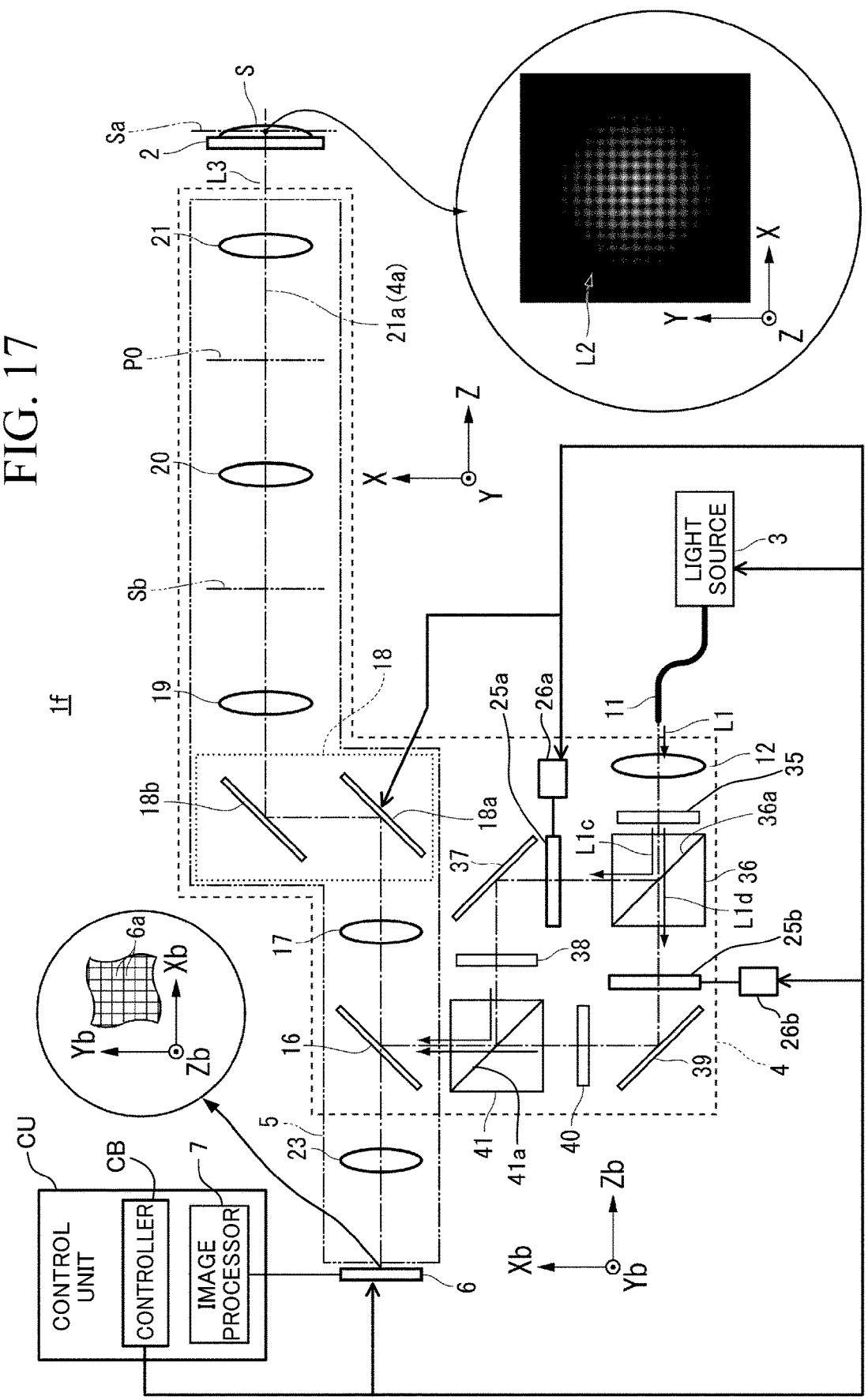
FIG. 17 is a view illustrating a microscope of a seventh embodiment.

A microscope of a seventh embodiment will be described. In the seventh embodiment, configurations the same as those of the above-described embodiments will be appropriately denoted by the same reference signs, and description thereof will be omitted or simplified. FIG. 17 is a view illustrating a microscope 1f of the seventh embodiment. In the above-described first embodiment, an example in which the illumination pupil is divided into two poles (two regions) on the pupil plane P0 (see FIG. 2C) has been described, but the illumination pupil may be in another form. Here, a form in which the illumination pupil is divided into four poles (four regions) on the pupil plane will be described.

An illumination optical system 4 of the present embodiment includes a collimator lens 12, a λ/2 wavelength plate 35, a polarization splitting element 36, a phase modulation element 25a, a mirror 37, a mask 38 (opening member), a phase modulation element 25b, a mirror 39, a mask 40 (opening member), and a polarization splitting element 41 on a light emission side of an optical fiber 11. The illumination optical system 4 has the same configuration as the above-described first embodiment for a configuration from a dichroic mirror 16 to an objective lens 21.

Excitation light L1 emitted from the optical fiber 11 is converted into substantially parallel light by the collimator lens 12 and is incident on the λ/2 wavelength plate 35. The excitation light L1 that has passed through the λ/2 wavelength plate 35 includes excitation light L1c that is linearly polarized light in a first direction and excitation light L1d that is linearly polarized light in a second direction. In the λ/2 wavelength plate 35, a direction of an optical axis (a fast axis and a slow axis) thereof is set so that an amount of light of the excitation light L1c and an amount of light of the excitation light L1d are in a predetermined ratio.

The excitation light L1 (the excitation light L1c and the excitation light L1d) that has passed through the λ/2 wavelength plate 35 is incident on the polarization splitting element 36. The polarization splitting element 36 includes a polarization splitting film 36a inclined with respect to an optical axis 12a of the collimator lens 12. The polarization splitting film 36a has a characteristic in which the linearly polarized light in the first direction is reflected and the linearly polarized light in the second direction is transmitted. The polarization splitting element 36 is, for example, a polarizing beam splitter prism (PBS prism). The above-described linearly polarized light in the first direction is S-polarized light with respect to the polarization splitting film 36a. The above-described linearly polarized light in the second direction is P-polarized light with respect to the polarization splitting film 36a.

The excitation light L1c, which is S-polarized light with respect to the polarization splitting film 36a, is reflected by the polarization splitting film 36a and is incident on the mask 38 via the phase modulation element 25a and the mirror 37. The excitation light L1d, which is P-polarized light with respect to the polarization splitting film 36a, passes through the polarization splitting film 36a and is incident on the mask 40 via the phase modulation element 25b and the mirror 39. The mask 38 and the mask 40 serve as a luminous flux splitting part that splits excitation light that excites a fluorescent substance into a plurality of luminous fluxes. The mask 38 and the mask 40 will be described later with reference to FIGS. 18A to 18C.

The excitation light L1c that has passed through the mask 38 and the excitation light L1d that has passed through the mask 40 are each incident on the polarization splitting element 41. The polarization splitting element 41 includes a polarization splitting film 41a inclined with respect to an optical path of the excitation light L1c and an optical path of the excitation light L1d. The polarization splitting film 41a has a characteristic in which the linearly polarized light in the first direction is reflected and the linearly polarized light in the second direction is transmitted. The polarization splitting element 41 may be, for example, a polarizing beam splitter prism (PBS prism). The above-described linearly polarized light in the first direction is S-polarized light with respect to the polarization splitting film 41a. The above-described linearly polarized light in the second direction is P-polarized light with respect to the polarization splitting film 41a.

The excitation light L1c is S-polarized light with respect to the polarization splitting film 41a and is reflected by the polarization splitting film 41a to be incident on the dichroic mirror 16. The excitation light L1d is P-polarized light with respect to the polarization splitting film 41a and passes through the polarization splitting film 41a to be incident on the dichroic mirror 16. Further, one or both of the polarization splitting element 36 and the polarization splitting element 41 may not be the PBS prism. One or both of the polarization splitting element 36 and the polarization splitting element 41 may be a photonic crystal in which reflection/transmission are exhibited differently depending on TE polarization and TM polarization.

Figure 18A:
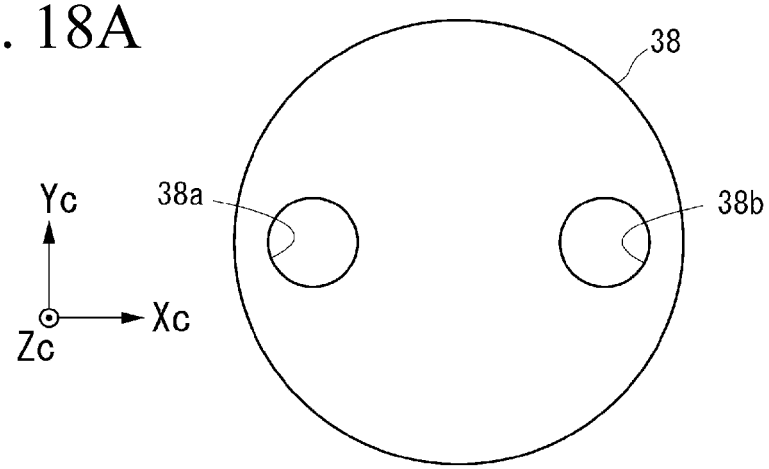
FIG. 18A is a view illustrating a mask of the seventh embodiment.
Figure 18B:
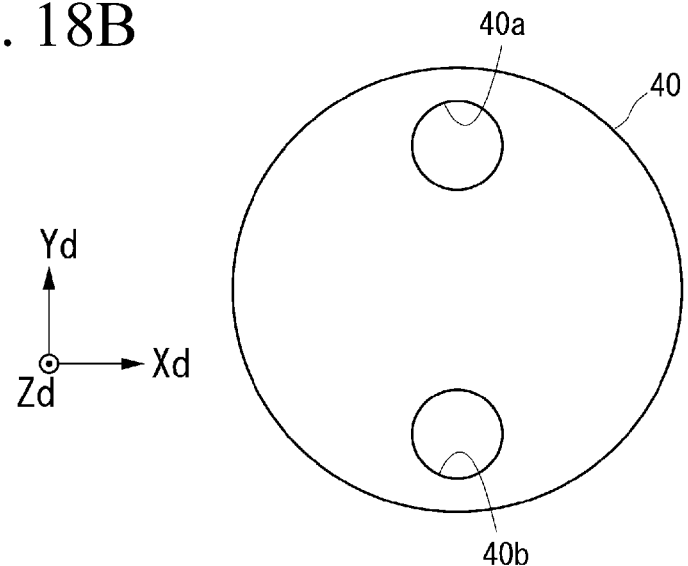
FIG. 18B is a view illustrating a mask of the seventh embodiment.
Figure 18C:
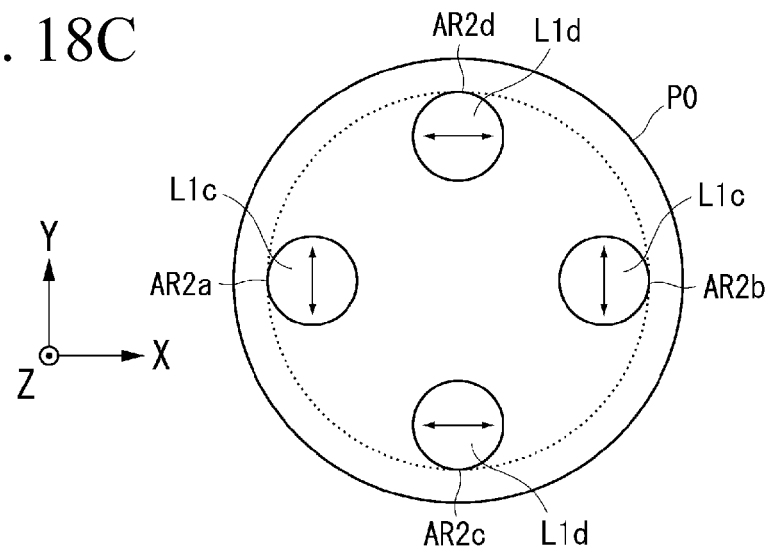
FIG. 18C is a view illustrating a polarization state of a mask and excitation light of the seventh embodiment.

FIGS. 18A to 18C are views illustrating a mask and a polarization state of excitation light in the seventh embodiment. In FIG. 18A, an Xc direction, a Yc direction, and a Zc direction are directions corresponding to the X direction, the Y direction, and the Z direction on the specimen plane Sa (see FIG. 17). The mask 38 has an opening 38a and an opening 38b. The mask 38 is disposed on or in the vicinity of a pupil-plane conjugate plane. The opening 38a and the opening 38b are aligned in the Xc direction. The opening 38a and the opening 38b are, for example, circular, but may be a shape other than a circle.

In FIG. 18B, an Xd direction, a Yd direction, and a Zd direction are directions corresponding to the X direction, the Y direction, and the Z direction on the specimen plane Sa (see FIG. 17). The mask 40 is disposed on or in the vicinity of the pupil-plane conjugate plane. The mask 38 or the mask 40 may be disposed on or in the vicinity of the pupil plane. The mask 40 has an opening 40a and an opening 40b. The opening 40a and the opening 40b are aligned in the Yd direction. The opening 40a and the opening 40b are, for example, circular, but may be a shape other than a circle.

In FIG. 18C, reference sign AR2a is a region on a pupil plane P0 of the objective lens 21 on which the excitation light L1c that has passed through the opening 38a of the mask 38 is incident. Reference sign AR2b is a region on the pupil plane P0 on which the excitation light L1c that has passed through the opening 38b of the mask 38 is incident. Arrows in the region AR2a and the region AR2b indicate polarization directions of the incident excitation light L1c. The region AR2a and the region AR2b are aligned in the X direction.

The excitation light L1c incident on the region AR2a and the excitation light L1c incident on the region AR2b are each linearly polarized light in the Y direction. The excitation light L1c incident on the region AR2a and the excitation light L1c incident on the region AR2b have the same polarization direction and interfere with each other on the specimen plane Sa (see FIG. 17). Due to this interference, interference fringes whose periodic direction is in the X direction are formed on the specimen plane Sa. An incident plane of the excitation light L1c with respect to the specimen plane Sa is an XZ plane, and the excitation light L1c is incident on the specimen plane Sa as S-polarized light.

Also, in FIG. 18C, reference sign AR2c is a region on the pupil plane P0 on which the excitation light L1d that has passed through the opening 40a of the mask 40 is incident. Reference sign AR2d is a region on the pupil plane P0 on which the excitation light L1d that has passed through the opening 40b of the mask 40 is incident. Arrows in the region AR2c and the region AR2d indicate polarization directions of the incident excitation light L1d. The region AR2c and the region AR2d are aligned in the Y direction.

The excitation light L1d incident on the region AR2c and the excitation light L1d incident on the region AR2d are each linearly polarized light in the X direction. The excitation light L1d incident on the region AR2c and the excitation light L1d incident on the region AR2d have the same polarization direction and interfere with each other on the specimen plane Sa (see FIG. 17). Due to the interference, interference fringes whose periodic direction is the Y direction are formed on the specimen plane Sa. An incident plane of the excitation light L1d with respect to the specimen plane Sa is a YZ plane, and the excitation light L1c is incident on the specimen plane Sa as S-polarized light.

Returning to the description of FIG. 17, interference fringes L2 in which interference fringes due to interference of the excitation light L1c and interference fringes due to interference of the excitation light L1d are combined is formed on the specimen plane Sa. Further, since the polarization directions of the excitation light L1c and the excitation light L1d are substantially perpendicular to each other, interference between the excitation light L1c and the excitation light L1d is suppressed.

A detection device 6 detects fluorescence L3 from the specimen S via a detection optical system 5. As described in the first embodiment, the detection device 6 is an image sensor in which a plurality of detectors 6a are disposed in two directions including an Xb direction and a Yb direction. Also in the seventh embodiment, the detection device 6 acquires the fluorescence from the specimen S excited by the interference fringes L2 having a plurality of phases. Therefore, angular positions of the phase modulation element 25a and the phase modulation element 25b disposed in the illumination optical system 4 are sequentially rotated and moved by phase modulation element drive parts 26a and 26 to change the phase of the interference fringes L2. Configurations of the phase modulation element 25a and the phase modulation element 25b are the same as that of the phase modulation element 25 in the first embodiment described above. The image processor 7 generates an image on the basis of the detection result of the detection device 6.

Figure 19:
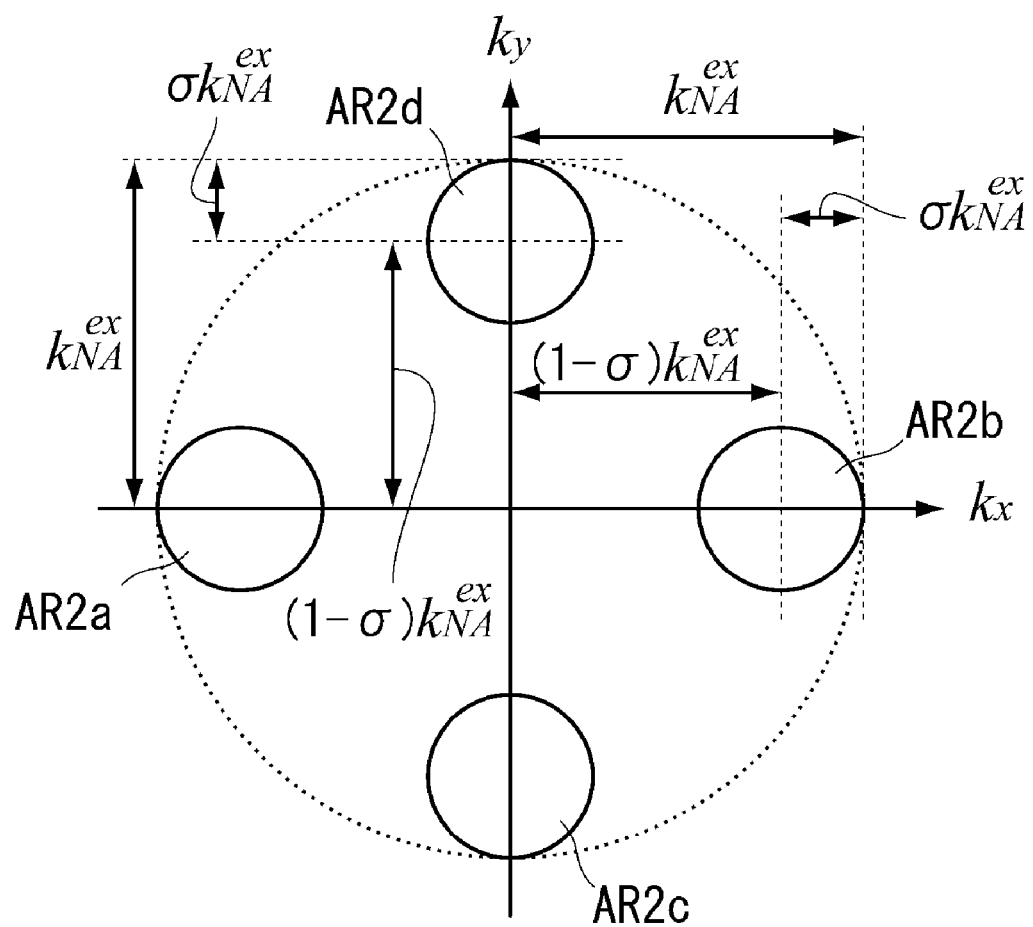
FIG. 19 is a view illustrating a distribution of excitation light L1 on a pupil conjugate plane P1 in the seventh embodiment.

FIG. 19 is a view illustrating a distribution of the excitation light L1 on a pupil conjugate plane P1 in the seventh embodiment. In FIG. 19, the pupil conjugate plane P1 is represented by a wave number coordinate space. kNAex (circle drawn by a dotted line) illustrated in FIG. 19 is a pupil radius of the objective lens 21. Regions AR2a and AR2b on which the excitation light L1c is incident and regions AR2c and AR2d on which the excitation light L1d is incident are circular here but are not limited to a circular shape. A radius of each region from the region ARa to the region ARd is σkNAex. A distance between a center of each region from the region ARa to the region ARd and an optical axis 21a of the objective lens 21 is (1−σ)kNAex. A distance between the center of the region AR2a and the center of the region AR2b is, for example, 2 (1−σ)kNAex, but is not limited to the value. Also, a distance between the center of the region AR2c and the center of the region AR2d is, for example, 2 (1−σ)kNAex, but is not limited to the value.

An intensity (square of the electric field) ill(r) on the specimen plane Sa is represented by the following expression (23). In expression (23), k0x and k0y are each a wave number vector of the interference fringes L2. k0x is represented by k0x=(k0, 0). k0y is represented by k0y=(0, k0). k0, which is a component of k0x and k0y, is represented by k0=2(1−σ)kNAex.

[Math. 23]

$$ill(r) = PSF_{ill}(r) \frac{2 + \cos(2\pi k_{0x} \cdot r + \phi_x) + \cos(2\pi k_{0y} \cdot r + \phi_y)}{2}$$

expression (23)

In the seventh embodiment, a shape of the illumination pupil is different from those of the above-described embodiments, but the image acquisition flows and the image processing described in the first embodiment and the second embodiment described above can also be applied to the seventh embodiment. Therefore, description of the image acquisition flow and the image processing will be omitted.

(Microscope of Eighth Embodiment)

Figure 20:
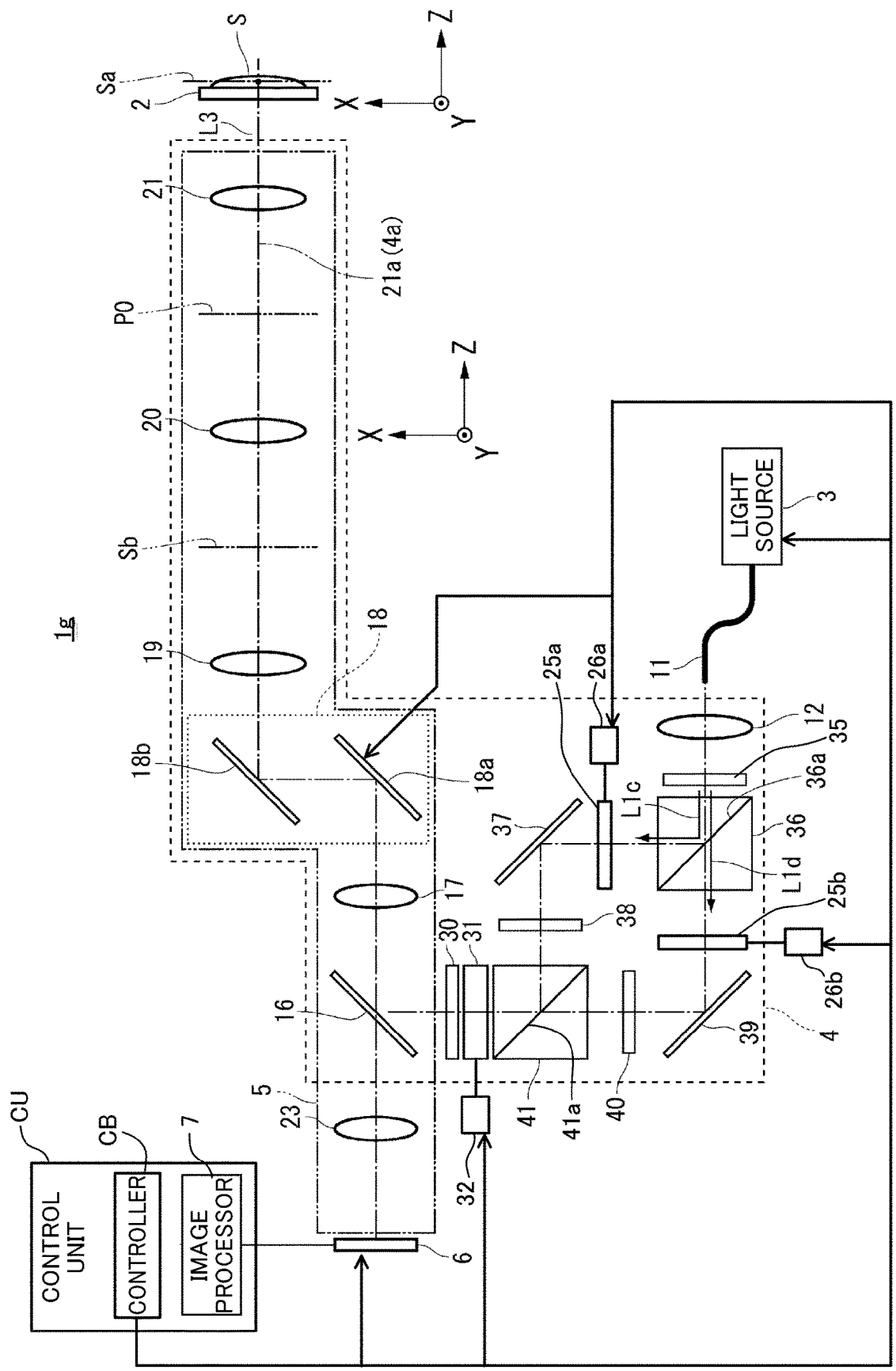
FIG. 20 is a view illustrating a microscope according to an eighth embodiment.

A microscope of an eighth embodiment will be described. Since most of configurations of the eighth embodiment are common to the configurations of the seventh embodiment illustrated in FIG. 17, the same reference signs will be given to the same configurations as appropriate, and description thereof will be omitted or simplified. FIG. 20 is a view illustrating a microscope 1g of the eighth embodiment. In the present embodiment, the microscope 1g includes the λ/2 wavelength plate 30 and the optical path rotating part 31 described with reference to FIG. 13 in an illumination optical system 4. The optical path rotating part 31 is driven by an optical path rotation driver 32 and rotates around an optical axis of the illumination optical system 4. When the optical path rotating part 31 rotates, an optical path of excitation light L1c and an optical path of excitation light L1d rotate around the optical axis of the illumination optical system 4. As a result, a periodic direction of interference fringes L2 formed on a specimen plane Sa rotates around a Z direction.

Figure 21A:
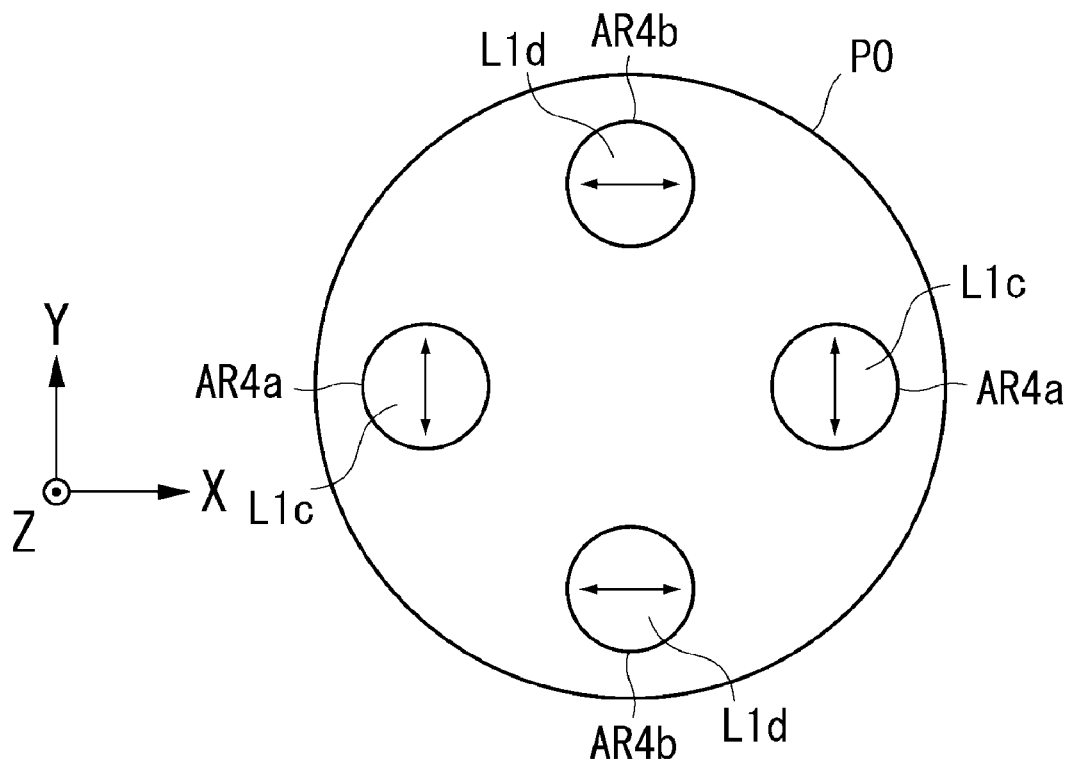
FIG. 21A is a view illustrating a polarization state of excitation light in the eighth embodiment.
Figure 21B:
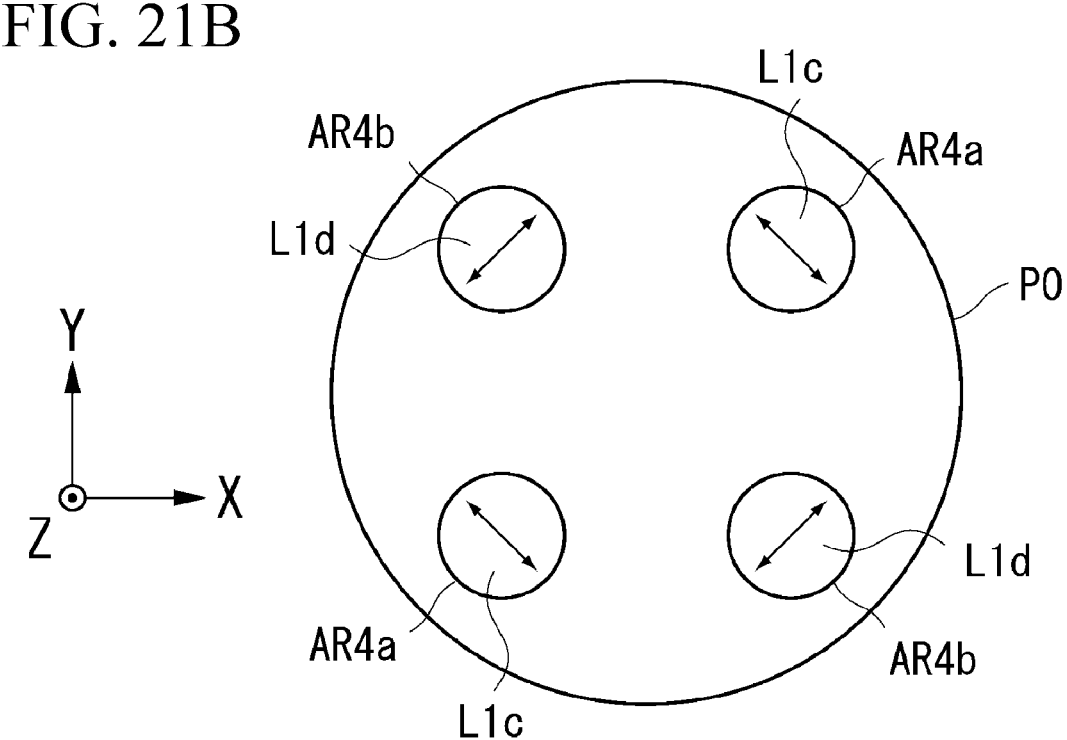
FIG. 21B is a view illustrating a polarization state of excitation light in the eighth embodiment.

FIGS. 21A and 21B are views illustrating a polarization state of the excitation light in the eighth embodiment. In FIG. 21A, regions AR4a on which the excitation light L1c is incident on a pupil plane P0 are aligned in an X direction. Also, a region AR4b and a region AR4b on which the excitation light L1d is incident on the pupil plane P0 are aligned in a Y direction.

FIG. 21B corresponds to a state in which the Dove prism (the optical path rotating part 31 in FIG. 20) and the λ/2 wavelength plate 30 are rotated by 22.5° from the state of FIG. 21A. In FIG. 21B, the regions AR4a on which the excitation light L1c is incident on the pupil plane P0 are aligned in a direction rotated by 45° from the X direction. In this state, the periodic direction of the interference fringes of the excitation light L1c on the specimen plane Sa is a direction rotated by 45° from the X direction. Further, the regions AR4b on which the excitation light L1d is incident on the pupil plane P0 are aligned in a direction rotated by 45° from the Y direction. In this state, the periodic direction of the interference fringes of the excitation light L1d on the specimen plane Sa is a direction rotated by 45° from the Y direction.

Returning to the description of FIG. 20, in the eighth embodiment, a detection device 6 detects fluorescence L3 from the specimen S while setting phase modulation elements 25a and 25b to a predetermined rotation angle to set a phase of the interference fringes L2 to a plurality of predetermined values before and after the periodic direction of the interference fringes L2 is changed. An image processor 7 generates an image on the basis of a detection result of the detection device 6 before the periodic direction of the interference fringes L2 is changed and a detection result of the detection device 6 after the periodic direction of the interference fringes L2 is changed. Further, the optical path rotating part 31 may be disposed in an optical path between a dichroic mirror 16 and the detection device 6.

Also, in the eighth embodiment, the microscope 1 changes the periodic direction of the interference fringes L2 using the optical path rotating part 31, but a fringe direction changing part for changing the periodic direction of the interference fringes L2 may have an aspect different from that of the optical path rotating part 31.

(Microscope of Ninth Embodiment)

A microscope of a ninth embodiment will be described. Since most of configurations of the ninth embodiment are common to the configurations of the seventh embodiment illustrated in FIG. 17 and the configuration of the eighth embodiment illustrated in FIG. 20, configurations the same as those of the above-described embodiments will be appropriately denoted by the same reference signs, and description thereof will be omitted or simplified.

Figure 22:
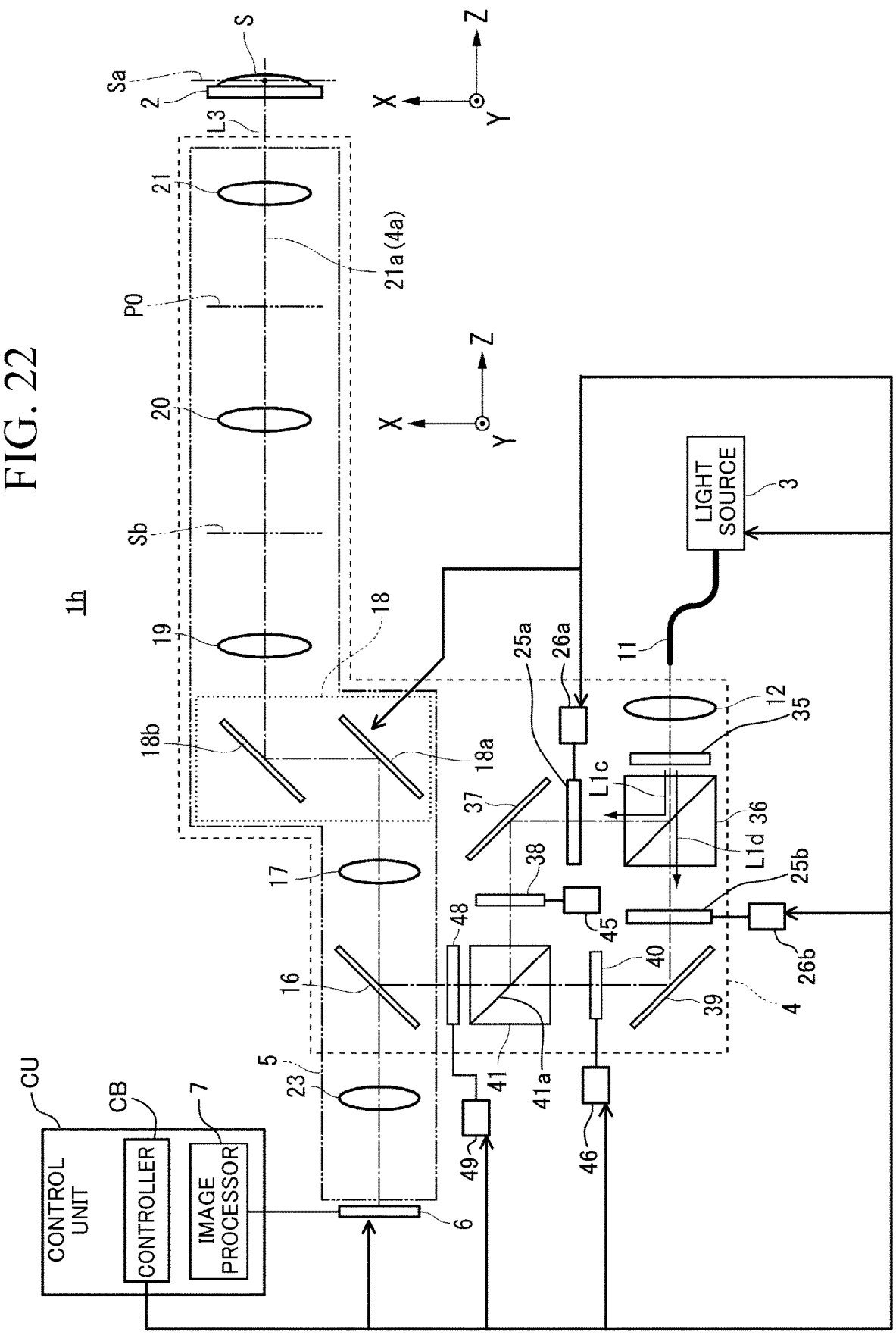
FIG. 22 is a view illustrating a microscope of a ninth embodiment.
Figure 23A:
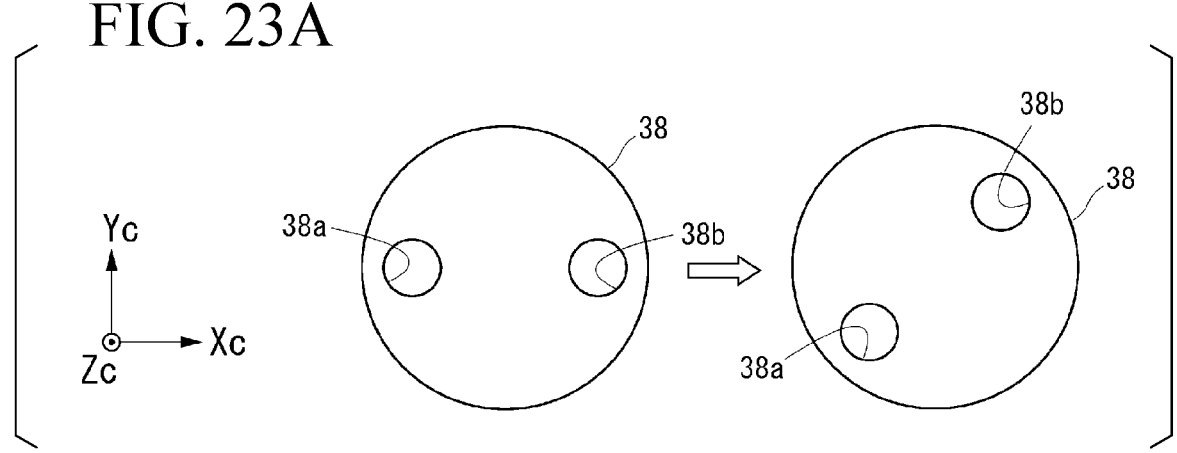
FIG. 23A is a view illustrating a mask of the ninth embodiment.
Figure 23B:
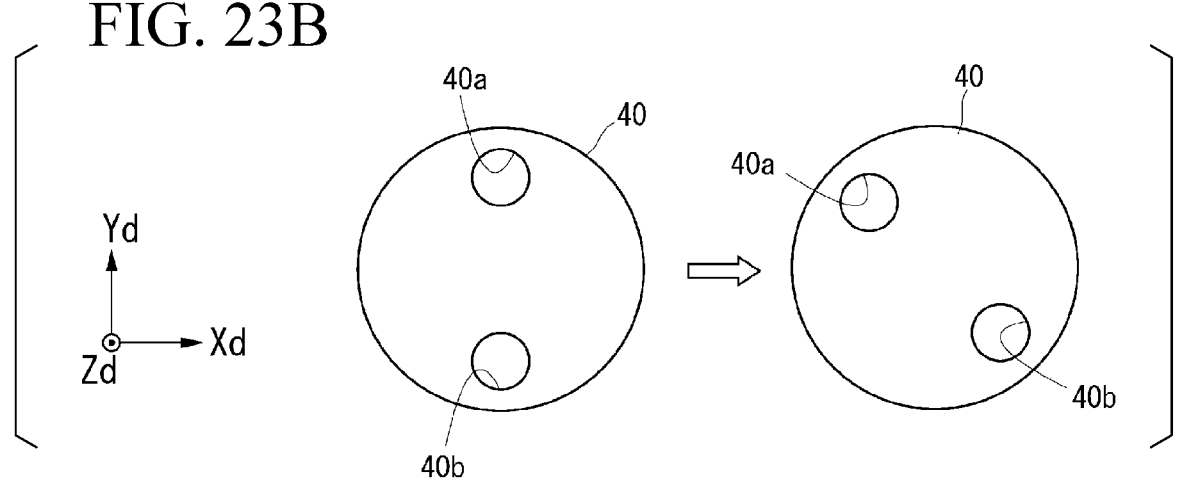
FIG. 23B is a view illustrating a mask of the ninth embodiment.

FIG. 22 is a view illustrating a microscope 1h of the ninth embodiment. FIGS. 23A and 23B are views illustrating a mask according to the ninth embodiment. In the ninth embodiment, the microscope 1h includes a driver 45 and a driver 46. A mask 38 is rotatable around an optical axis of an illumination optical system 4. The mask 38 is driven by the mask driver 45 and rotates (see FIG. 23A). In FIG. 23A, the mask 38 is rotated counterclockwise by 45°.

Also, the mask 40 is rotatable around an optical axis of the illumination optical system 4. The mask 40 is driven by the mask driver 46 and rotates (see FIG. 23B). The driver 46 rotates the mask 40 by the same angle as an angle at which the driver 45 rotates the mask 38. In FIG. 23B, the mask 40 is rotated counterclockwise by 45°. As a result, a periodic direction of interference fringes L2 on a specimen plane Sa is rotated by 45° around a Z direction.

A λ/2 wavelength plate 48 is provided in an optical path between a polarization splitting element 41 and a dichroic mirror 16. The λ/2 wavelength plate 48 is driven by a wavelength plate driver 49 and rotates around the optical axis of the illumination optical system 4. The λ/2 wavelength plate 48 and the wavelength plate driver 49 adjust excitation light L1c and excitation light L1d to be incident on the specimen S as S-polarized light.

(Microscope of Tenth Embodiment)

Figure 24:
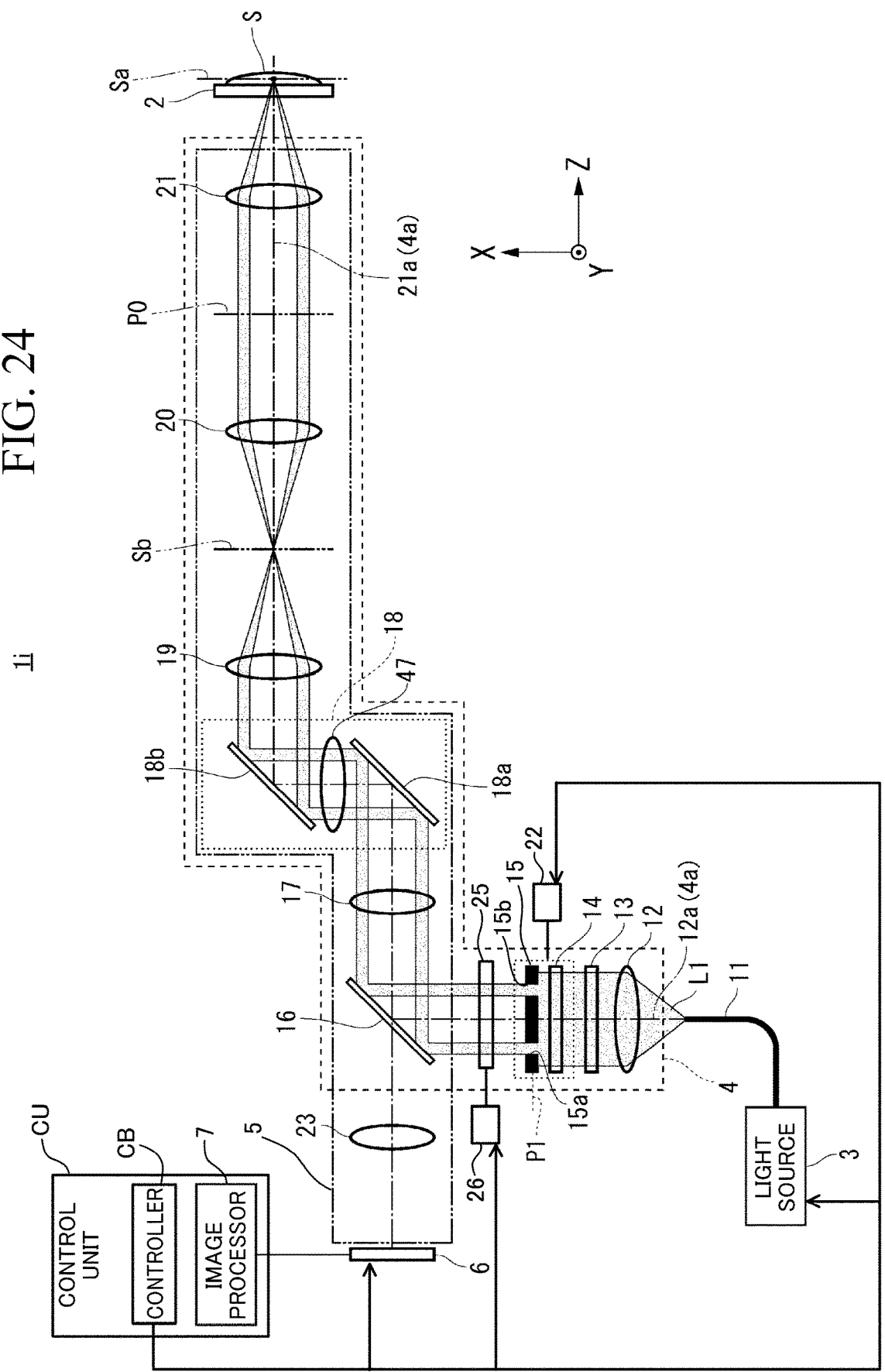
FIG. 24 is a view illustrating a microscope of a tenth embodiment.

A microscope of a tenth embodiment will be described. In the present embodiment, configurations the same as those of the above-described embodiments will be appropriately denoted by the same reference signs, and description thereof will be omitted or simplified. FIG. 24 is a view illustrating a microscope 1i of the tenth embodiment. In the present embodiment, the microscope 1i includes a relay optical system 47. The relay optical system 47 is a part of an illumination optical system 4 and a part of a detection optical system 5. The relay optical system 47 is disposed in an optical path between a deflecting mirror 18a and a deflecting mirror 18b in an optical path changing part 18. The deflecting mirror 18b is disposed at substantially the same position as a first pupil conjugate plane that is optically conjugate with a pupil plane P0 of an objective lens 21. The relay optical system 47 is provided so that a second pupil conjugate plane that is optically conjugate with the above-described first pupil conjugate plane is formed between the relay optical system 47 and a relay optical system 17. The deflecting mirror 18a is disposed at substantially the same position as the second pupil conjugate plane described above.

Further, the optical path changing part 18 is not limited to the above-described form. For example, a stage 2 may include a Y stage that moves in a Y direction with respect to the objective lens 21, and the optical path changing part 18 may include a Y stage instead of the deflecting mirror 18b. In this case, the optical path changing part 18 may scan a specimen S with excitation light L1 in an X direction using the deflecting mirror 18a and scan the specimen S with the excitation light L1 in the Y direction due to movement of the Y stage. In this case, the deflecting mirror 18a may be disposed at substantially the same position as the pupil conjugate plane that is optically conjugate with the pupil plane P0 of the objective lens 21.

Also, the stage 2 may include an X stage that moves in the X direction with respect to the objective lens 21. In this case, relative scanning of the excitation light L1 on the specimen S may be performed in the X direction due to the above-described movement of the X stage, and scanning of the excitation light L1 on the specimen S may be performed in the Y direction due to the deflecting mirror 18b. In this case, the deflecting mirror 18b may be disposed at substantially the same position as the pupil conjugate plane that is optically conjugate with the pupil plane P0 of the objective lens 21. In this case, the X stage and the deflecting mirror 18b constitute a scanning part that allows relative scanning of the interference fringes L2 on the specimen S.

Also, the stage 2 may include the X stage that moves in the X direction with respect to the objective lens 21 and the Y stage that moves in the Y direction with respect to the objective lens 21. In this case, relative scanning of the excitation light L1 on the specimen S may be performed in the X direction due to the above-described movement of the X stage, and relative scanning of the excitation light L1 on the specimen S may be performed in the Y direction due to the above-described movement of the Y stage. In this case, the X stage and the Y stage constitute a scanning part that allows relative scanning of the interference fringes L2 on the specimen S.

That is, the scanning part is not limited to the optical path changing part described in the first embodiment to the ninth embodiment described above, and may include a moving mechanism that changes a relative position of the specimen table holding the specimen S such as the above-described X stage and Y stage and the illumination optical system 4 and the detection optical system 5.

In the above-described embodiments, the scanning directions for scanning the specimen S with the interference fringes are two directions including the X direction and the Y direction, and the illumination optical system 4 two-dimensionally scans the specimen S with the interference fringes. Further, the scanning directions for scanning the specimen S with the interference fringes may be three directions including the X direction, the Y direction, and the Z direction. For example, the microscope 1 may execute 2D processing of scanning the specimen S with the interference fringes in the X direction and Y direction to acquire a 2D image, and may three-dimensionally scan the specimen S with the interference fringes, for example, by moving at least one of the objective lens 21 and the stage 2 to change the position in the Z direction in which the interference fringes are generated and repeating the 2D processing. The microscope 1 may acquire a plurality of 2D images having different positions in the Z direction by three-dimensionally scanning the specimen S with the interference fringes to generate a 3D image (for example, Z-stack). When the specimen S is three-dimensionally scanned with the interference fringes, the illumination optical system 4 may scan the specimen S in the X direction and the Y direction and scan the specimen S in the Z direction by moving at least one of the objective lens 21 and the stage 2. Also, the illumination optical system 4 may three-dimensionally scan the specimen S with the interference fringes.

(Microscope of Modified Example 1)

Hereinafter, a microscope of a modified example 1 will be described. Since configurations of the microscope of the modified example 1 are the same as those of the microscopes of the above-described embodiments except for a shape of the illumination pupil and a polarization state of the illumination light to be described below, description of the configuration will be omitted. FIGS. 25A to 26B are views illustrating an illumination pupil in the microscope of the modified example 1.

Figure 25A:
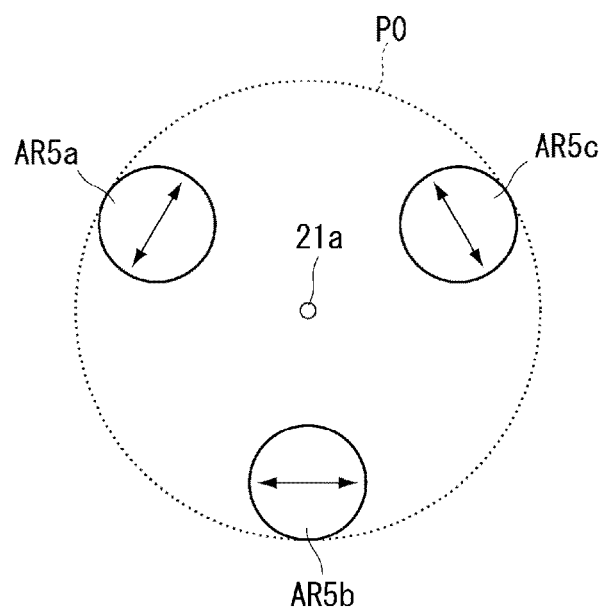
FIG. 25A is a view illustrating an illumination pupil in a modified example.

The illumination pupil has two poles in FIG. 2C, four poles in FIG. 18C, but three poles in FIG. 25A. Reference signs AR5a to reference signs AR5c are regions on which excitation light is incident on the pupil plane P0. In this case, first interference fringes due to excitation light incident on the region AR5a and excitation light incident on the region AR5b, second interference fringes due to excitation light incident on the region AR5b and excitation light incident on the region AR5c, and third interference fringes due to excitation light incident on the region AR5c and excitation light incident on the region AR5a are formed on the specimen plane Sa. Interference fringes in which the above-described first interference fringes, second interference fringes, and third interference fringes are combined are formed on the specimen plane Sa. In this interference fringes, since a periodic direction of the first interference fringes, a periodic direction of the second interference fringes, and a periodic direction of the third interference fringes are respectively periodic directions, and the periodic direction is three directions, a super-resolution effect in three directions can be obtained. Further, the illumination pupil may have five or more poles.

Figure 25B:
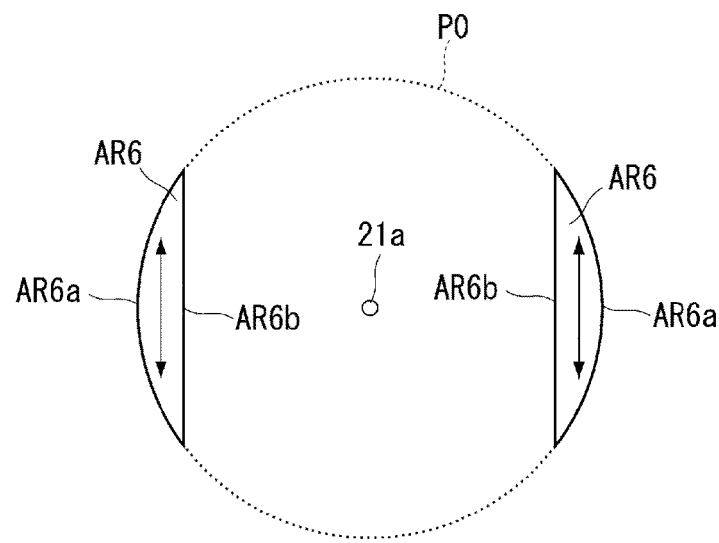
FIG. 25B is a view illustrating an illumination pupil in a modified example.
Figure 25C:
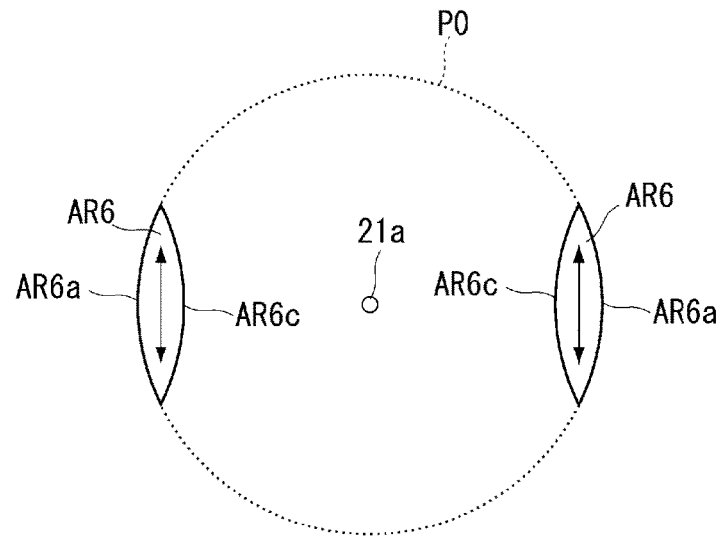
FIG. 25C is a view illustrating an illumination pupil in a modified example.

Also, the illumination pupil has a circular shape in FIG. 2C or the like but may have other shapes. In FIGS. 25B and 25C, reference sign AR6 is a region on which excitation light is incident. The region AR6 in FIG. 25B is a region surrounded by a circle AR6a which is a part of a circle having the optical axis 21a of the objective lens 21 as a center and a straight line AR6b connecting both ends of the arc AR6a. Also, the region AR6 in FIG. 25C is a region surrounded by an arc which is a part of a circle having the optical axis 21a of the objective lens 21 as a center and a curve AR6c that is symmetrical to the arc AR6a.

When the illumination pupil has the shape of FIG. 25B or FIG. 25C, a resolution in a direction in which the interference fringes are not formed is improved and sectioning is also improved compared to a case in which the illumination pupil has a circular shape. Also, when the illumination pupil has the shape of FIG. 25B, a resolution in a direction in which the interference fringes are not formed is improved and sectioning is also improved compared to a case in which the illumination pupil has the shape of FIG. 25C. Also, when the illumination pupil has the shape of FIG. 25C, a resolution in a direction in which the interference fringes are formed is improved compared to a case in which the illumination pupil has the shape of FIG. 25B.

Figure 26A:
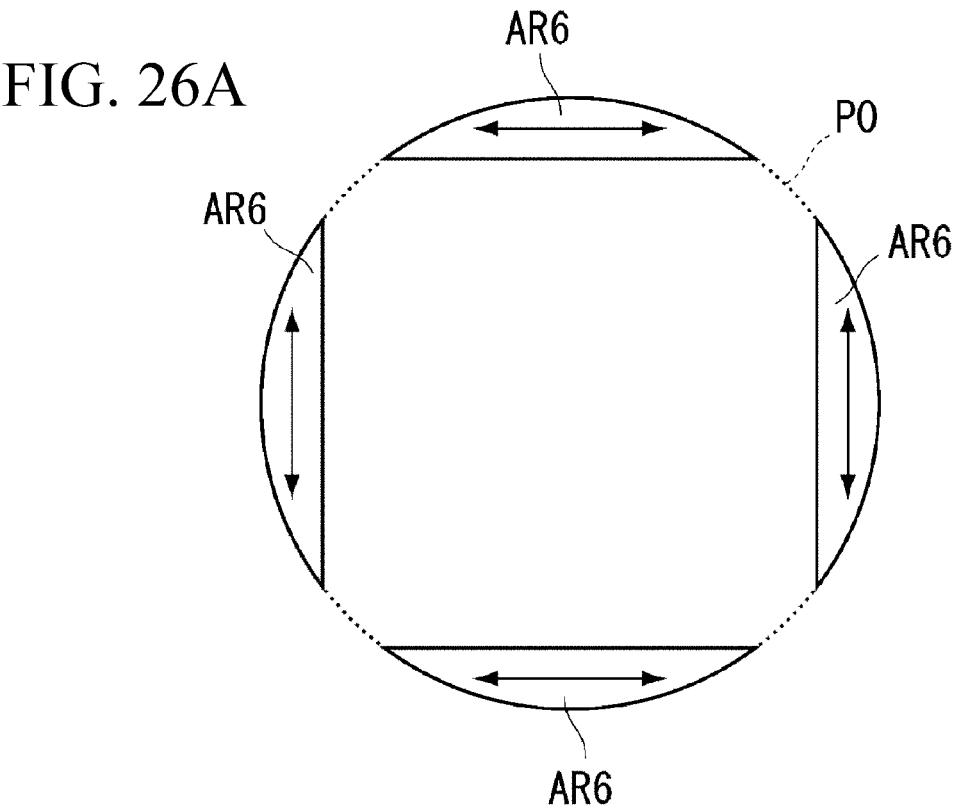
FIG. 26A is a view illustrating an illumination pupil in the modified example.
Figure 26B:
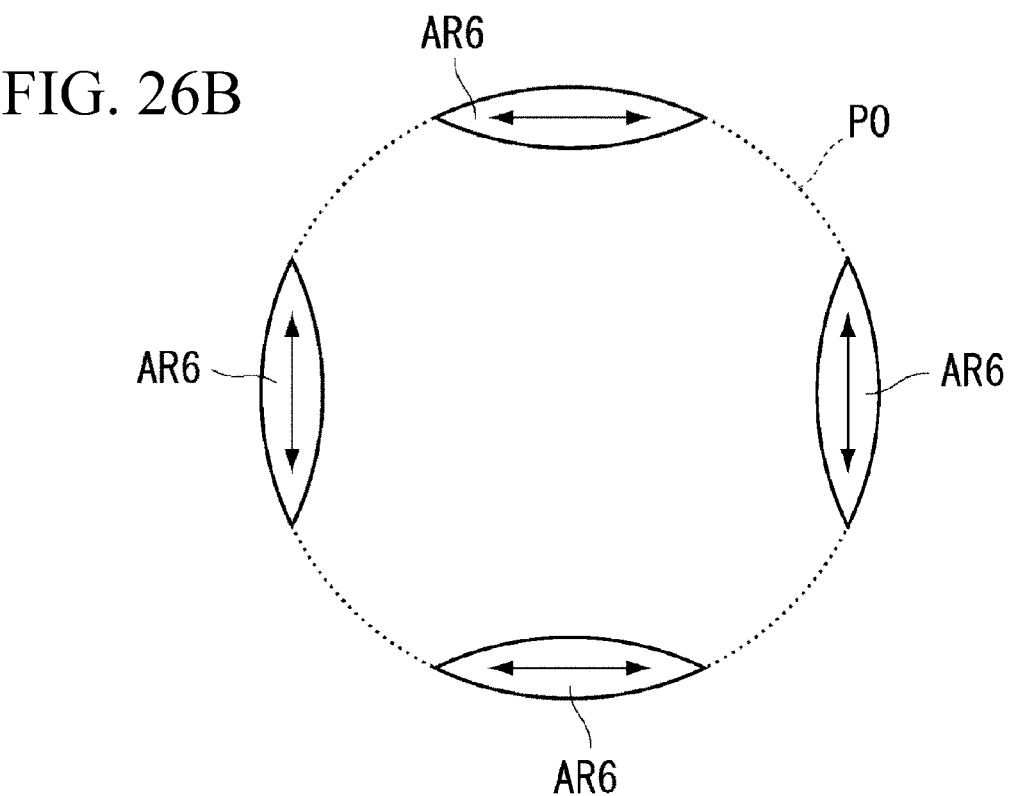
FIG. 26B is a view illustrating an illumination pupil in the modified example.

In FIG. 26A, the illumination pupil has a form in which the two-pole shaped illumination pupil illustrated in FIG. 25B is made into four poles. In FIG. 26B, the illumination pupil has a form in which the two-pole shaped illumination pupil illustrated in FIG. 25C is made into four poles. Further, even when the illumination pupil has a shape other than a circular shape, the number of a plurality of regions (the number of poles) on which excitation light is incident is set to an arbitrary number of two or more. Also, among the plurality of regions on which excitation light is incident on the pupil plane P0, a shape of one region may be different from shapes of other regions. Also, among the plurality of regions on which excitation light is incident on the pupil plane P0, a dimension of one region may be different from dimensions of other regions. Also, the plurality of regions on which excitation light is incident on the pupil plane P0 may be asymmetrically disposed with respect to the optical axis 21a of the objective lens 21.

A shape, a dimension, and a disposition of each pole of the illumination pupil can be realized, for example, by determining a shape, a dimension, and a disposition of the opening of the mask 15 illustrated in FIGS. 2A to 2C. Also, the mask 15 may be a mechanical diaphragm in which a region blocking light is variable, a spatial light modulator (SLM), or the like.

(Microscope of Eleventh Embodiment)

Figure 27:
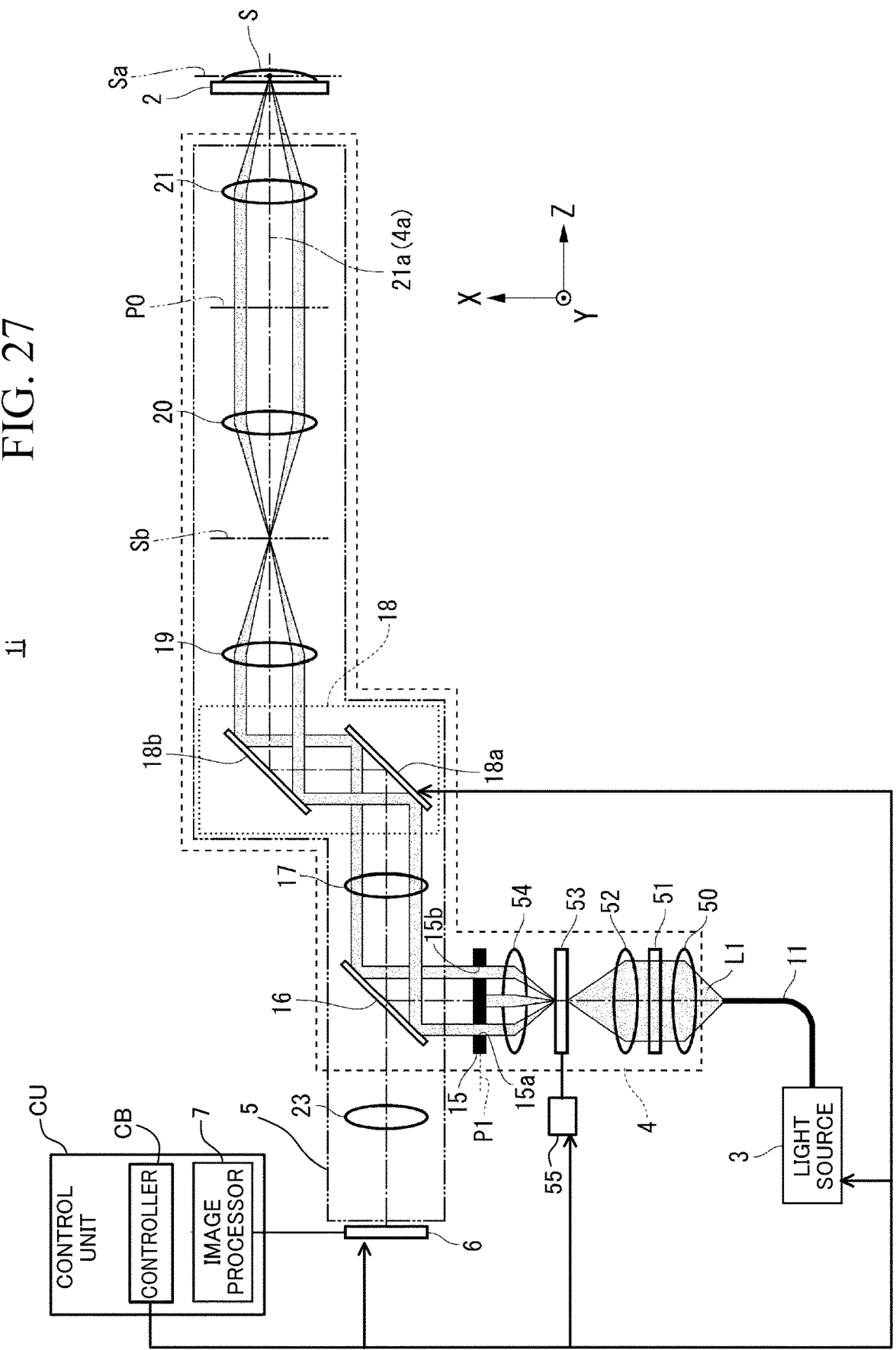
FIG. 27 is a view illustrating a microscope of an eleventh embodiment.

FIG. 27 is a view illustrating a microscope 1j of an eleventh embodiment. In FIG. 27, an illumination optical system 4 includes a collimator lens 50, a λ/2 wavelength plate 51, a lens 52, a diffraction grating 53, a lens 54, and a mask 15 in that order from an optical fiber 11 toward a dichroic mirror 16. The collimator lens 50 converts excitation light L1 from the optical fiber 11 into substantially parallel light. The λ/2 wavelength plate 51 adjusts a polarization state of the excitation light L1 when it is incident on the specimen S. The lens 52 focuses the excitation light L1 on the diffraction grating 53.

The diffraction grating 53 branches off the excitation light L1 into a plurality of luminous fluxes by diffraction. The diffraction grating 53 is a luminous flux splitting part that splits the excitation light that excites a fluorescent substance into a plurality of luminous fluxes. The diffraction grating 53 is disposed at or in the vicinity of a focal point of the lens 52. That is, the diffraction grating 53 is disposed at or in the vicinity of a plane that is conjugate with a specimen plane Sa. The "vicinity of the focal point" is within a range of a degree of the focal depth of light focused by the lens 52. For example, when a wavelength of light focused by the lens 52 is 1 um and an NA is 0.03, since the focal depth is about 1 mm, it is preferable that the diffraction grating 53 is disposed within 1 mm in the vicinity of the focal point of the lens 52. The plurality of luminous fluxes described above include 0th-order diffracted light, +1st-order diffracted light, and −1st order diffracted light. The lens 54 converts the 0th-order diffracted light, the +1st-order diffracted light, and the −1st-order diffracted light into substantially parallel light. The mask 15 is provided to block the 0th-order diffracted light and allow at least a part of the +1st-order diffracted light and at least a part of the −1st-order diffracted light to pass therethrough. In the microscope 1j of the eleventh embodiment including the diffraction grating 53, an amount of light of the excitation light L1 transmitted through the mask 15 can be increased compared to those in the above-described embodiments. Further, the diffraction grating 53 may also be designed so that 0th-order diffracted light is not generated. Also, a configuration in which the mask 15 is not provided may also be used.

The ±first-order diffracted light that has been split by the diffraction grating 53 is focused on the specimen plane Sa by the illumination optical system 4 and forms interference fringes L2 thereon. The diffraction grating 53 is held by a diffraction grating driver 55 to be movable in a periodic direction of the diffraction grating 53. When the diffraction grating driver 55 minutely moves the diffraction grating 53 in a grating direction of the diffraction grating 53, a phase of ±1st-order light generated from the diffraction grating 53 changes. In the microscope 1j of the eleventh embodiment, a light-and-dark phase of the interference fringes L2 generated on the specimen plane Sa is changed when a position of the diffraction grating 53 is changed by the diffraction grating driver 55.

Further, also in the microscope of the above-described embodiments, similarly to the microscope 1j of the eleventh embodiment, it is possible to have a configuration in which the interference fringes L2 are formed on the specimen plane Sa by the ±1st-order light generated from the diffraction grating 53. In this case, as in the microscope 1j of the eleventh embodiment, the diffraction grating 53 is held by the diffraction grating driver 55, and the diffraction grating driver 55 is configured to move the diffraction grating 53 minutely in the grating direction of the diffraction grating 53.

(Modified Example of Polarization Adjusting Part)

Figure 28:
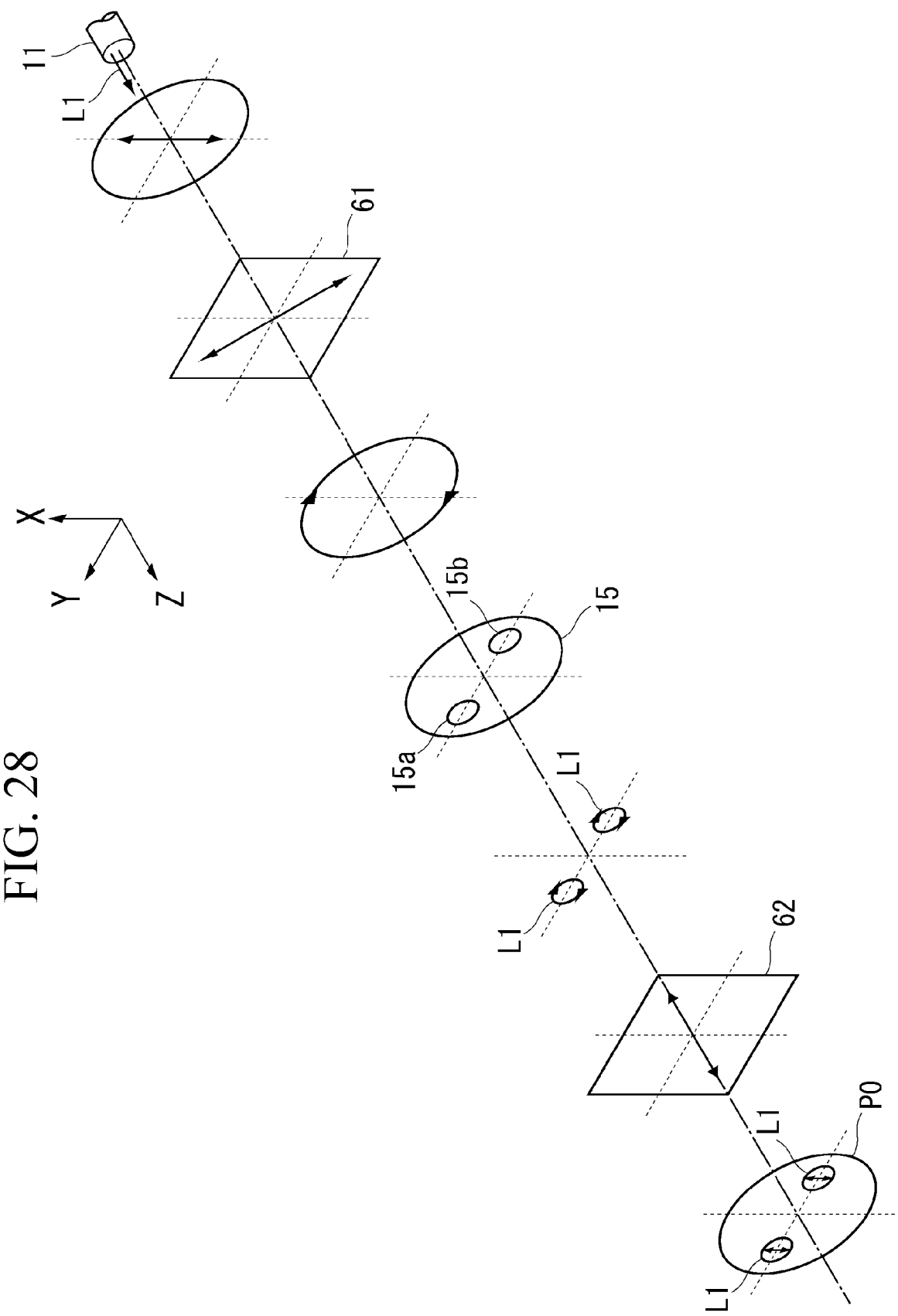
FIG. 28 is a view illustrating a first modified example of a polarization adjusting part.
Figure 29:
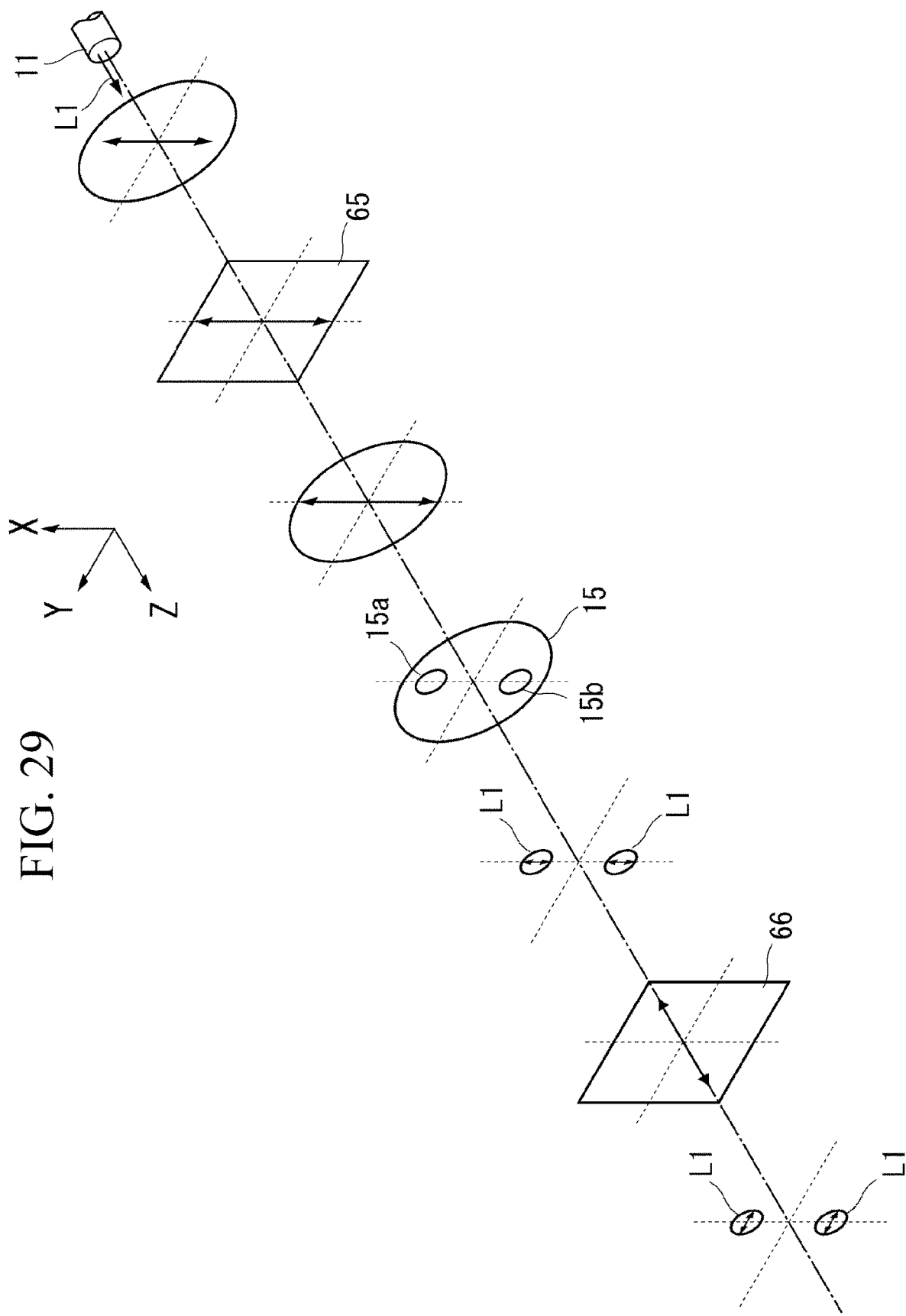
FIG. 29 is a view illustrating a second modified example of the polarization adjusting part.

FIGS. 28 and 29 are views illustrating a modified example 1 and a modified example 2 of the polarization adjusting part. These modified examples can be disposed in the illumination optical system 4 of the microscopes of the embodiments and modified examples described above. Further, in the illumination optical systems 4 of the microscopes of the embodiments and modified examples described above, the optical path is bent by a reflecting member such as the dichroic mirror 16 illustrated in FIG. 1, but in FIGS. 28 and 29, the illumination optical system 4 is illustrated to be spread so that the optical axis 4a is a straight line. An application of the modified example 1 and the modified example 2 of the polarization adjusting part illustrated in FIGS. 28 and 29 to the illumination optical systems 4 of the microscopes of the embodiments and modified examples described above is easily understood by those skilled in the art. In FIGS. 28 and 29, the Z direction is a direction parallel to the optical axis 4a, and the X direction and the Y direction are directions perpendicular to the optical axis 4a.

In the modified example 1 of the polarization adjusting part illustrated in FIG. 28, the illumination optical system 4 includes a λ/4 wavelength plate 61, a mask 15, and a λ/4 wavelength plate 62. The excitation light L1 emitted from the optical fiber 11 is linearly polarized light whose polarization direction is substantially in the X direction and is incident on the λ/4 wavelength plate 61. Further, a polarizer (for example, a polarizing plate) whose transmission axis is in the X direction may be provided in an optical path between the optical fiber 11 and the λ/4 wavelength plate 61.

A fast axis of the λ/4 wavelength plate 61 is set in a direction in which the X direction is rotated counterclockwise by 45° when viewed from the +Z side. The excitation light L1 that has passed through the λ/4 wavelength plate 61 becomes circularly polarized light and is incident on the mask 15. The excitation light L1 that has passed through the opening 15a and the opening 15b of the mask 15 is circularly polarized light and is incident on the λ/4 wavelength plate 62. A fast axis of the λ/4 wavelength plate 62 is set in a direction in which the X direction is rotated clockwise by 45° when viewed from the +Z side. The excitation light L1 that has passed through the λ/4 wavelength plate 62 becomes linearly polarized light whose polarization direction is in the X direction and is irradiated to the specimen.

The mask 15 is provided to be rotatable around the optical axis 4a as described in the first embodiment. When the mask 15 rotates, a periodic direction of the interference fringes changes. For example, in the state of FIG. 28, the opening 15a and the opening 15b of the mask 15 are aligned in the Y direction, and the periodic direction of the interference fringes is in the Y direction. When the mask 15 rotates by 90° from the state of FIG. 28, the periodic direction of the interference fringes is rotated by 90° and becomes the X direction.

The λ/4 wavelength plate 62 is rotatable around the optical axis 4a. The λ/4 wavelength plate 62 is provided to rotate by the same angle as the mask 15. For example, the λ/4 wavelength plate 62 is integrated with the mask 15 and rotates integrally with the mask 15. For example, when the mask 15 rotates by 90°, the λ/4 wavelength plate 62 is rotated by 90° and its fast axis becomes parallel to the fast axis of the λ/4 wavelength plate 61. In this case, the excitation light L1 that has passed through the λ/4 wavelength plate 62 becomes linearly polarized light whose polarization direction is in the Y direction. Since an incident plane of the excitation light L1 with respect to the specimen plane Sa is parallel to the periodic direction of the interference fringes and the excitation light L1 when it is incident on the specimen plane Sa is linearly polarized light whose polarization direction is perpendicular to the periodic direction of the interference fringes, the excitation light L1 is irradiated to the specimen plane Sa in an S-polarized light state.

As described above, the λ/4 wavelength plate 62 is included in the polarization adjusting part that adjusts a polarization state of the excitation light when it is incident on the specimen. Such a polarization adjusting part can reduce loss of an amount of light of the excitation light L1 compared to the aspect described with reference to FIG. 1.

In the second modified example of the polarization adjusting part illustrated in FIG. 29, the illumination optical system 4 includes a polarizer 65, a mask 15, and a λ/2 wavelength plate 66. The excitation light L1 emitted from the optical fiber 11 is linearly polarized light whose polarization direction is substantially in the X direction and is incident on the polarizer 65. A transmission axis of the polarizer 65 is set in the X direction. The excitation light L1 that has passed through the polarizer 65 is linearly polarized light whose polarization direction is in the X direction and is incident on the mask 15. The excitation light L1 that has passed through the opening 15a and the opening 15b of the mask 15 is linearly polarized light whose polarization direction is in the X direction and is incident on the λ/2 wavelength plate 66. A fast axis of the λ/2 wavelength plate 66 is set in a direction in which the X direction is rotated clockwise by 45° when viewed from the +Z side. The excitation light L1 that has passed through the λ/2 wavelength plate 66 becomes linearly polarized light whose polarization direction is in the Y direction and is irradiated to the specimen.

The mask 15 is provided to be rotatable around the optical axis 4a as described in the first embodiment. When the mask 15 rotates, a periodic direction of the interference fringes changes. For example, in the state of FIG. 29, the opening 15a and the opening 15b of the mask 15 are aligned in the X direction, and the periodic direction of the interference fringes is in the X direction. When the mask 15 rotates by 90° from the state of FIG. 29, the periodic direction of the interference fringes is rotated by 90° and becomes the Y direction.

The λ/2 wavelength plate 66 is rotatable around the optical axis 4a. The λ/2 wavelength plate 66 is provided to rotate by half an angle of the rotation angle of the mask 15. For example, when the mask 15 rotates by 90°, the λ/2 wavelength plate 66 is rotated by 45°. In this case, the excitation light L1 that has passed through the λ/2 wavelength plate 66 becomes linearly polarized light whose polarization direction is the X direction. Since an incident plane of the excitation light L1 with respect to the specimen plane Sa is parallel to the periodic direction of the interference fringes and the excitation light L1 when it is incident on the specimen plane Sa is linearly polarized light whose polarization direction is perpendicular to the periodic direction of the interference fringes, the excitation light L1 is irradiated to the specimen plane Sa in an S-polarized light state. As described above, the λ/2 wavelength plate 66 is included in the polarization adjusting part that adjusts a polarization state of the excitation light when it is incident on the specimen. Such a polarization adjusting part can reduce loss of an amount of light of the excitation light L1 compared to the aspect described with reference to FIG. 1.

In the embodiments and modified examples described above, the image processor 7 includes, for example, a computer system. The controller CB and the image processor 7 read a program such as an image processing program stored in a storage unit and execute processing of various types according to the image processing program. The program causes the computer to execute generation of an image on the basis of detection results of the detection device 6. Also, the image processing program can also be stored in a storage medium such as a CD-ROM, and the image processor 7 can load the image processing program from the storage medium into the above-described storage unit. Alternatively, the image processing program can also be loaded into the image processor 7 via a network link such as the Internet connection.

Effects of Embodiments and Modified Examples (1) The microscopes of the embodiments and modified examples each include an illumination optical system that is configured to irradiate a specimen disposed at a specimen plane with light and that is configured to form fringe illumination which is fringe-shaped illumination; a scanning part that is configured to perform a scanning with a relative movement between the fringe illumination and the specimen; a phase modulation element that is configured to set the fringe illumination to a plurality of phase states; a detection optical system on which light from the specimen enters; a detection device that includes a plurality of detectors detecting the light from the specimen via the detection optical system; and an image processor that is configured to generate an output image by using detection results of predetermined two or more detectors among the plurality of detectors of the detection device, wherein the image processor is configured to use the detection results of each of the predetermined two or more detectors to generate at least a first image, which is detected when the fringe illumination is in a first phase state, and a second image, which is detected when the fringe illumination is in a second phase state, for each detector, to generate an intermediate image for each detector by correcting the first image and the second image of each of the detectors on the basis of a position of corresponding detector, a period of the fringe illumination, the first phase, and the second phase, and to generate the output image from the plurality of intermediate images.

With this configuration, the microscopes of the embodiments and the modified examples each can acquire an output image having a satisfactory resolution and S/N ratio.

(2) The image processor 7 can be configured to separate and extract from the first image and the second image of each of the detectors a 0th-order component corresponding to a 0th-order spatial frequency of a light-and-dark period of the fringe illumination, a +1st-order component corresponding to a +1st-order spatial frequency of the light-and-dark period of the fringe illumination, and a −1st-order component corresponding to a −1st-order spatial frequency of the light-and-dark period of the fringe illumination, and to form the intermediate image for each detector on the basis of the 0th-order component, the +1st-order component, and the −1st-order component.

With this configuration, an output image having a further improved resolution and S/N ratio can be generated.

(3) In (2), phase of the fringe illumination in the first phase state and phase of the fringe illumination in the second phase state can be made different from each other by $\pi$ [rad], and thereby an output image having a high resolution and S/N ratio can be generated using the detection results obtained by irradiating the fringe illumination in two phase states.

(4) In (2), the image processor is configured to further separate and extract the 0th-order component, the +1st-order component, and the −1st-order component by also using a third image of each of the detectors which is created by using the detection result of each of the predetermined two or more detectors detected when the fringe illumination is in a third phase state, and wherein phase of the fringe illumination in the first phase state, phase of the fringe illumination in the second phase state, and phase of the fringe illumination in the third phase state differ from each other, and thereby can generate an output image having an even higher resolution and S/N ratio.

(5) Further, the image processor 7 is configured to add the plurality of corrected intermediate images and to generate the output image, and the correction by the image processor includes correction processing that shifts a phase of the fringe illumination in an image processing manner according to each positions of the predetermined two or more detectors, and thereby can obtain an output images having an even higher resolution and S/N ratio.

(6) A fringe direction setting part (the mask 15) for setting a periodic direction of the fringe illumination is further provided, wherein the image processor is configured to generate a plurality of the output images by using each of the detection results of the predetermined two or more detectors obtained by each irradiations of the fringe illuminations in a plurality of periodic directions, and to generate a final output image on the basis of the plurality of output images, and thereby a final output image having an even higher resolution and S/N ratio can be generated.

Although various embodiments and modified examples have been described above, the present invention is not limited to these contents. Also, each of the embodiments and modified examples may be applied alone or may be used in combination. Other aspects conceivable in the scope of the technical idea of the present invention are also included in the scope of the present invention.

Also, in the various embodiments and modified examples described above, although the interference fringes formed by interference have been described as an example of the fringe-shaped illumination (fringe illumination), not only the fringe-shaped illumination (fringe illumination) formed by interference but also fringe-shaped illumination (fringe illumination) formed by a method other than interference may be used. Further, the "fringes" and "fringe shape" have a bright portion and a dark portion, a bright portion to a bright portion or a dark portion to a dark portion has a predetermined interval (predetermined period), and the "fringes," the "fringe-shaped illumination (fringe illumination)," and the "interference fringes" are formed on the specimen plane.

What is claimed is:

1. A microscope comprising:
an illumination optical system that is configured to irradiate a specimen disposed at a specimen plane with light and that is configured to form fringe illumination which is fringe-shaped illumination;
a scanning part that is configured to perform a scanning with a relative movement between the fringe illumination and the specimen;
a phase modulation element that is configured to set the fringe illumination to a plurality of phase states;
a detection optical system on which light from the specimen enters;
a detection device that includes a plurality of detectors detecting the light from the specimen via the detection optical system; and
an image processor that is configured to generate an output image by using detection results of predetermined two or more detectors among the plurality of detectors of the detection device,
wherein the image processor is configured to use the detection results of each of the predetermined two or more detectors to generate at least a first image, which is detected when the fringe illumination is in a first phase state, and a second image, which is detected when the fringe illumination is in a second phase state, for each detector, to generate an intermediate image for each detector by correcting the first image and the second image of each of the detectors on the basis of a position of corresponding detector, a period of the fringe illumination, the first phase, and the second phase, and to generate the output image from the plurality of intermediate images.

2. The microscope according to claim 1,
wherein the image processor is configured to separate and extract from the first image and the second image of each of the detectors a 0th-order component corresponding to a 0th-order spatial frequency of a light-and-dark period of the fringe illumination, a +1st-order component corresponding to a +1st-order spatial frequency of the light-and-dark period of the fringe illumination, and a −1st-order component corresponding to a −1st-order spatial frequency of the light-and-dark period of the fringe illumination, and to form the intermediate image for each detector on the basis of the 0th-order component, the +1st-order component, and the −1st-order component.

3. The microscope according to claim 1,
wherein phase of the fringe illumination in the first phase state and phase of the fringe illumination in the second phase state differ by π [rad].

4. The microscope according to claim 2,
wherein the image processor is configured to further separate and extract the 0th-order component, the +1st-order component, and the −1st-order component by also using a third image of each of the detectors which is created by using the detection result of each of the predetermined two or more detectors detected when the fringe illumination is in a third phase state, and
wherein phase of the fringe illumination in the first phase state, phase of the fringe illumination in the second phase state, and phase of the fringe illumination in the third phase state differ from each other.

5. The microscope according to claim 4,
wherein the phase of the fringe illumination in the first phase state, the phase of the fringe illumination in the second phase state, and the phase of the fringe illumination in the third phase state differ from each other by 2π/3 [rad].

6. The microscope according to claim 1,
wherein the image processor is configured to add the plurality of corrected intermediate images and to generate the output image.

7. The microscope according to claim 1,
wherein the correction by the image processor includes correction processing that shifts a phase of the fringe illumination in an image processing manner according to each positions of the predetermined two or more detectors.

8. The microscope according to claim 1,
comprises a fringe direction setting part that is configured to set a periodic direction of the fringe illumination, and
wherein the image processor is configured to generate a plurality of the output images by using each of the detection results of the predetermined two or more detectors obtained by each irradiations of the fringe illuminations in a plurality of periodic directions, and to generate a final output image on the basis of the plurality of output images.

9. The microscope according to claim 8,
wherein the generation of the final output image is performed by adding the plurality of output images.

10. The microscope according to claim 8,
wherein the generation of the final output image includes:
converting the plurality of output images into each of spatial frequency coordinates;
adding the output images in the spatial frequency coordinates;
filtering processing with respect to a result of the adding; and
converting a result of the filtering processing into an actual coordinate space.

11. The microscope according to claim 1,
wherein the light detected by the detector is fluorescence from the specimen; and
wherein the detection optical system includes a wavelength separation element that is configured to block light having same wavelength as the light in which the illumination optical system irradiates to the specimen plane, and to allow a wavelength of the fluorescence from the specimen to pass therethrough.

12. The microscope according to claim 1,
comprises a polarization adjusting part that is configured to adjust a polarization state of the light which irradiates the specimen.

13. The microscope according to claim 1,
wherein the scanning part includes an optical path changing part provided in the illumination optical system and the detection optical system.

14. The microscope according to claim 1,
wherein the scanning part includes a moving mechanism that is configured to change a relative position between a specimen table on which the specimen is placed and the illumination optical system and the detection optical system.

15. The microscope according to claim 1,
wherein the phase modulation element is configured to change a phase of the fringe illumination without moving an envelope of the fringe illumination.

16. The microscope according to claim 1,
wherein number of light portions included in the fringe illumination in a periodic direction of the light-and-dark period is three or more.

17. The microscope according to claim 1,
wherein the fringe illumination is an interference fringe.

* * * * *